June 20, 1967 E. L. WALTERS ET AL 3,326,547
SHEET HANDLING APPARATUS FOR GLASS PLATES, ETC.
Filed Aug. 27, 1964 22 Sheets-Sheet 7
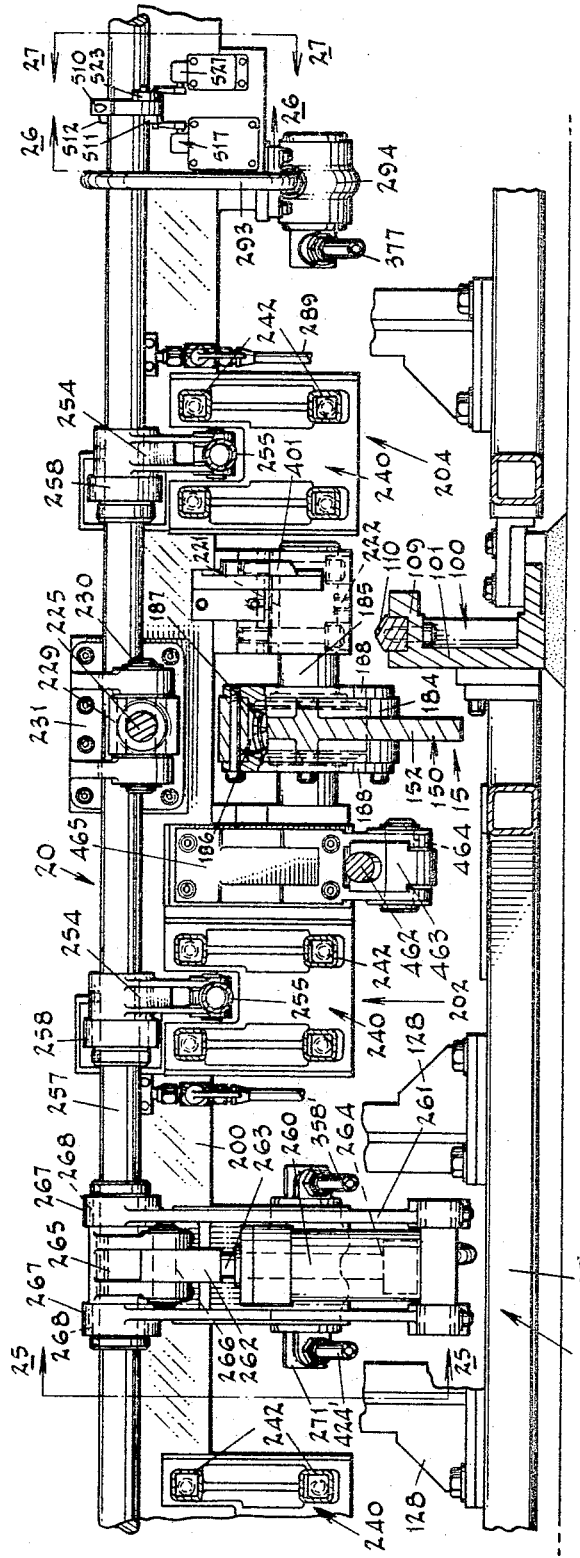
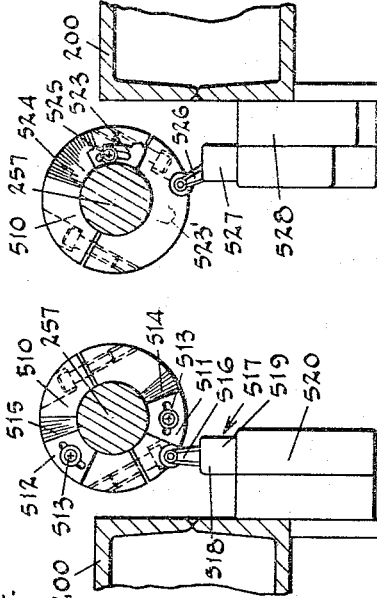
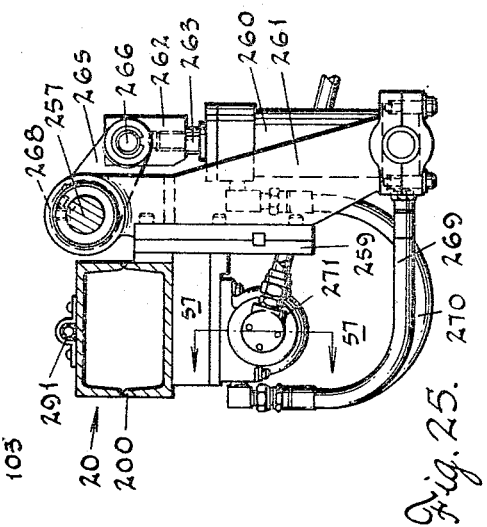
INVENTORS
Emmett L. Walters and
BY Joseph S. Koluch
Nobbe & Swope
ATTORNEYS

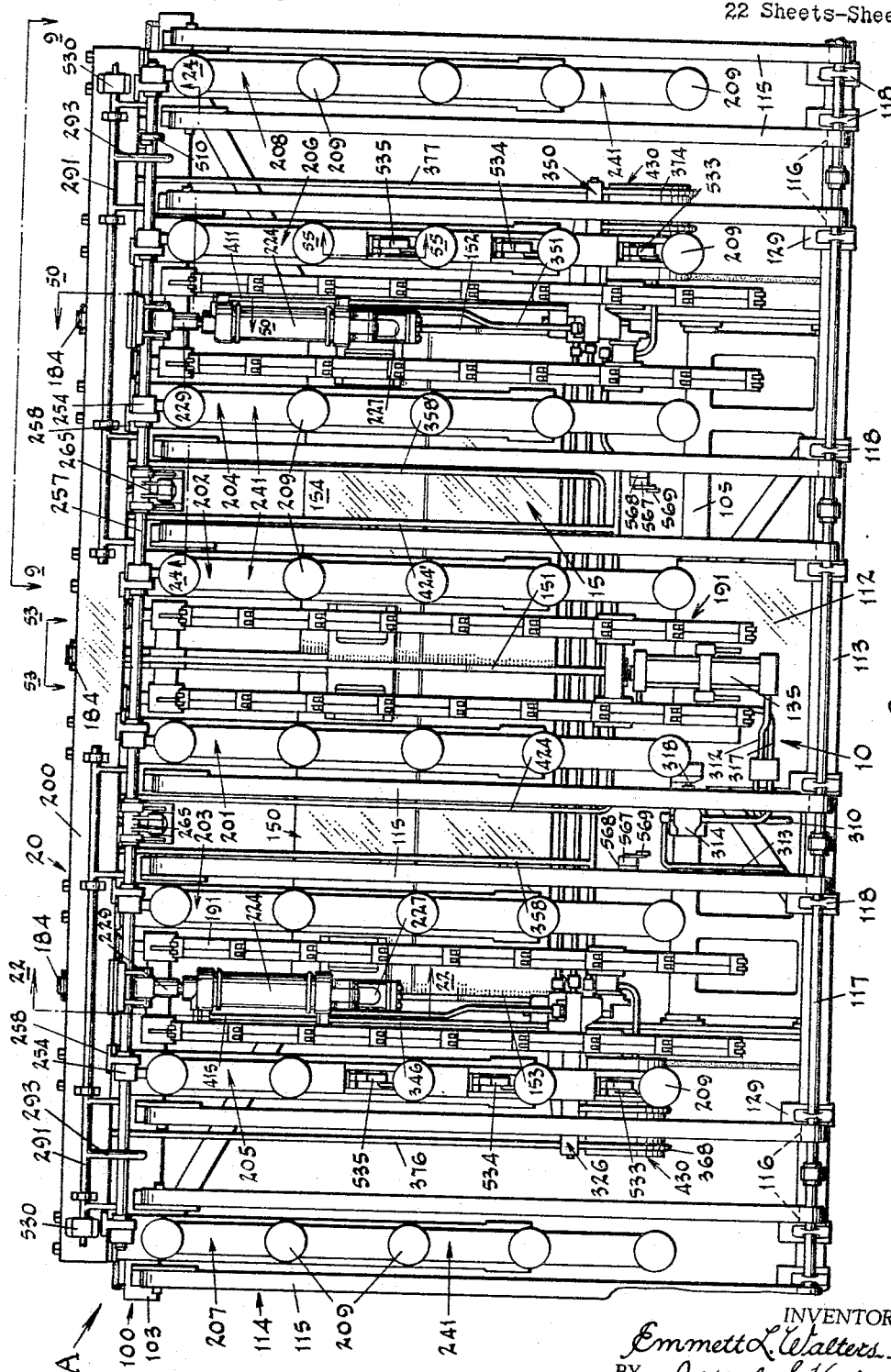

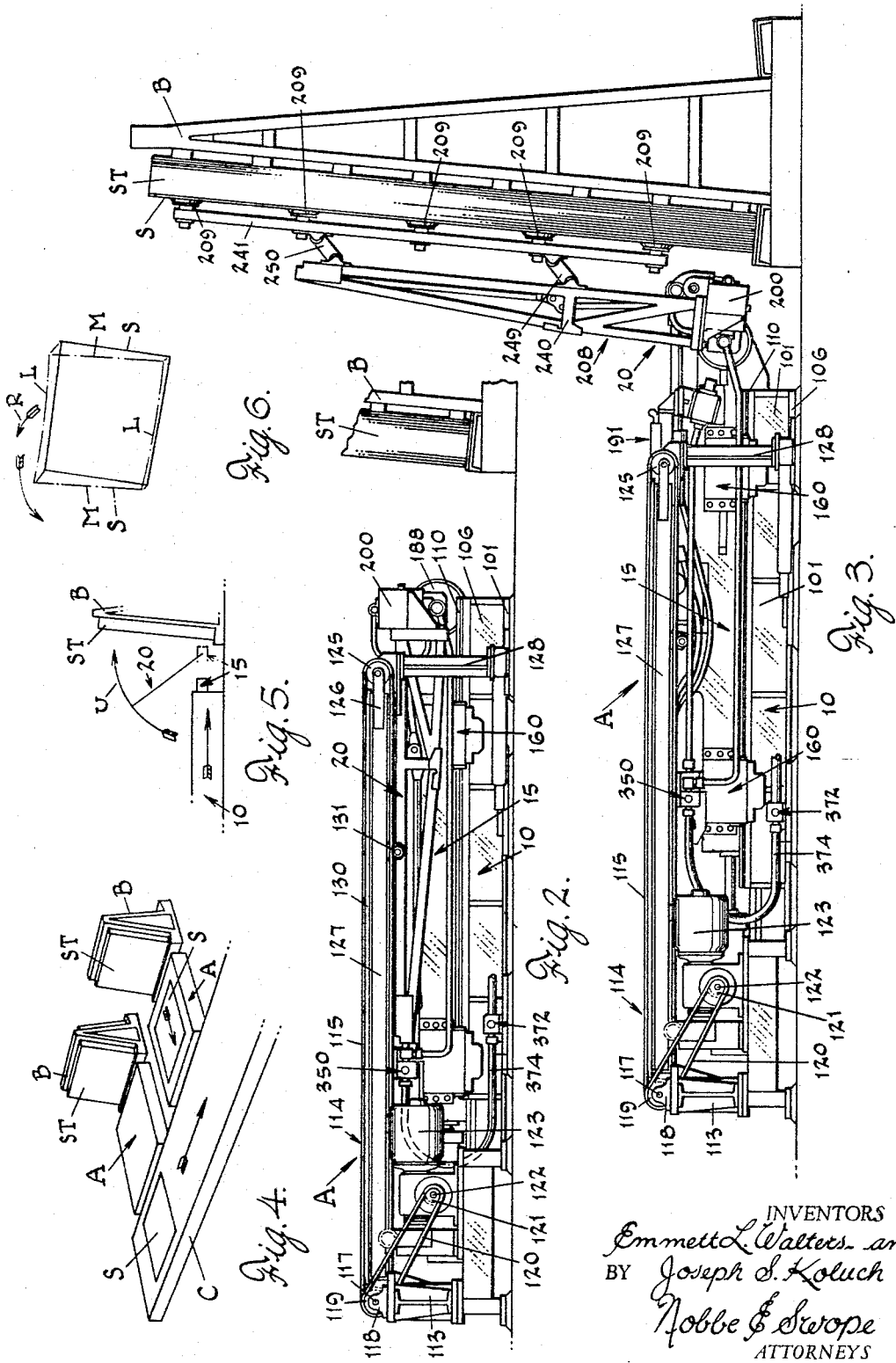

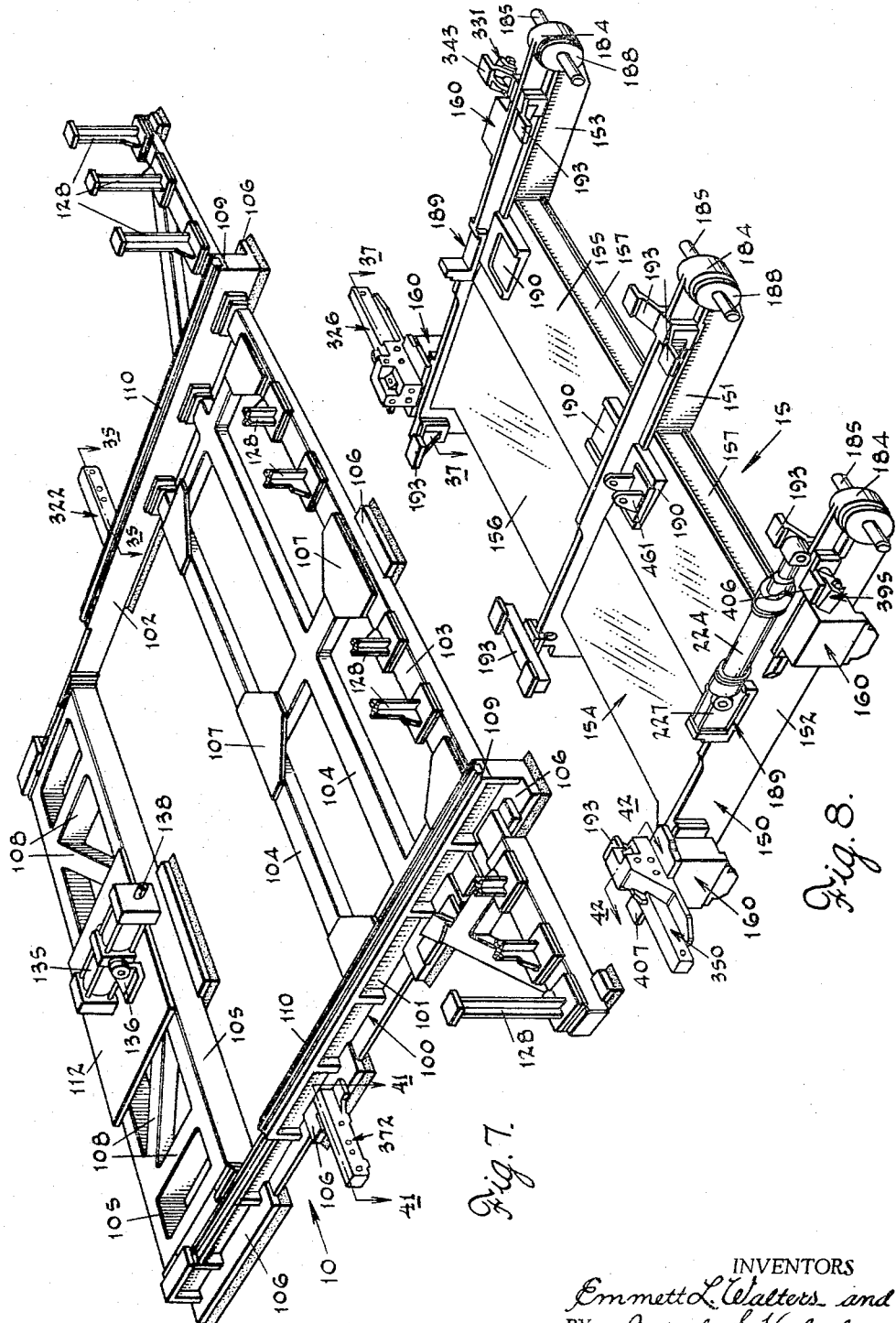

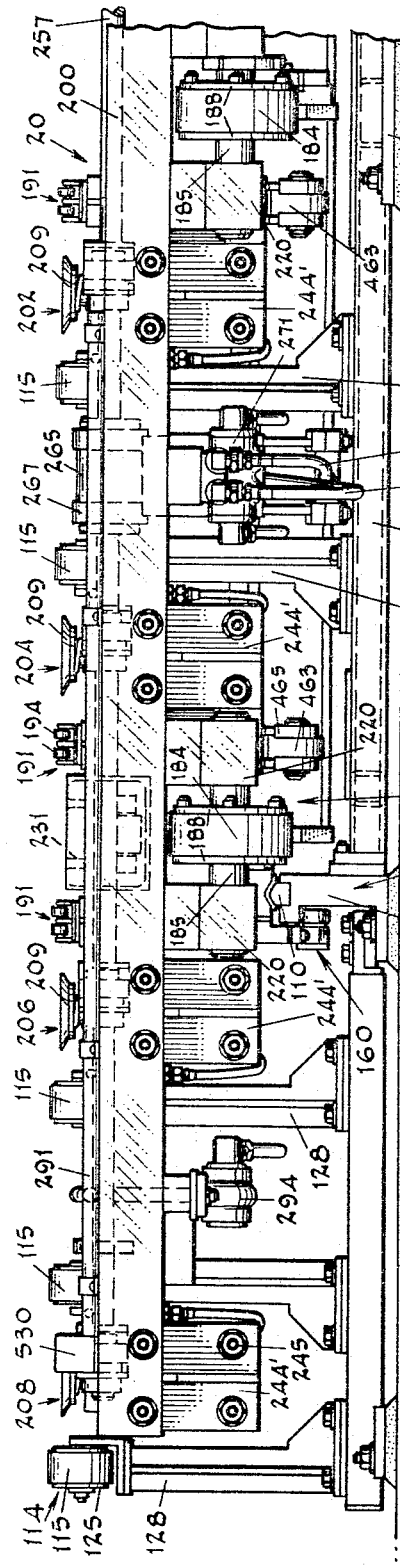

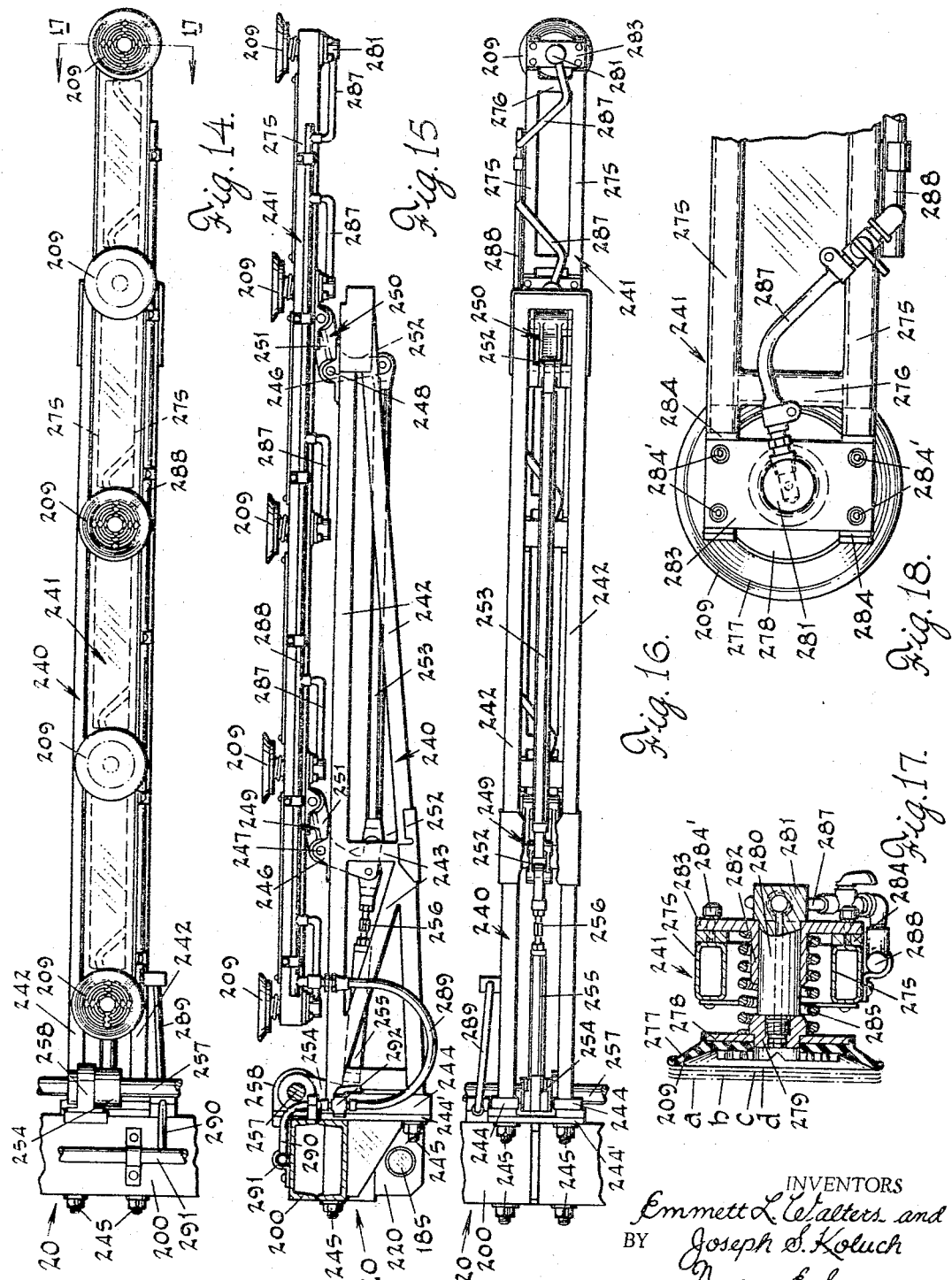

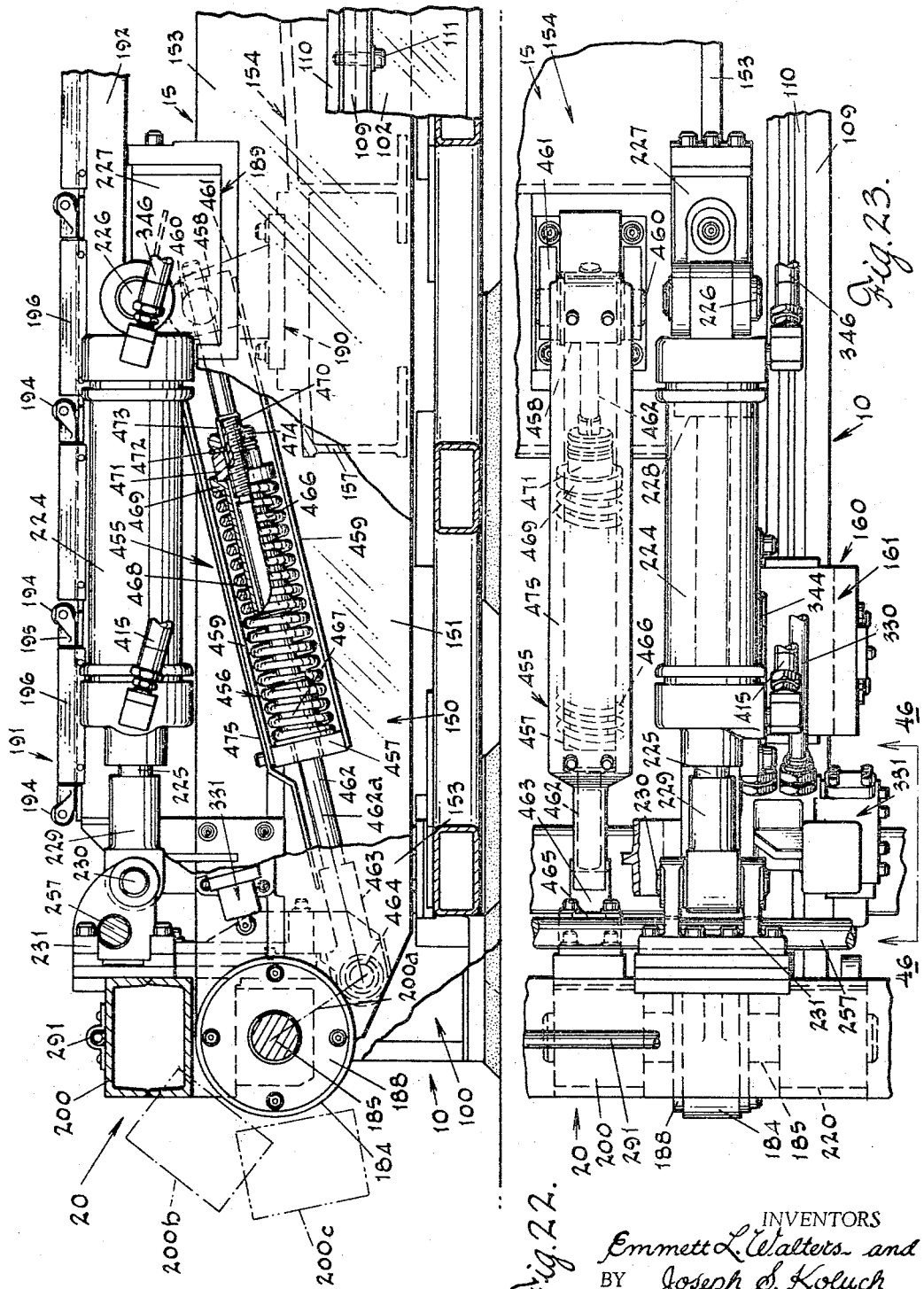

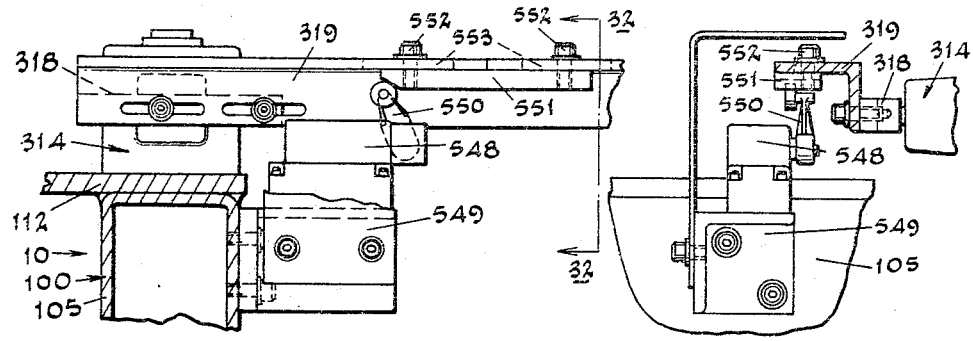
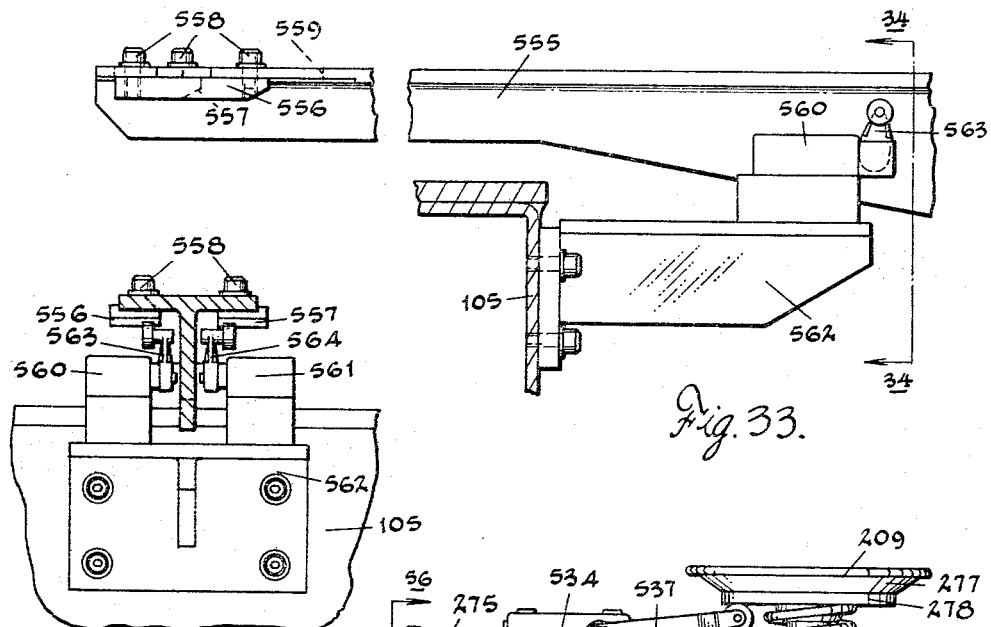
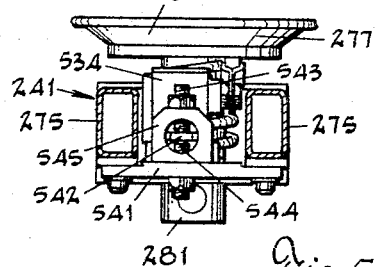
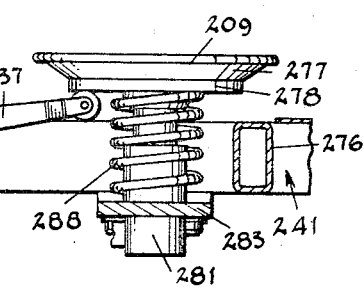

June 20, 1967   E. L. WALTERS ET AL   3,326,547
SHEET HANDLING APPARATUS FOR GLASS PLATES, ETC.
Filed Aug. 27, 1964
22 Sheets-Sheet 10
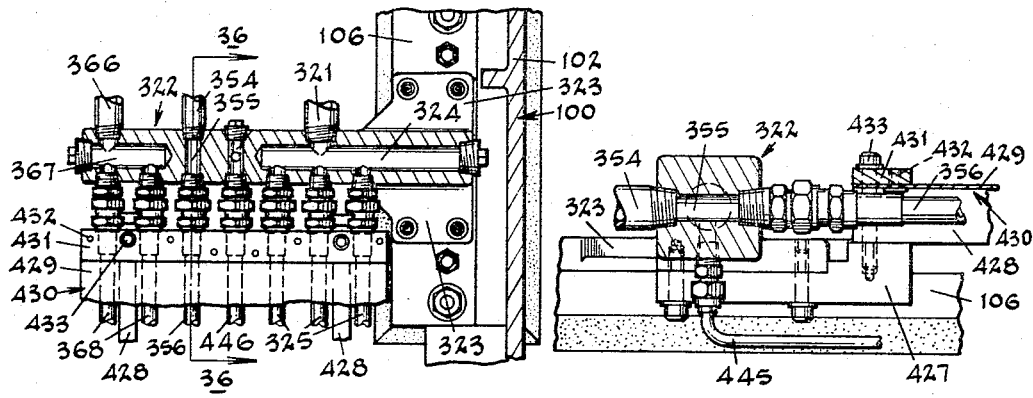
Fig. 35.    Fig. 36.
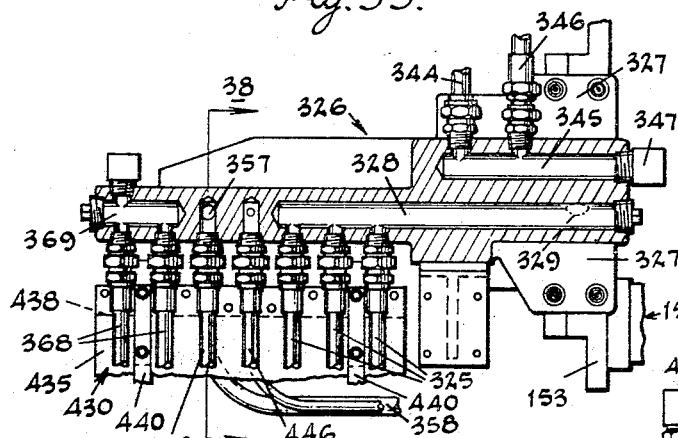
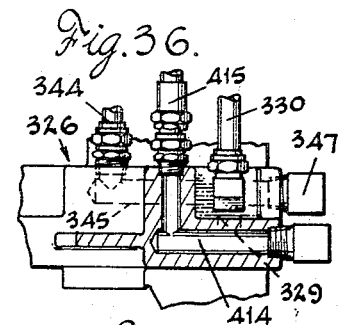
Fig. 37.    Fig. 39.
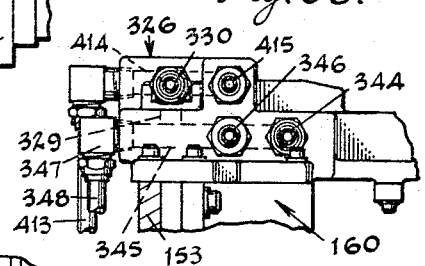
Fig. 40.
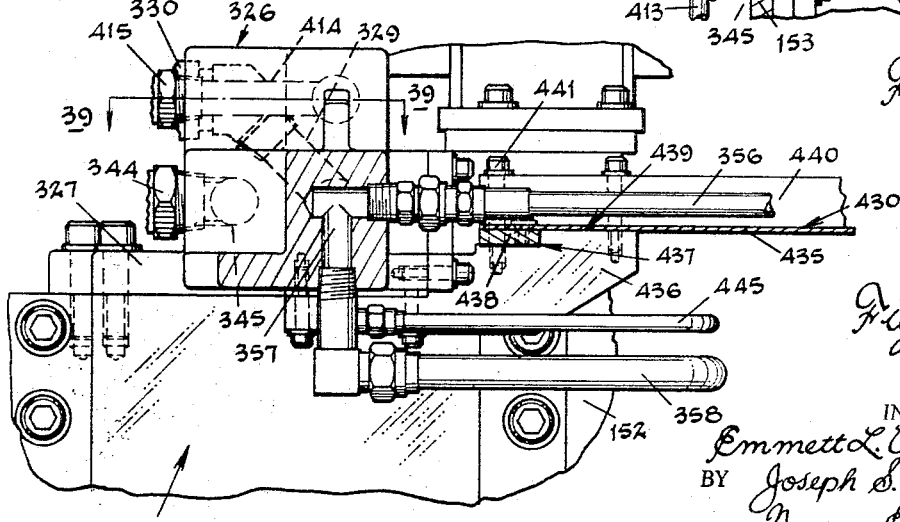
Fig. 38.
INVENTORS
Emmett L. Walters and
BY Joseph S. Koluch
Nobbe & Swope
ATTORNEYS INVENTORS
Emmett L. Walters and
BY Joseph S. Koluch
Nobbe & Swope
ATTORNEYS

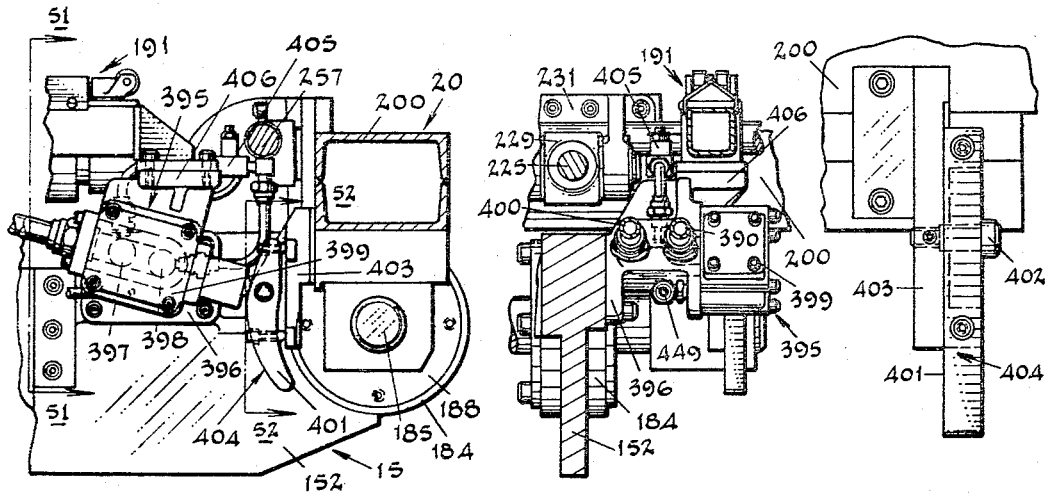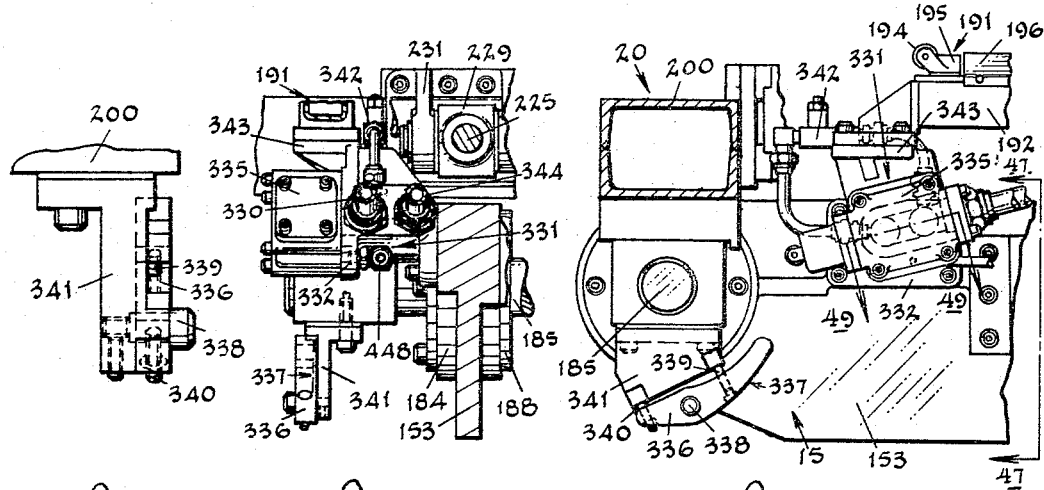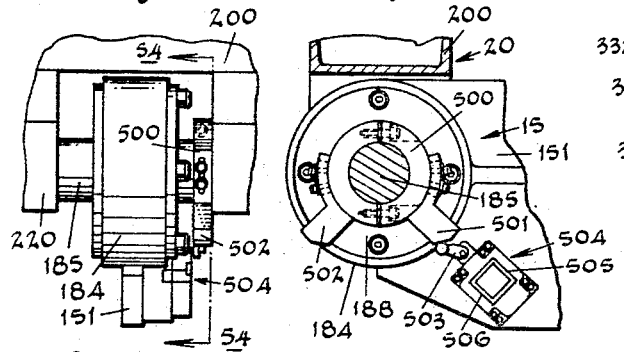

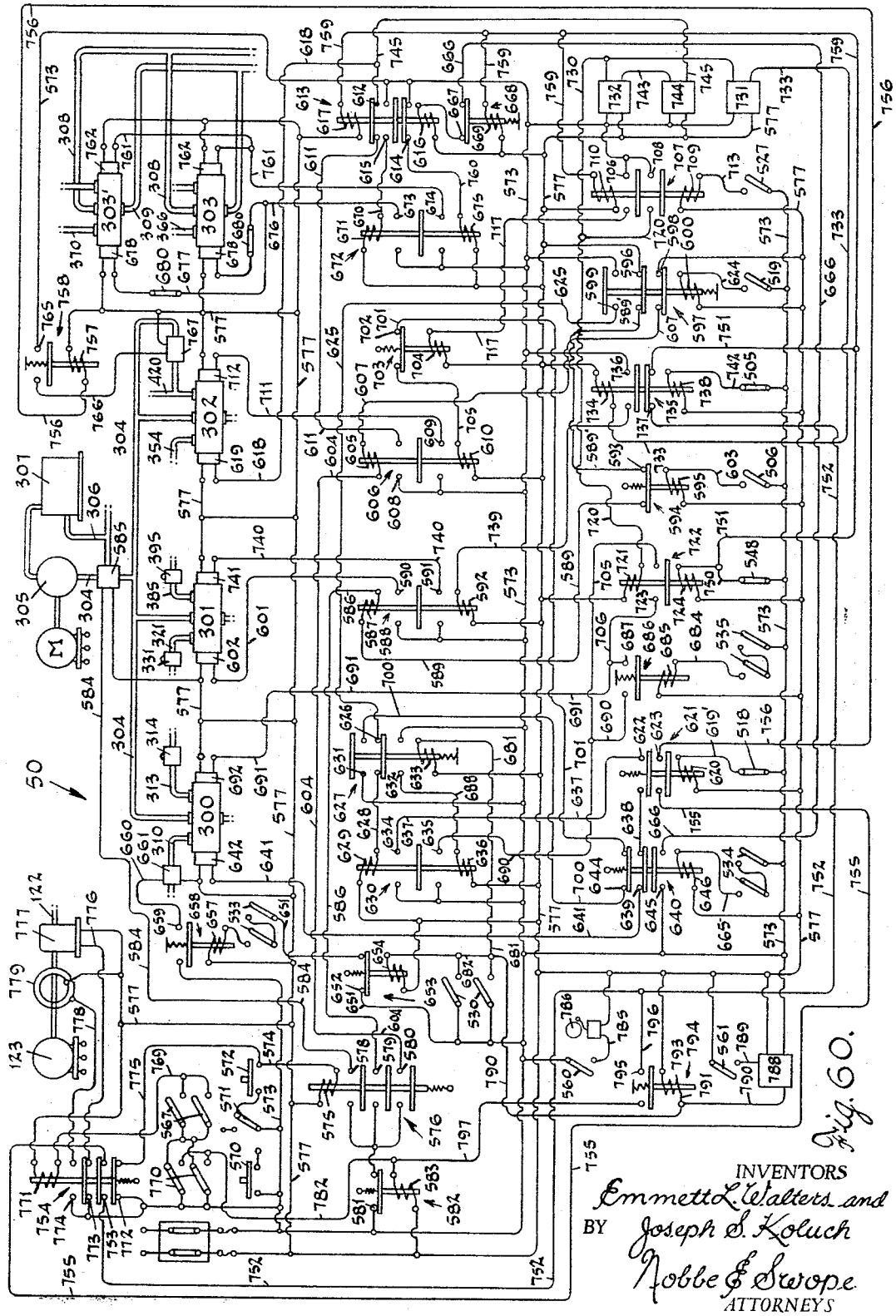

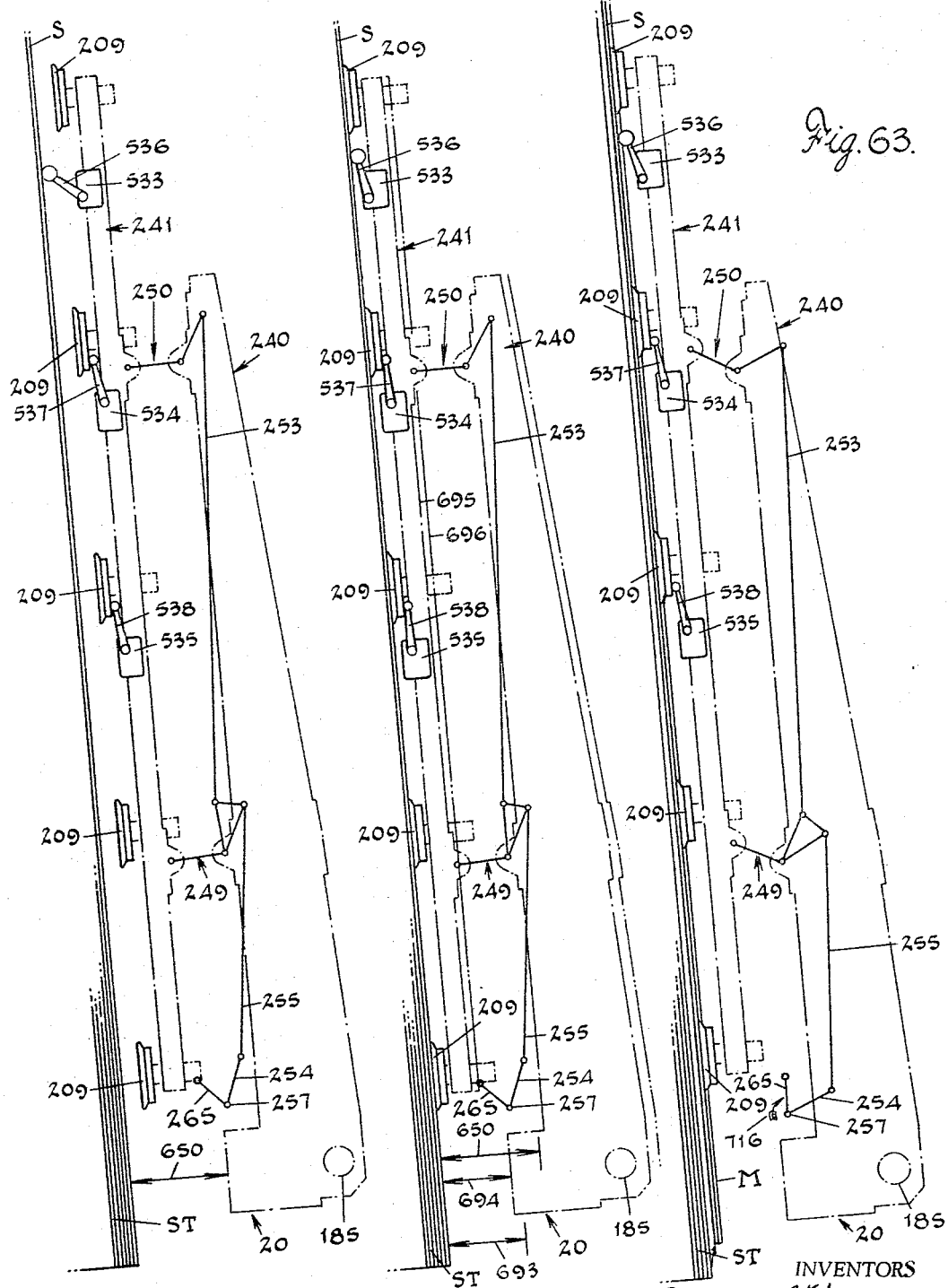

June 20, 1967  E. L. WALTERS ET AL  3,326,547
SHEET HANDLING APPARATUS FOR GLASS PLATES, ETC.
Filed Aug. 27, 1964  22 Sheets-Sheet 16

INVENTORS
Emmett L. Walters and
Joseph S. Koluch
BY
Nobbe & Swope
ATTORNEYS

June 20, 1967  E. L. WALTERS ET AL  3,326,547
SHEET HANDLING APPARATUS FOR GLASS PLATES, ETC.
Filed Aug. 27, 1964  22 Sheets-Sheet 17

INVENTORS
Emmett L. Walters and
BY Joseph S. Koluch
Nobbe & Swope
ATTORNEYS

June 20, 1967 E. L. WALTERS ET AL 3,326,547
SHEET HANDLING APPARATUS FOR GLASS PLATES, ETC.
Filed Aug. 27, 1964 22 Sheets-Sheet 18
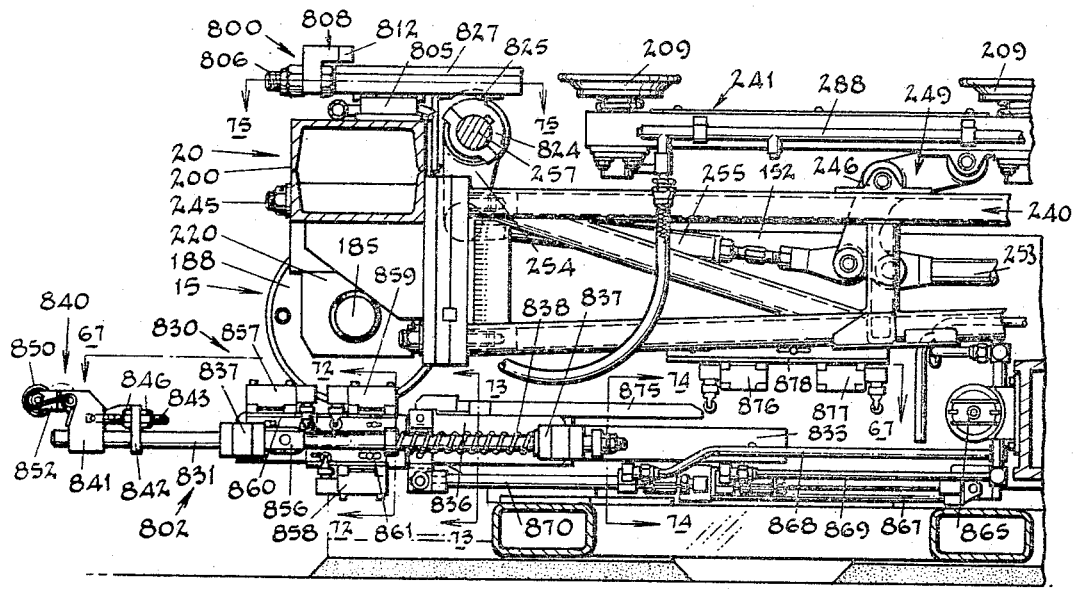
Fig. 66.
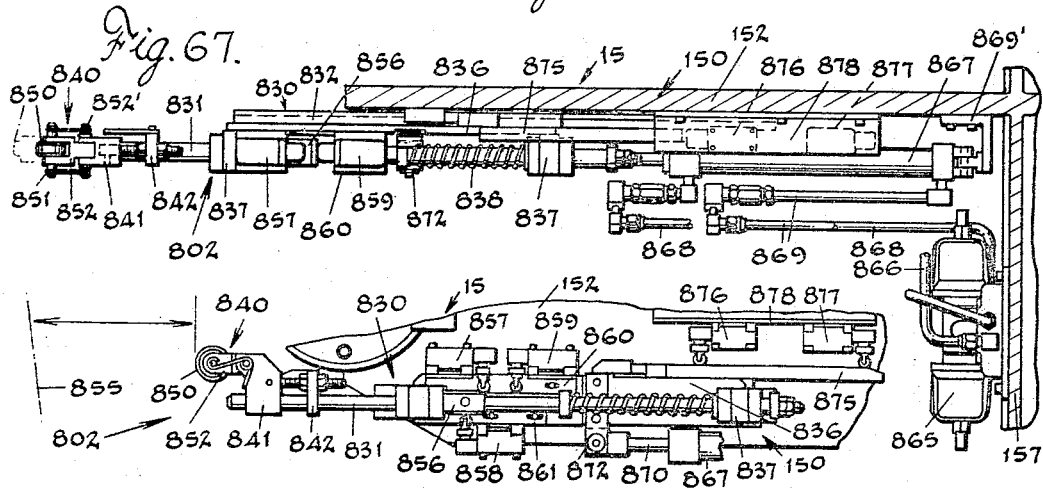
Fig. 67.
Fig. 68.
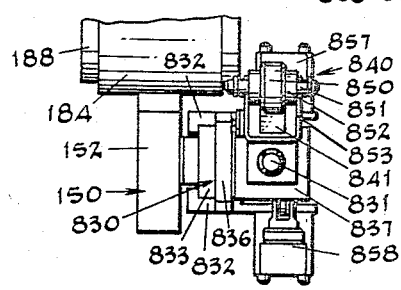
Fig. 69.
Fig. 70.
INVENTORS
Emmett L. Walters and
BY Joseph S. Koluch
Nobbe & Swope
ATTORNEYS

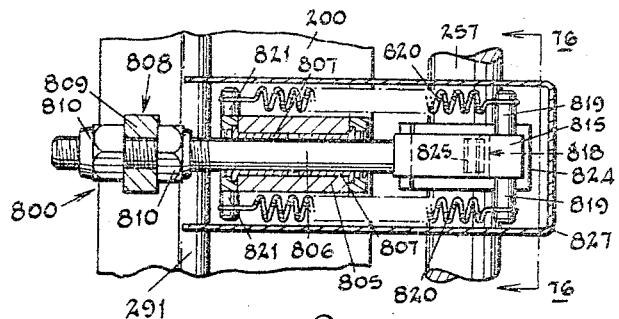
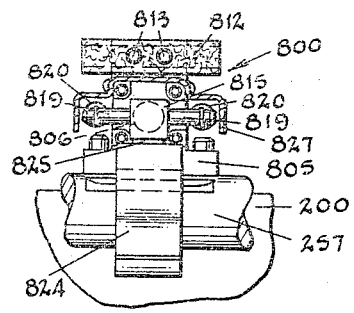
Fig. 75.   Fig. 76.
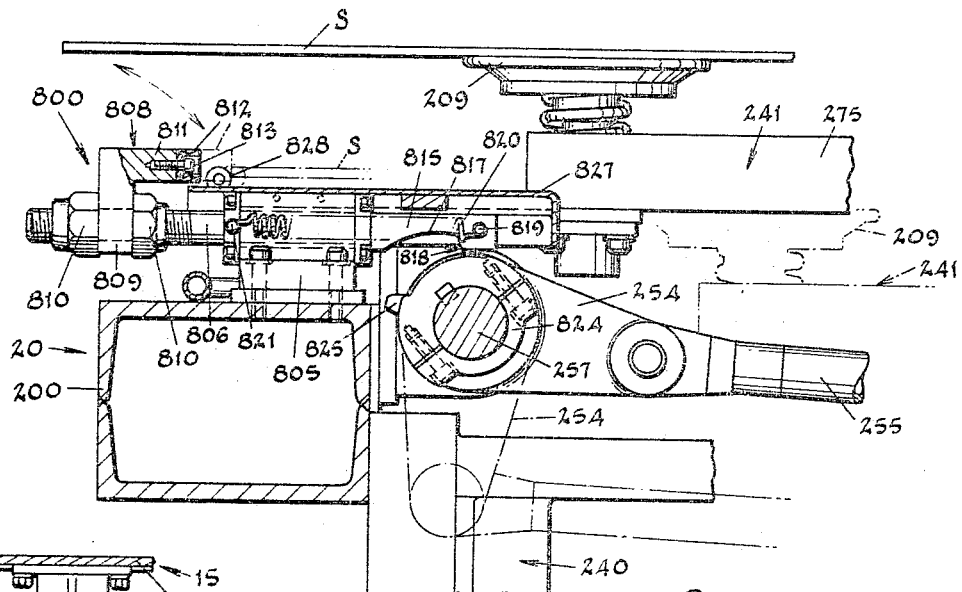
Fig. 77.
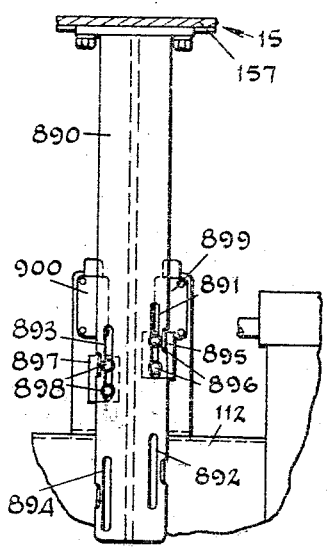
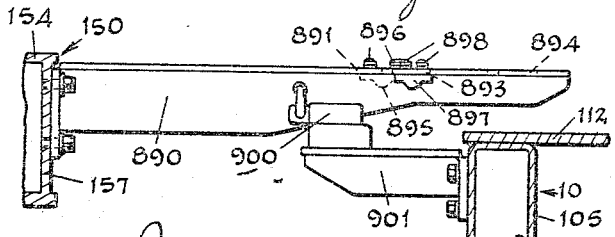
Fig. 79.   Fig. 80.
INVENTORS
Emmett L. Walters and
BY  Joseph S. Koluch
Nobbe & Swope
ATTORNEYS June 20, 1967    E. L. WALTERS ET AL    3,326,547
SHEET HANDLING APPARATUS FOR GLASS PLATES, ETC.
Filed Aug. 27, 1964    22 Sheets-Sheet 21

INVENTORS
Emmett L. Walters and
BY Joseph S. Koluch
Nobbe & Swope
ATTORNEYS

United States Patent Office 3,326,547
Patented June 20, 1967

3,326,547
SHEET HANDLING APPARATUS FOR GLASS PLATES, ETC.
Emmett L. Walters and Joseph S. Koluch, Toledo, Ohio, assignors to Libbey-Owens-Ford Glass Company, Toledo, Ohio, a corporation of Ohio
Filed Aug. 27, 1964, Ser. No. 392,539
15 Claims. (Cl. 271—12)

The present invention relates broadly to sheet handling apparatus and more particularly to improved apparatus for handling and transferring individual sheets or plates from one support means to a second support means.

Although not restricted thereto, the novel apparatus of this invention has been successfully employed in the handling and transfer of relatively large sheets or plates of glass. When handled with a normally exercised amount of caution during finishing operations or in storage, these large sheets or "blanks" of glass, which may have dimensional sizes up to 10 ft. by 20 ft., present no major problem other than being unwieldy to handle. However, when inadvertently damaged as by breaking, they can of course become an imminent danger to safety of the operators as well as a source of high production losses.

As is known in the glass art, between processing operations of the glass sheets or for storage purposes, individual glass sheets are usually stacked in an inclined plane on edge one against another on one or both sides of a transfer rack, usually referred to as an A buck. Normally, when handling large sheets or plates of glass such as in transferring them from a horizontal conveyor to a transfer rack, they are picked up by a large vacuum frame operated by an overhead crane and, with the aid of usually two or more workmen who steady and guide the sheet during its transfer, are properly positioned with relation to the transfer rack before being released from the vacuum frame. Substantially the same sequence of operations is performed when transferring a large sheet or plate from a transfer rack to a horizontal conveyor. This operation is relatively slow and considerable care must be taken to prevent scratching or marring of the glass surfaces as well as actual breakage of the glass.

It is therefore a primary object of this invention to provide improved transfer apparatus that is automatically operable to remove large sheets or plates of glass or other materials in timed succession from one form of support and to place them on a second form of support safely and efficiently and with minimum liability of scratching, marring or breaking of said sheets or plates.

Another object of the invention is to provide, in sheet transfer apparatus of the above character, vacuum handling means for automatically removing individual sheets or plates stacked substantially vertically and in face to face relation on a transfer rack and placing them on a horizontal conveyor or for removing successive sheets from a conveyor and stacking them on a transfer rack.

Another object of the invention is to provide, in sheet transfer apparatus of the above character, a horizontally movable carriage and a vacuum frame pivotally mounted upon said carriage for removing individual glass sheets stacked in a substantially vertical position and placing them upon a horizontal conveyor or vice versa, embodying means for pivotally swinging the vacuum frame in timed relation to the horizontal movement of the carriage to move the vacuum frame bodily toward the stack of sheets an increased distance equal to the thickness of a glass sheet upon removal of successive sheets and a diminishing distance equal to the thickness of a glass sheet during the stacking of successive sheets.

Another object of the invention is to provide, in sheet transfer apparatus of the above character, control means for the vacuum frame operable to initially shift the out-surface separation thereof whereby the outermost sheet in the stack relative to the immediately adjacent sheet to break the cohesion therebetween and effect can be readily removed without disturbing the remaining sheets in the stack.

Another object of the invention is to provide, in sheet transfer apparatus of the above character, in which the vacuum frame is provided with a plurality of vacuum cups mounted for movement with respect thereto, electrically operable means on the frame engaging the outermost sheet of a stack of sheets when the frame is moved inwardly to a predetermined position with respect thereto to decrease the rate of movement of the frame toward the stack of sheets, and electrically operable means also mounted on the frame and actuated by certain of the vacuum cups as said cups engage the outermost sheet to stop inward movement of the vacuum frame and to simultaneously apply vacuum to the vacuum cups to grip the sheet.

A further object of the invention is to provide, in sheet transfer apparatus of the above character, electrically operable means mounted on the vacuum frame and actuated by certain of the vacuum cups after the application of vacuum thereto for moving the vacuum frame outwardly a predetermined distance with respect to the stack of sheets to cause a bowing of the outermost sheet a predetermined degree, and electrical control means operable to then automatically swing the vacuum cups and glass sheet upwardly with respect to the vacuum frame to release the sheet from the immediately adjacent sheet in the stack.

A further object of the invention is to provide, in sheet transfer apparatus of the above character, electrically operable means effective upon removal of a given number of individual sheets to reduce the stack to a predetermined thickness to cause the sounding of an alarm during further repeated movements of the vacuum frame to effect the removal of additional sheets from the stack, and electrically operable means effective after removal of the last sheet from the stack to terminate operation of the sheet transfer apparatus, or when stacking sheets to cause the sounding of an alarm during further repeated movements of the vacuum frame toward the stack of sheets when the stack has reached a predetermined thickness and subsequently effective upon continued stacking of successive sheets to a second predetermined thickness of the stack to terminate operation of the sheet transfer apparatus.

A still further object of the invention is to provide sheet transfer apparatus of the above character adapted to operate in concert with like transfer apparatus and including an electrically operated control system for interrelating successive movements of the vacuum handling means of one transfer apparatus with the movements of one or more like transfer apparatus whereby the several transfer apparatus will be automatically and sequentially operated to transfer sheets or plates from a plurality of transfer racks to a single horizontally disposed conveyor or vice versa.

A still further object of the invention is to provide, in sheet transfer apparatus of the above character, electrically operated means for automatically effecting and controlling the movements of the vacuum handling means in timed sequence of operations.

Other objects and advantages of the invention will become more apparent during the course of the following description when read in connection with the accompanying drawings.

In the drawings, wherein like numerals are employed to designate like parts throughout the same:

FIG. 1 is a plan view of one embodiment of sheet transfer apparatus constructed in accordance with the present invention;

FIG. 2 is a side elevation of the apparatus in the rest position;

FIG. 3 is a similar side elevation of the apparatus in an operative position;

FIG. 4 is a perspective view of sheet handling apparatus in one example of practical use;

FIG. 5 is a diagrammatic view of the automatically controlled sheet transfer operation of the apparatus;

FIG. 6 is a perspective view of one step in the sheet transfer operation;

FIG. 7 is a perspective view of the base framework of the apparatus;

FIG. 8 is a perspective view of the carriage of the apparatus;

FIG. 9 is a front elevational view of the right hand side of the apparatus as viewed in the direction of arrows 9—9 in FIG. 1;

FIG. 10 is a fragmentary side elevation of one wheel support housing of the carriage;

FIG. 11 is a transverse vertical section as taken on line 11—11 of FIG. 10;

FIG. 12 is an end elevation of the support housing;

FIG. 13 is a transverse vertical section taken on line 13—13 of FIG. 11;

FIG. 14 is a plan view of one vacuum cup support arm of the sheet transfer apparatus;

FIG. 15 is a side elevation of the support arm;

FIG. 16 is a view of the bottom of the support arm;

FIG. 17 is a transverse vertical section of a vacuum cup assembly;

FIG. 18 is a fragmentary detail view of the vacuum cup assembly;

FIG. 19 is a fragmentary plan view of a sheet support frame mounted on the carriage;

FIG. 20 is a side view of the support frame as viewed in FIG. 19;

FIG. 21 is a transverse vertical section as taken on line 21—21 of FIG. 20;

FIG. 22 is a longitudinal vertical section of a cylinder assembly for rotating the vacuum frame of the sheet transfer apparatus and as taken on line 22—22 of FIG. 1;

FIG. 23 is a plan view of the cylinder assembly of FIG. 22;

FIG. 24 is a transverse vertical section of the sheet handling apparatus as taken on line 24—24 of FIG. 1;

FIG. 25 is a longitudinal vertical section of a cylinder assembly for producing motion of the vacuum cup arms and as taken on line 25—25 of FIG. 24;

FIG. 26 is a longitudinal vertical section of one control device for the cylinder assembly of FIG. 25, and as taken on line 26—26 of FIG. 24;

FIG. 27 is a longitudinal vertical section of a second control device for said cylinder assembly as taken on line 27—27 of FIG. 24;

FIG. 31 is a longitudinal vertical section of one control device for the hydraulic system and as taken on line 31—31 of FIG. 28;

FIG. 32 is a transverse vertical section as taken on line 32—32 of FIG. 31;

FIG. 33 is a longitudinal vertical section of a second control device for the hydraulic system and as taken on line 33—33 of FIG. 28;

FIG. 34 is a transverse vertical section as taken on line 34—34 of FIG. 33;

FIG. 35 is a horizontal sectional view of a hydraulic supply manifold as taken on line 35—35 of FIG. 7;

FIG. 36 is a transverse vertical section as taken on line 36—36 of FIG. 35;

FIG. 37 is a horizontal section of a hydraulic distributor manifold as taken on line 37—37 of FIG. 8;

FIG. 38 is a transverse vertical section of the distributor manifold as taken on line 38—38 of FIG. 37;

FIG. 39 is a horizontal section of the distributor manifold as taken on line 39—39 of FIG. 38;

FIG. 40 is a fragmentary side elevation of the distributor manifold;

FIG. 46 is a fragmentary side elevation of a regulator valve assembly as viewed in the direction of arrows 46—46 of FIG. 23;

FIG. 47 is a detail view of the valve assembly as taken on line 47—47 of FIG. 46;

FIG. 48 is a detail view of the cam actuator for the valve assembly;

FIG. 49 is a horizontal section as taken on line 49—49 of FIG. 46;

FIG. 50 is a fragmentary side elevation of a second regulator valve assembly as viewed in the direction of arrows of FIG. 1;

FIG. 51 is a detail view of the valve assembly as taken on line 51—51 of FIG. 50;

FIG. 52 is a detail view of the cam actuator as taken on line 52—52 of FIG. 50;

FIG. 53 is a fragmentary front elevation of the sheet handling apparatus and a control device for the frame swinging cylinders FIG. 53 is taken in the direction of arrows 53—53 of FIG. 1;

FIG. 54 is a longitudinal vertical section of the control device as taken on line 54—54 of FIG. 53;

FIG. 55 is a longitudinal vertical section of a control device for the cylinder assembly of FIG. 25 and as taken on line 55—55 of FIG. 1;

FIG. 56 is a transverse vertical section of the control device as taken on line 56—56 of FIG. 55;

FIG. 60 is a diagrammatic view of the electric control system;

FIGS. 61, 62 and 63 are diagrammatic views illustrating the sequential steps of operation during which a glass sheet is engaged and removed by the vacuum cups;

FIG. 66 is a side elevation of a distance gaging device as viewed in the direction of the arrow line 66—66 of FIG. 65;

FIG. 67 is a horizontal section of the gaging device taken on line 67—67 of FIG. 66; certain of the parts of the device having been moved from the positions of FIG. 66;

FIG. 68 is a fragmentary side elevation of the gaging device to illustrate a second position of the gaging parts;

FIG. 69 is a fragmentary front elevation of the gaging device;

FIG. 70 is a fragmentary elevation of the side of the gaging device opposite to that of FIG. 66;

FIG. 75 is a horizontal section taken on line 75—75 of FIG. 66;

FIG. 76 is a transverse vertical section taken on line 76—76 of FIG. 75;

FIG. 77 is a longitudinal vertical section taken on line 77—77 of FIG. 64;

FIG. 79 is a plan view of additional control devices;

FIG. 80 is a side elevation of the control devices of FIG. 79;

Figure 28:
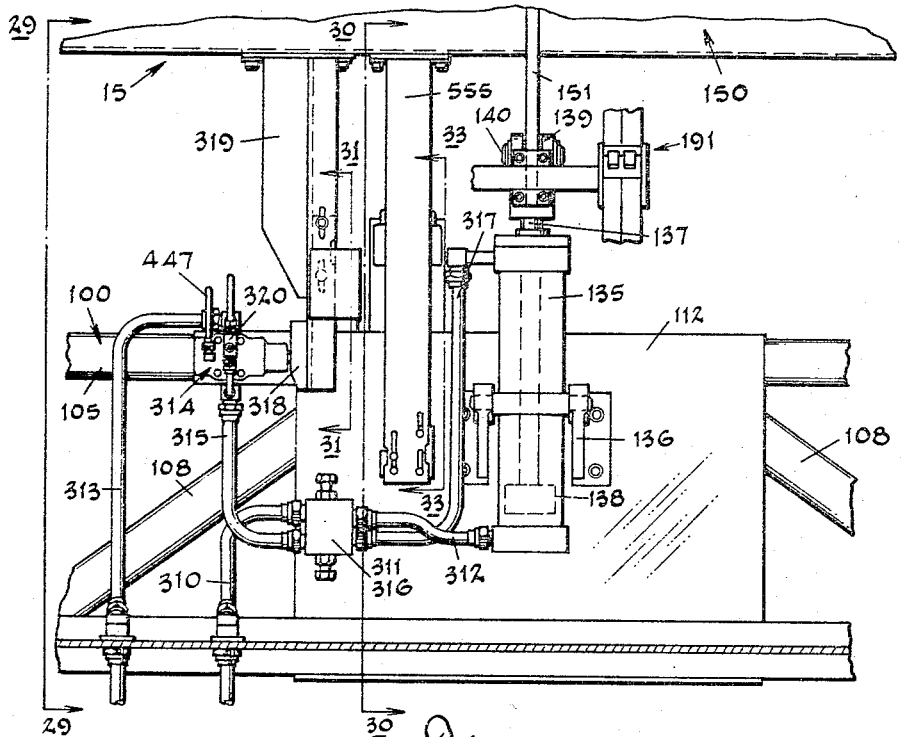
FIG. 28 is a plan view of the hydraulic system operatively interconnecting the carriage and the base framework of the apparatus.
Figure 29:
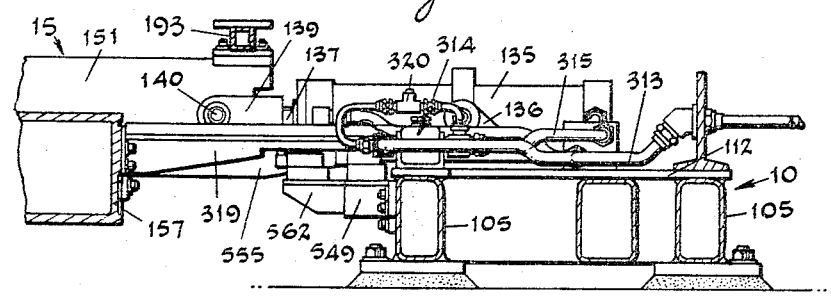
FIG. 29 is a longitudinal vertical section of the hydraulic system as taken on line 29—29 of FIG. 28.
Figure 30:
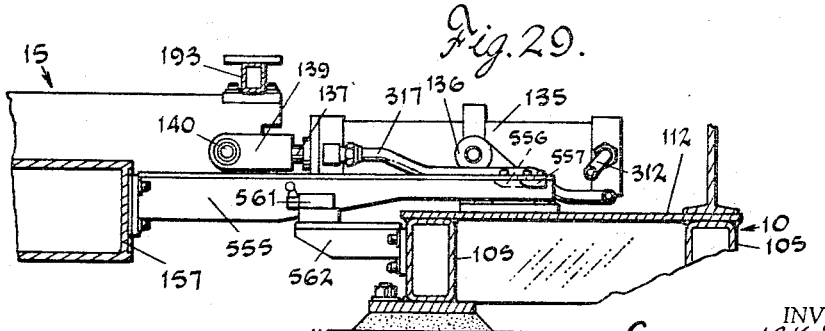
FIG. 30 is a similar longitudinal vertical sectional view of the hydraulic system as taken on line 30—30 of FIG. 28.

Referring now more particularly to FIGS. 1, 2 and 3, there is shown a transfer apparatus constructed in accordance with the invention and designated in its entirety by the letter A. Generally speaking, the apparatus comprises a base framework, more fully illustrated in FIG. 7 and designated by the numeral 10, and a vacuum handling means including a carriage designated by the numeral 15 as in FIG. 8, and a vacuum cup support frame 20. As will be more fully hereinafter set forth in detail, the framework 10 is adapted to be positioned between a horizontally disposed source of conveyance of the glass sheets or plates and a storage or transfer rack on which the sheets are supported on edge in face to face stacked relation in a substantially vertical plane. The carriage 15 is mounted for reciprocal movement relative to the base framework 10 while the vacuum cup frame 20 is supported on the carriage 15 for pivotal swinging motion to suitably transfer a sheet or plate of glass from one plane in which it is supported to a second plane for its support.

*General operation*

Briefly stated, the transfer apparatus A, as shown in FIG. 4, is adapted, in one instance of its use, to remove an individual sheet or plate of glass S from its stacked relation in an inclined plane with like sheets ST on a storage or transfer rack B and to transfer the sheet into position for delivery onto a horizontally disposed conveyor C. As herein shown, apparatus A is positioned adjacent at least one or a second and like apparatus whereby the sequences of operation of the apparatus can, if desired, be in timed relation to those of the adjacent apparatus. It is believed understandable that the alternate manner of delivery of sheets will insure a steady flow of sheets in succession along the conveyor to maintain the required uniformity of production operation. By way of example, this permits one apparatus to sequentially carry out the transfer operation while an adjacent apparatus is rendered idle due to reloading or replacement of a transfer rack or for other reasons.

Referring now to FIG. 5, as well as FIGS. 2 and 3, it will be noted that the framework 10 of apparatus A is suitably spaced from the storage or transfer rack B to permit horizontally directed reciprocal movements of the carriage 15 from the full line position (FIG. 2) to a forward position (FIG. 3) adjacent the rack B as indicated in broken line. During forward movement of the carriage, and also during the rearward movement thereof, the vacuum cup frame 20 is first caused to swing upwardly and forwardly from a substantially horizontal plane, and in the direction of the arrow indicated by letter U to receive a glass sheet S and to then swing downward and rearwardly with the sheet engaged thereby. Obviously enough, the distance of forward movement of the carriage is determined by the total thickness of the stacked glass sheets and such distance thus is increased automatically as the sheets are individually removed.

One novel feature of this invention resides in the manner in which a sheet is removed by the vacuum frame 20 from the surface of the next adjacent sheet in the stack. One reason for this is that when a number of relatively large size, substantially smooth surfaced sheets or plates of glass are stacked on edge one against the other, their contacting or engaging surfaces are sufficiently planular as to void the air from the space therebetween. The resulting surface cohesion of one sheet to another materially reduces the efficiency and ease with which the sheets can be mechanically removed from the stack without manual intervention. The rapid separation and removal of one sheet from a stack has previously been accomplished by slowly sliding or shifting the sheet relative to and across the surface of the next adjacent sheet. However, as will be herein more fully described in detail, vacuum cups on vacuum frame 20 are mounted for movement perpendicular to the surface of the sheet and within an arc of relatively small radius and in such a manner that, while so moving as a group, the vacuum cups, in spaced rows, function to progressively lift the outermost sheet from the surface of the next adjacent sheet along the opposite marginal areas M of its vertical edges and then inwardly toward the central area. These actions are illustrated in FIG. 6 wherein the surface of the sheet S in full line is substantially planular. Now, as the sheet is removed upwardly and rearwardly in the direction of the arrow designated by the letter R, the sheet is initially slightly deflected into a substantially curved plane about its perpendicular axis as indicated by the curved broken lines L. This occurs momentarily before the vacuum cup frame 20 swings pivotally downward and rearwardly and thus as the outermost sheet is bodily removed, the surface thereof has been freed from cohesion with the surface of the next adjacent sheet of the stack by an apparent "peeling" or separation of the sheet along the marginal areas of its vertically disposed edges and then progressively inward toward the center area.

In order to cause the reciprocal movements of the carriage 15, the pivotal swinging movements of the vacuum frame 20 and the initial movements of the vacuum cups in properly timed sequences of operation, there is herein provided a hydraulic system generally designated by the numeral 30 (FIG. 59) which, in one way or another, is activated by an electric control system designated generally by the numeral 50 (FIG. 60).

*The base framework*

As viewed in FIG. 7, the base framework 10 comprises a main body 100 formed by vertical walls 101 and 102, which are equally spaced in parallel relation from the longitudinal axis of said body, and integrally interjoined by a forward transverse beam 103, medial pair of beams 104 and rearwardly disposed pair of beams 105. These principal members of the base framework are suitably supported in the well known manner by plates 106 on the factory floor and reinforced where needed by gusset plates 107 and cross beams 108. The upper margins of the walls 101 and 102 are similarly formed with grooved flanges 109 in which carriage rails or support tracks 110 are secured by bolts 111 (FIG. 12). A platform 112 is fixedly mounted on the pair of rearmost beams 105 and is located in the longitudinal axis of the framework. Also carried by the outermost beam 105 is a transversely disposed beam 113 (FIGS. 1 and 2) which forms one end support for a conveyor generally designated by the numeral 114.

This conveyor comprises a plurality of endless belts 115 which are sequentially operated to carry a sheet or plate of glass or other material, in one embodiment of the invention, from a horizontally disposed position above the vacuum cup frame 20 and in a rearward direction onto a conveyor C. For this purpose, the belts 115 are arranged in parallel with the longitudinal axis of the apparatus generally and equally spaced relation to one another. Thus each belt 115 is trained at one end about a related pulley 116 keyed on a shaft 117 which is journaled in bearings 118 mounted on the beam 113, as in FIG. 1. As will be seen in FIG. 2, one end of shaft 117 is equipped with a sprocket gear 119 that is coupled by chain 120 to a drive sprocket 121 on the output shaft 122 of a source of power 123. As will be more fully hereinafter described, the power source 123 is conventionally equipped with electrically controlled clutch and braking devices which cause the conveyor 114 to be operated in timed sequence to the return of the vacuum cup frame 20 to its lowermost rest position or in response to operation of the associated conveyor C. It is also contemplated that the conveyor 114 will be rendered operable according to and in timed relation with the sequential operation of the like conveyor 114 of an adjacent transfer apparatus.

Each of the belts 115 is trained at its opposite end about a pulley 125 (FIGS. 2, 3 and 9) that is rotatably mounted by a bracket 126. These brackets are adjustably carried by a support bar 127 in each instance, to regulate the tension of the belts. Each bar 127 is supported at the forward end of the framework by a vertical pedestal 128 secured to the forward beam 103 and by a plate 129 fixed on the beam 113. Each bar on its upper surface is provided with a rail 130, as of wood or like non-abrasive materials, for supporting the upper flight of the related belt and with idler pulleys 131 on the lower surface thereof to carry the lower belt flight. It will thus be generally understood that the vacuum cup frame 20 in a substantially horizontal although not completely in its rest position, can support a sheet or plate of glass above the several belts 115 of the conveyor 114 until said frame 20 and the carriage 15, on which it is carried, have been brought to a halt at the limit of their rearward movement. The base framework 100 is operatively associated with the carriage 15 to produce the forward and rearward movements thereof by means of a hydraulic cylinder 135, mounted by bracket 136 on the platform 112 (also see FIG. 28). For this purpose, the outer end of rod 137, associated with contained piston 138, has a connector block 139 secured by pin 140 to the carriage 15 in a manner to be hereinafter described.

*The carriage*

As viewed in FIGS. 1 and 8, the carriage 15 of the sheet transfer apparatus is a substantially rectangular member having a body or chassis 150 formed with a centrally disposed vertical wall 151 located in parallel with the longitudinal axis of the apparatus generally, oppositely disposed, parallel side walls 152 and 153, and a horizontally disposed platform wall 154 integrally interjoining the walls 151, 152 and 153. The platform wall 154 has a forwardly directed sloping section 155 which terminates considerably inward from the forward ends of the center and side vertical walls 151, 152 and 153 and a rearwardly directed horizontal flat section 156 terminating inwardly of the respective rear ends of the said vertical walls. The platform wall is reinforced by integral transverse walls indicated at 157. Also, the aforementioned connector block 139 is connected by pin 140 to the rear end of the medial vertical wall 151.

The chassis 150 is adapted to be mounted for reciprocal movement relative to the base framework 10 by means of caster wheel assemblies generally designated by the numeral 160 and located at the respective corner areas of the chassis. With reference to FIGS. 10 to 13 inclusive, each caster wheel assembly is incorporated in a housing 161 having an inner wall 162, outer wall 163, end walls 164 and top wall 165. The housing is further formed with outwardly directed flanges 166, in plane with the inner wall 162, through which are passed bolts 167 that are threaded into mounting plates 168 integral with the respective side wall 152 or 153. The assemblies 160 are thus adapted to be associated in longitudinally related pairs to properly locate caster wheels 169 in transversely aligned and mounted relation to a track 110 on either the wall 101 or 102 of the framework 100. To this end, the walls 162 and 163 are bored with aligned openings to receive a wheel shaft 170.

As best seen in FIGS. 11 and 13, each shaft 170 has inner and outer concentric portions 171 and 172, respectively, and a medial eccentric portion 173 on which the journal bearing 174 for the caster wheel is mounted; the shaft portion 171 being supported in the inner housing wall 162 and the outer shaft portion 172 being similarly supported in the outer wall 163. The eccentric shaft portion 173 permits radial adjustment of the wheel to raise or lower the adjacent corner of the chassis with reference to the associated track 110 and thereby initially adjusting the elevation of the chassis to insure accurate movement of the same bodily in a substantially true horizontal plane. For this purpose, the outer end of each shaft portion 172 is equipped with an integral circularly notched plate 175 having a square lug 176 for engagement by a manually employed wrench. The plate 175 and shaft 170 bodily are locked in an adjusted position by a bolt 177 threaded into the wall 163 and registering with a notched opening in said plate. If desired, suitable legends, such as "D" and "U", can be applied to the surface of the plate for convenient reference to the direction in which the shaft is to be turned to raise or lower the associated wheel 169.

Each housing is also equipped with guide rollers 178 carried by a bracket 179 attached to the lower surface of outer wall 163 and adapted to move in rolling contact with a finished lower surface of the flange 109 in which the tracks 110 are located as hereinabove described. As seen in FIG. 10, the guide rollers 178 are equally spaced from a vertical plane through the axis of the associated caster wheel 169 and thus function to stabilize the rolling action of said wheel during reciprocal movements of the carriage. The housings are further equipped with wiper elements 180 carried by means of screw supported plates 181 on the end walls 164 whereby any accumulation of reasonably expected dirt and other adhering particles on the tracks 110 will be continually removed and undesired clogging of the tracks and associated caster wheels 169 thereby prevented.

Upon further reference to FIG. 8, carriage 15 will be seen to be provided at the forward ends of the walls 151, 152 and 153 with hubs 184 for receiving trunnions or stub shafts 185 on which the vacuum cup frame 20 is rotatably carried as will be more fully hereinafter described. Generally speaking, these hubs 184 of the vertical walls are bored as at 186 (FIG. 24) to receive a bearing 187 which is retained therein by keeper plates 188; suitable sealing glands being located between the opposed end surfaces of the bearing and the plates in a conventional manner.

The carriage 15 further supports necessary elements of the transfer apparatus and the outer side walls 152 and 153 are thus formed with mounting recesses 189 on their upper marginal areas. Also the forward wall section 155 of the platform 154 is provided with finish pad surfaces 190.

In order to suitably support a sheet or plate of glass above the vacuum cups of the frame 20, the carriage 15 is equipped with support structures 191 adapted to support the sheet in a substantially horizontal plane in closely spaced relation to the upper flights of the conveyor belts 115 until the carriage is brought to a halt at the end of its rearward motion. Each support structure 191 includes a horizontally disposed bar 192 supported by brackets 193 on each side of the side walls 151, 152 and 153 adjacent the opposite ends thereof. Upon reference to FIG. 1, it will be seen that the support structures 191 are substantially equally spaced from one another as well as the conveyor belts 115 between which they are located.

Referring now to FIGS. 19, 20 and 21, each bar 192 is provided on its upper surface with longitudinally spaced pairs of rollers 194 the axles of which are mounted in brackets 195. Protective shields 196 are located on the bars 192 and suitably spaced between the pairs of rollers 194. It will also be noted that the bars 192 are arranged in spaced parallel relation to the rows of vacuum cups on the frame 20 which will now be described.

*The vacuum cup frame*

As viewed in plan in FIG. 1, the vacuum cup frame 20 is formed by a transverse, horizontally disposed beam 200 to the rear surface of which are fixedly mounted support arms. To clarify identification of these arms and thus define operational and/or structural differences therebetween, they will be designated in relation to their individual position relative to the longitudinal axis of the transfer apparatus. Thus arms 201 and 202 comprise the inner pair, arms 203 and 204 the so-called "inner intermediate" pair; arms 205 and 206 the "outer intermediate" pair and arms 207 and 208 the oppositely disposed outer pair. It is also to be noted that each arm carries a group of five vacuum cups 209.

Generally speaking, the beam 200 is equipped along its bottom surface with pairs of trunnion blocks 220 (FIG. 9) substantially equally spaced on opposite sides of bearings 187 mounted in the forward ends or hubs 184 of the carriage vertical walls 151, 152 and 153. Each block is bored as at 221 (FIG. 24) to receive the respective end of a stub shaft 185; the same being rigidly secured to said block by means of a set screw 222. The beam 200 is thus the basic support for the vacuum cup frame 20 on the carriage 15 and is mechanically coupled to said carriage for swinging motions in a vertical plane about the aligned axes of the shafts 185. For this purpose, hydraulically actuated cylinders 224 are mounted on the carriage 15 with the piston rods 225 thereof connected to the beam 200.

More particularly, as seen in FIGS. 1, 22 and 23, each cylinder 224 is pivotally supported on an axle 226, the ends of which are carried by a bracket 227 that is adjustably secured in a mounting recess 189 of the chassis walls 152 and 153. At its outer end, the rod 225 of each piston 228 is provided with a connector 229 supported by cross pin 230 in a bracket 231 securely mounted on the rear surface of the beam 200. Cylinders 224 are associated with the hydraulic system 30, in a manner to be later described.

With reference now to FIGS. 14 to 18, inclusive, the structure of the support arms 201-208 is shown and in general is typical to all of the arms. Thus, each support arm comprises a base frame 240 and a vacuum cup bar 241. It is appreciated that this is a broadly acceptable title for each of these parts since, as viewed in FIGS. 15, 16 and 24, the base frame 240 includes rectangularly arranged columns 242, with reinforcing bars 243, of tubular cross-section to maintain their weight at a minimum. Each vertically opposed pair of columns 242 is equipped with a plate 244 by which the frame 240 is bodily secured to a plate 244′ on the rear surface of beam 200 by bolts 245 (FIGS. 15 and 16) whereby the frames 240 are located substantially perpendicular to said rear surface of the beam and likewise in a horizontal plane when the frame 20 is in the rest position.

On the upper surfaces of the topmost columns, there are mounted spaced pairs of brackets 246 in which axles 247 and 248 for bell-crank levers 249 and 250 are journaled. It is on the arm 251 of each lever that a vacuum cup bar 241 is pivotally mounted. As viewed in FIG. 15 it is believed clearly apparent that when the bell-cranks are operatively swung about the axes of axles 247 and 28, the related bar 241 will radially move as one side of a parallelogram in relation to the associated base frame 240.

More particularly, the opposite arms 252 of the bell-crank levers 249 and 250 are interconnected by a link 253 and to a pivot lever 254 by link 255; the same being of adjustable length through double and oppositely threaded bolt member 256. As will be seen in detail in FIGS. 1, 14 and 24, the pivot lever 254, associated with each support arm 201-208 inclusive, is fixed on a transversely disposed, so-called "rock" shaft 257 that is rotatably carried by the beam 200 by means of bearing brackets 258. In this connection, it will be noted in FIGS. 22 and 24 that the brackets 231 are formed with suitable apertures for shaft 257 to pass freely therethrough.

Figure 57:
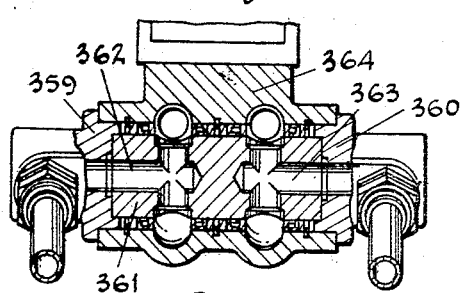
FIG. 57 is a vertical detail section of a hydraulic swivel joint assembly.

Referring to FIGS. 1 and 24, it will be noted that the rock shaft 257 medially between support arms 201-203 and 202-204 is operatively connected to actuator cylinders 260. For this purpose, each cylinder is pivotally supported in the lower end of a related bracket 261 which is mounted on a plate 259 fixedly secured to the rear surface of beam 200. A connector 262 on the outer end of the rod 263 of piston 264 is joined to a lever 265 by axle pin 266. In order to support the radial thrust of the levers 265 when motivated by the cylinders 260, each bracket 261 is provided at its upper end with spaced bosses 267 containing bearings 268 in which shaft 257 is journaled. Also each cylinder 260 is connected to hydraulic system 30 by flexible conduits 269 and 270 from a swivel joint assembly 271 secured to the bottom surface of the beam 200 (FIG. 57).

With more specific reference to the vacuum bar 241 of each support arm 201-208 inclusive, the same is formed by a pair of spaced tubular members 275 interconnected at their ends and medially therebetween at spaced intervals by braces 276. The aforementioned vacuum cups 209 are movably supported between and on the columns 275 in a manner disclosed in FIG. 17. Generally stated, each cup 209 includes a flexible or rubber suction face element 277 and a metal backing plate 278 having an internally threaded axial boss 279 adapted to receive the screw end of a cylindrical mounting plug 280 having an axial passageway and an enlarged head 281 at its opposite end. The plug 280 is slidably mounted in the hollow hub 282 of a bracket 283 secured to plates 284 on the undersurface of columns 275 by bolts 284′. A coil spring 285, interposed between the backing plate 278 and bracket 283 and encircling the hub 282, serves to normally and resiliently support the vacuum cup in its outermost position which is determined by the length of the plug 280 between the head 281 thereof and the rear surface of the boss 279. Otherwise stated, the distance which the cup 209 can be moved inwardly is controlled by the length of plug between the opposed surfaces of the boss 279 and of the hub 282. This definition of permitted movement is clarified to some extent upon further examination of FIG. 17 wherein the surface of the outer rim of the vacuum cup is indicated in full line and by three substantially equally spaced broken lines. In other words, in the fully extended position, the rows of vacuum cups on support arms 201-202 is represented by the broken line $a$; of the rows of cups on support arms 203-204 by the next broken line $b$; of the rows of cups on arms 205-206 by the broken line $c$ and of the rows of cups on support arms 207-208 by the full line $d$ or the surface of the peripheral rim of the vacuum cup herein illustrated. The actual difference in height between the respective rows of cups is relatively small and, by way of example, may be in the order of $3/64$ of an inch or $9/64$ between the inner arms 201-202 and the outer pair of arms 207-208.

To explain, it was earlier stated that, when the vacuum cups are engaged with a sheet or plate of glass and then carried rearwardly, an initial separation of the sheet from the surface of the next adjacent sheet is effected along the outer marginal areas of the sheet and then progressively inwardly toward the central area of the sheet (FIG. 6). This is due to the fact that when the vacuum cups 209, as an entirety, are brought into engagement with the outwardly directed surface of the glass sheet, the cups on the inner pair of arms 201-202 will first engage said surface, then the cups on the inner intermediate pair of arms 203-204, subsequently the cups on the outer intermediate pair of arms 205-206 and finally the cups on the outer arms 207-208.

Thus when the beam 200 of vacuum cup frame 20 is swung during operation of cylinders 224 about the aligned axes of stub shafts 185, the rigidly mounted arms 201-208 will be swung in a forward and upwardly directed path from the substantially horizontal rest position (as in FIG. 2) to an angular plane substantially parallel with the plane in which the glass sheets S are arranged on edge one against another on the storage rack or buck B (as in FIG. 3). The vacuum cup frame 20 while being thus arcuately pivoted or swung is of course simultaneously carried forwardly by movement of the carriage 15 relative to the base framework 10. Accordingly, until forward movement of the carriage is halted, the vacuum frame 20 is bodily carried forward and in consequence the rows of vacuum cups 209 from the center outwardly are progressively brought into full engagement with the surface of the immediate sheet to be removed and transferred.

Before reverse movement of the carriage 15 and vacuum cup frame 20 occurs and through the medium of controls to be later described, a preparatory movement is carried out in which the carriage is retracted slightly and the rows of vacuum cups 209 are caused to retract from the vicinity of the stacked sheets thereby effecting first separation of the immediate sheet along its opposite vertical edges as by the cups on arms 207-208, then the cups on arms 205-206, 203-204 and finally by the cups on arms 201-202 in the central area of the sheet. The cylinders 260 are then activated to rotate the shaft 257 and, through levers 254, links 253 and 255 and bell-crank levers 249 and 250, move the bar members 241 toward their associated base frames 240 thus producing upward lifting of the sheet from the stack. This produces not only an increment of upward movement of the sheet but also importantly a temporary bowing thereof about its vertical axis and consequent "peeling" of the sheet surface from the surface of the next adjacent sheet. This serves to reduce, if not completely eliminate, any possibility for the surfaces of the sheets to be marred, by scratching, during movement of one sheet relative to the adjacent sheet.

The vacuum cups 209 are individually connected to a source of vacuum by sections of tubing 287 (FIGS. 15 and 18) attached at one of their ends to the head 281 of the related cup mounting and at their opposite ends to a distributor pipe 288 carried by a tubular member 275 of each support bar 241. At one or its end adjacent the beam 200, each pipe 288 is connected through flexible tubing 289 and pipe 290 to a pipe 291. As seen in FIG. 1, two of these pipes are provided and secured on the upper surface of the beam 200 thereby supplying the four rows of vacuum cups located on the respective sides of the apparatus from the longitudinal axis thereof. To render a row of vacuum cups inactive as when the cups on the outer pair of arms 207-208, or even those on the pair of arms 205 and 206, are not required for satisfactory operation of the transfer apparatus, a manually operable valve 292 is located between each of the pipes 290 and related flexible tubing 289.

Figure 58:
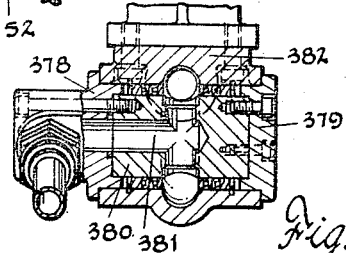
FIG. 58 is a similar detail view of a second form of swivel joint assembly.

As shown in FIGS. 1 and 24, each pipe 291 is connected by pipe section 293 (FIG. 9) to a swivel joint assembly 294 (FIG. 58), one of which is located adjacent each end of the beam 200.

The hydraulic system

Figure 59:
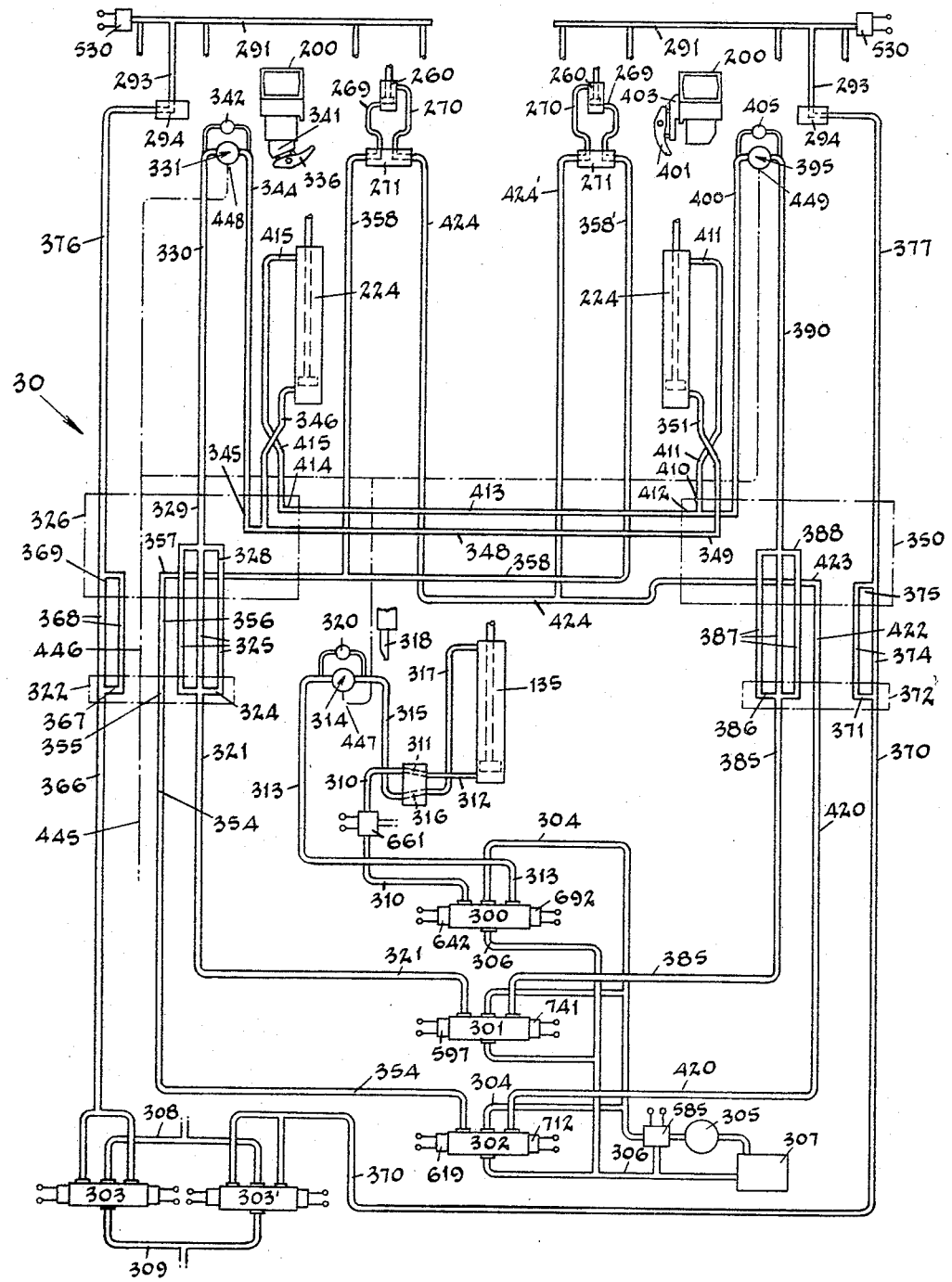
FIG. 59 is a diagrammatic view of the hydraulic system of the sheet handling apparatus.

In its broadest aspects, the hydraulic system 30, associated with the sheet transfer apparatus A and shown in general detail in FIG. 59, produces forward and rearward motions of the carriage 15, the upward and downward swinging motions of the vacuum cup frame 20 and the radial motions of the vacuum cups support bars 241 relative to the base frames 240 therefor. These several sequentially occurring phases of each operating cycle are caused to precede one another in properly timed order by the provision of suitably positioned limit switches, as shown in the electricity circuitry diagram of FIG. 60 as well as in their mounted positions illustrated in several of the related figures of the drawings. Generally speaking, the carriage 15 is caused to move forwardly and back, as above described, during the application of pressure to the cylinder 135 from the four-way valve 300; the vacuum frame 20 to pivotally swing upwardly and downwardly during the application of pressure to the cylinders 224 from the four-way valve 301 and the vacuum cup bar 241 to move radially upon the direction of pressure to the cylinders 260 from the four-way valve 302. Additionally, the plurality of vacuum cups 209 are connected alternately to a vacuum source or a source of air pressure at valves 303 and 303'. Thus, the valves 300, 301 and 302 will be understood to be connected to a source of hydraulic pressure through supply pipe 304 from pump 305 and by return pipe 306 to a sump or supply tank 307. The valves 303 and 303' are likewise connected to a vacuum source by pipe 308 and to a source of air pressure by pipe 309.

More particularly, the valve 300 is connected to cylinder 135 at the rear end thereof by pipe 310 which is connected through a holding valve 311 and pipe 312 to said cylinder. Valve 300 is also connected to the forward end of cylinder 135 by pipe 313 through an adjustably regulated flow valve 314 and pipe 315, which like pipes 310 and 312, is connected through a holding valve 316 and pipe 317 to said forward end of the cylinder. The direction of pressure through pipes 310-312 and 315-317 is controlled by their respective holding valves 311 and 316 to reduce, if not eliminate, any so-called "creeping" of the carriage. The flow valve 314, as also seen in FIGS. 28, 31 and 32, is adapted to be actuated as the carriage approaches the limit of its rearward movement, to gradually reduce the amount of fluid pressure flowing from pipe 313 to pipe 315 and thereby off-set sudden jarring of the carriage as it is brought to a halt. Valve 314 operates in response to a cam bar 318 carried by an arm 319 affixed to the rear transverse carriage wall 157. Pipes 313 and 315 are additionally interconnected through a by-pass valve 320 and suitable tubing to prevent the creation of a "static" pressure condition in said pipes. Otherwise stated, the by-pass valve 320 shunts sufficient pressure to return from the forward end of cylinder 135 around the flow valve 314 to enable initial forward motion of the carriage until the cam bar 318 is disengaged from the plunger of valve 314.

Since the continuous application of pressure to both ends of the pairs of cylinders 224 and 260 as well as of vacuum and air pressure to vacuum cups must be maintained during the reciprocal movements of the carriage, means is herein provided in the form of flexible tubings connected on each side of the apparatus to supply manifolds mounted on the base framework 10 and distributor manifolds similarly mounted on the carriage 15. Thus valve 301 is connected by pipe 321 to a supply manifold block 322. As seen in FIGS. 7 and 35, supply manifold block 322 is mounted by flanges 323 on a support plate 106 for the main body 100 of the base framework 10. As seen in FIG. 35, pipe 321 communicates with an axially disposed passageway 324 in said manifold block which passageway also connects to lengths of U-shaped flexible tubing 325, at least three tubings being herein provided. The flexible tubing members 325 at their opposite ends are attached to a distributor manifold block 326, exemplary detail views of which are shown in FIGS. 37 to 40 inclusive. The manifold block, as seen in FIGS. 8 and 37, is provided with flanges 327 by means of which said block is rigidly mounted at the rear end of side wall 153 of the carriage 15. The flexible tubings 325 thus communicate with an axially disposed passageway 328 having an angularly disposed passageway 329 (FIG. 38) to which is connected a pipe 330. Pipe 330 is connected at its opposite end to a controllably regulated flow valve 331 carried at the forward end of carriage wall 153. Now, since the supply pipe 321 is substantially stationarily disposed between the four-way valve 301 and supply manifold block 322 and the pipe 330 is generally supported on the carriage 15 between distributor manifold block 326 and the flow valve 331, it is believed apparent that the said pipes 321 and 330 can be substantially rigid members adapted to carry sufficient pressure to the pair of cylinders 224 to satisfactorily swing the vacuum cup frame 20. On the other hand, the flexible lengths of tubing 325 between manifold blocks 322 and 326 are calculated to carry proportionately equal amounts of the required pressure without objectionable rupture during their repeated deformation as will be seen in their comparative positions of FIGS. 2 and 3.

The flow valve 331, which may be seen in detail in FIGS. 46, 47 and 48, comprises a mounting block 332 affixed to the carriage wall 153 and having passageways 333 and 334 (FIG. 49) formed therein. On its outwardly directed surface, block 332 supports a valve 335 adapted to be actuated by a cam bar 336. As viewed in FIG. 46, this bar has a generated surface 337 which surface can be adjustably oriented about the axis of shaft or shoulder bolt 338, on which the bar 336 is pivotally supported, by set screws 339 and 340. Shoulder bolt 338 is carried by a bracket 341 affixed to a trunnion block 220 on the undersurface of the beam 200; said bracket having finished surfaces against which the screws 339 and 340, above and below the bolt 338, can be turned to pivot the cam bar and thereby orient or position the surface 337 thereof according to the timed sequence of control that the surface 337 will effect the regulated flow of hydraulic pressure through the flow valve 335 during engagement with the plunger thereof. The cam bar 336 being mounted on the beam 200 is carried therewith during forward and upward swinging movement of the vacuum cup frame 20 and the surface 337 consequently is effective only during the final increments of such upward movement to progressively reduce the rate of movement of the frame toward the stack of glass sheets. The set screws 339–340, above described, are therefore adapted to adjust the position of cam bar 336 and thereby the generated surface thereof. By means of tubing pieces, a by-pass valve 342 is adapted to "bleed" a desired amount of fluid between passageways 333 and 334. Additionally, the mounting block 332 is formed at its upper end with a support bracket 343 on which one or the forward end of an adjacent support structure 191 is secured.

With further reference to FIGS. 49 and 59, pipe 330 connects with passageway 333 (by way of example) in mounting block 332 and through flow valve 335 and passageway 334 communicates with pipe 344 which connects to passageway 345 in the distributor mounting block 326. Passageway 345 connects to pipe 346 and by a suitable pipe fitting 347 to one end of pipe 348 (FIGS. 40 and 59). In the other hand, pipe 348 communicates through passageway 349 (FIG. 43) in a second distributor manifold block 350 with pipe 351, the block 350 being mounted by flanges 352 on carriage wall 152. Pipe 346 is thus connected at the rear end of cylinder 224 situated on the left side of the apparatus A (FIG. 1) while pipe 351 in a like manner is attached to the oppositely disposed cylinder 224. Accordingly, upon the direction of pressure from valve 301 through pipes 321, 330, 344, 346, 348 and 351, the cylinders 224 will simultaneously become effective through piston rods 225 to swing the vacuum cup frame 20 forwardly upward.

Upon subsequent actuation of four-way valve 302, in response to certain switches in the circuitry of FIG. 60 as will be more fully hereinafter explained, the supply pipe 304 is connected by pipe 354 to transverse passageway 355 (FIG. 35) in supply manifold block 322 and thence through flexible tubing 356 with passageway 357 in the distributor manifold block 326 (FIG. 37). Passageway 357 communicates with pipe 358 which with similar pipe 358′ is connected to one side of each of the respective swivel joint assemblies 271. As viewed in FIG. 57, a typical joint of this conventional structure has opposed end fittings 359 and 360 fixed at their inner ends to an annular plug 361 provided with dual passages 362 and 363. The plug 361 is rotatably contained, and sealed by glands, within a casing 364 carried on the undersurface of the beam 200 (FIGS. 9 and 25). As presently described, each of the pipes 358 and 358′ is connected through the related swivel joint assembly 271 to a conduit 269 and cylinder 260 beneath the piston 264 therein. Upon actuation of the pistons 264, the associated rods 263 will be adapted by levers 254 to swing the shaft 257 thereby radially swinging the vacuum cup bars 241 in parallelogram relation to the related base frames 240.

Figure 41:
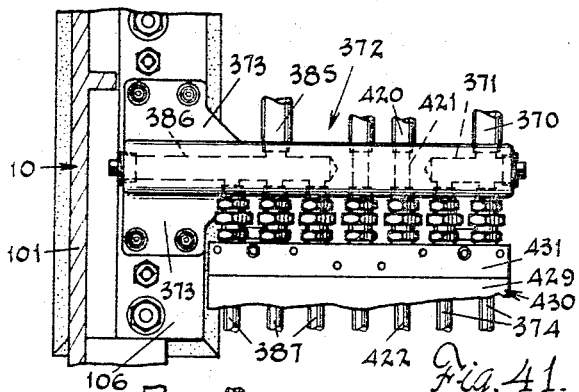
FIG. 41 is a horizontal section of a second supply manifold as taken on line 41—41 of FIG. 7.
Figure 43:
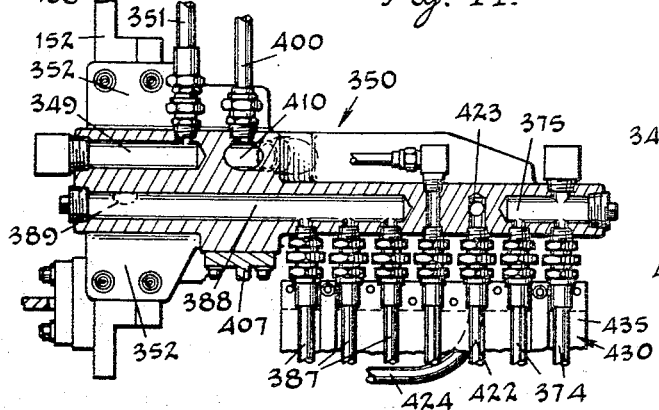
FIG. 43 is a horizontal section as taken on line 43—43 of FIG. 42.
Figure 44:
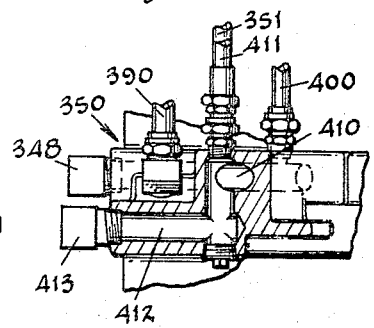
FIG. 44 is a horizontal section as taken on line 44—44 of FIG. 42.
Figure 45:
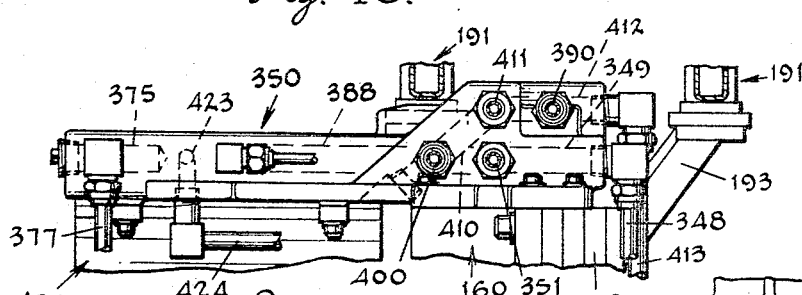
FIG. 45 is a side elevation of the second distributor manifold.

A source of vacuum is connected to the valves 303 and 303′ as by pipe 308 (FIG. 59), while a pipe 366 from pipe 303 communicates through dual passageway 367 in the supply manifold block 322 with lengths of flexible tubing 368 which are connected at their opposite ends to a further dual passageway 369 in the distributor manifold block 326 (FIG. 37). The valve 303′ is connected by pipe 370 with the dual passageway 371 (FIG. 41) in a second supply manifold block 372 mounted by flanges 373 on a support plate 106 associated with side wall 101 of the base framework body 100 (FIGS. 7 and 41). Through lengths of flexible tubing 374, the passageway 371 of supply manifold block 372 communicates with like dual passageway 375 in the second distributor block 350 (FIG. 43). By duplicated arrangements of piping, the passageway 369 in distributor manifold block 326 and passageway 375 in the related manifold block 350 are each connected by pipes 376 and 377, respectively, to the swivel joint assemblies 294, located at the opposite ends of the beam 200 of the vacuum cup frame 20, and thereby to the plurality of vacuum cups 209, as hereinbefore described. As viewed in FIG. 58, a typical swivel joint assembly of this construction includes an end pipe fitting 378 and an end cap 379 which at their opposed inner ends are secured to an annular plug 380. The plug 380 is formed with a passageway 381, communicating with the aforementioned pipes 293, and is conventionally sealed by glands within a casing 382 carried on the undersurface of the beam 200.

In this connection, it is to be noted that for reasons assigned in the preferred use of at least three lengths of flexible tubing 325, at least two lengths of tubing 368 and 374 are employed in the communication of vacuum, and/or air pressure as will hereinafter be described, between the respective supply manifold blocks 322 and 372 and associated distributor manifold blocks 326 and 350.

The pipe 309 connected to the four-way valves 303 and 303′ is employed to direct air of suitably regulated pressure, upon reversal of said valves, through pipes 366–376 and 370–377 to the vacuum cups. This is for the known purpose of providing blasts of low pressure air to effect rapid release of the vacuum cups from the engaged surface of a sheet or plate of glass at the appropriate phase of the transfer operation.

With further reference particularly to FIG. 59, upon reverse operation of the four-way valve 301, the supply pipe 304 will be put in communication with pipe 385 connecting with the axial passageway 386 of the second supply manifold block 372 (FIG. 41). By lengths of flexible tubing 387, passageway 386 is connected to axial passageway 388 of distributor manifold block 350 and by angularly disposed branch passage 389 (FIG. 42) to pipe 390. As in the case of pipe 330 emanating from the first described distributor manifold block 326, the pipe 390 is connected in similar manner to a regulated flow valve generally designated by the numeral 395.

Figure 42:
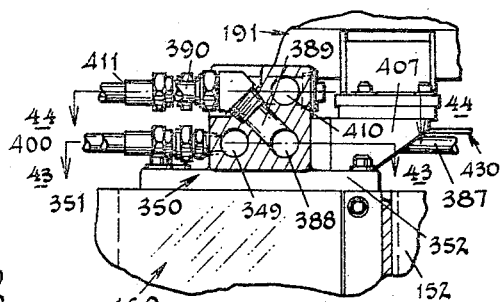
FIG. 42 is a transverse vertical section of a second distributor manifold as taken on line 42—42 of FIG. 8.

This flow valve, as shown in FIGS. 50, 51 and 52, includes a mounting block 396, affixed to the carriage wall 152 and having passageways 397 and 398 therein. On the outwardly directed surface of block 396, a valve 399 is mounted to variably control the flow of hydraulic pressure from pipe 390 to a pipe 400. The valve 399 is actuated by a cam bar 401 adjustably carried by shoulder bolt 402 on a bracket 403 secured to the beam 200. Cam bar 401, similarly to cam bar 336, has a generated surface 404 thereon by which said bar is adapted, during swinging motion of the beam, to engage the plunger of valve 399 to vary the flow of fluid therethrough. In the present instance, the cam bar 401 is positioned to progressively reduce the rate of swinging motion of the beam 200, and vacuum cup frame 20 generally, as the frame is moving rearwardly downward and approaches the rest position in a substantially horizontal plane. Similarly to the pipes 330, 344 and by-pass valve 342 the pipes 390 and 400 through suitable tubing are interconnected through an adjustable by-pass valve 405 which is adapted to shunt restricted amounts of hydraulic pressure around the flow valve 395. Additionally, the mounting block 396 is formed with a support bracket 406 on which is mounted one or the forward end of a support structure 191. In this instance, the opposite or rear end of the support structure is carried by a bracket 407 mounted on the distributor manifold block 350 (FIGS. 42 and 43).

Referring again to FIG. 59 and in timed relation to reversal of the valve 300 to move the carriage 15 rearwardly, pipe 400 at its opposite end connects to passageway 410 in the distributor manifold block 350 (FIGS. 42–45) and thus to pipe 411 communicating with the forward end of one cylinder 224. Through branch passageway 412 in said manifold block, the pipe 400 is in communication with a pipe 413 which pipe at its opposite end is connected through passageway 414 in the distributor manifold block 326 to a pipe 415 attached to the forward end of the associated cylinder 224. Accordingly, upon activation of selected switches of the electric circuitry (FIG. 60), reversal of valve 301 and consequently of pressure to the cylinders 224, the vacuum cup frame 20 will be caused to carry out its rearwardly downward motion. This motion of course is initially interrupted or divided into two phases during the first of which the frame remains stationary while the vacuum cup bars 241 are actutaed to effect separation of one sheet from the surface of the next adjacent sheet and then motion of the frame to carry the sheet downwardly into a substantially horizontal plane. For this purpose, the valve 302 is reversed to connect the pressure supply pipe 304 to a pipe 420.

The pipe 420 connects to the supply manifold block 372 and through passageway 421 (FIG. 41) to the length of tubing 422. This length of tubing communicates through passageway 423 in the distributor manifold block 350 with pipe 424. With branch pipe 424', pipe 424 connects to the opposite ends of swivel joint assemblies 271. In this instance, communication through the respective joint assemblies directs pressure through conduits 270 to the upper ends of the associated cylinders 260. These cylinders, as aforementioned, are adapted to pivot the shaft 257 with resultant radial motion of the vacuum cup bars 241 relative to the respective base frames 240. For reasons to be hereinafter more fully described in connection with an operative cycle of the transfer apparatus, the valve 302 is operatively caused to successively direct pressure through pipes 354 and 420 as the frame 20 begins its forwardly upward movement, in the interval before the frame is swung rearwardly downward and also when the frame again resumes its rest position in the horizontal plane.

As viewed in FIG. 2, the several lengths of flexible tubing 325, 356, 368 and 374, 387, 422, as above described are each attached at one of their ends to a supply manifold block, either 322 or 372, fixedly mounted on the base framework 10 while the opposite end of each length of tubing is similarly attached to a distributor manifold block, either 326 or 350, secured at the rear end of the carriage 15 and consequently movable forwardly and rearwardly therewith. This imposes repeatedly occurring deformation on each piece of tubing as they are bent between the substantially U-shaped form of FIG. 2 and the distended form shown in FIG. 3. To provide a support for each group of flexible tubular pieces, despite repeated flexure, means is herein provided in the form of relatively thin metal shields attached at their opposite ends to the respective stationary and movable manifold blocks. Thus, as viewed in FIGS. 35 and 36, the supply manifold block 322, which is equally true with regard to the manifold block 372, supports brackets 427 including strut members 428. On the upper surfaces of the strut members, the marginal area of one end or leg portion 429 of a U-shaped, relatively thin metal shield 430 is secured to a clamp bar 431 by screws 432, which bar is bolted to the brackets 427 and strut members 428 as at 433. The strut members are arranged between certain of the pieces of tubing and function to support the area of the shield thereabove. Each shield is curvedly bent through a medial bight portion to position the opposite leg portion 435 thereof in fixed relation to a distributor manifold block. One such mounting arrangement is shown in FIGS. 37 and 38, wherein brackets 436 are secured to the undersurface of the manifold block 326. Each bracket is rabbeted as at 437 to receive a clamp bar 438 with its upper surface in plane with the adjoining upper surface 439 of the bracket. The marginal edge area of the end or leg portion 435 of the shield is fixedly located on the clamp bar 438 by means of strut members 440 and bolts 441. Strut members 440 function to prevent upward deflection of the shield, or shields, 430 thereby also supporting the lengths of tubing from undue deformation and/or wear.

In FIG. 59, there is also shown a drain means for withdrawing hydraulic fluid which may undesirably seep through portions of the hydraulic system such as the flow valves 314, 331, and 395 due to temporary surging of the pressure or other reasons. For this purpose, the broken line 445 designates a small pipe or tubing, connected between supply manifold block 322 and distributor manifold block 326 by tubing 446, attached to the flow valve 314 as at fitting 447 (FIG. 28); the flow valve 331 as at 448 (FIG. 47) and the flow valve 395 as at fitting 449 (FIG. 51). From the manifold block 322, the tubing 445 connects conventionally to the sump tank of the system.

With reference now to FIGS. 22 and 23, there is shown one coil spring assembly, generally designated by the numeral 455, which is typical of similar spring assemblies mounted on the carriage 15 at the pad surfaces 190 as shown in FIG. 8. As viewed in this figure, the spring assemblies 455 are located in equally spaced relation on each side of the longitudinal axis of the transfer apparatus and also from the cylinders 224. The assembly 455, shown in detail in FIGS. 22 and 23, by way of example of such assemblies, is located in inwardly spaced relation to the left hand cylinder 224. These assemblies are adapted to mechanically provide a cooperating force, during expansion, to assist the hydraulic pressure directed to the cylinders in initially raising the mass or body weight of the vacuum cup frame 20 from its substantially horizontal rest position and to subsequently provide a flexible factor of resistant force, upon compression, to counterbalance the momentum of the frame as it swings through a vertical plane and approaches the angularly disposed stack of glass sheets on the storage rack. Conversely, the alternately expandable and compressive forces of such spring assemblies function to aid the cylinders 224 while the same are operating to swing the frame 20, with the added weight of a glass sheet, from the angular plane and rearwardly downward to its rest position.

Generally speaking, the spring assemblies 455 are transversely disposed from the longitudinal axis of the transfer apparatus and, as viewed in FIG. 8, they are supported on the finish pad surfaces 190. More particularly, each of these assemblies comprises a support frame 456 formed with oppositely disposed end blocks 457 and 458 integrally interjointed by upper and lower plates 459. The rear block 458 is cross-drilled to support an axle 460 which is journaled at its ends in bearings provided in the upwardly directed arms of a base 461. Each base 461 is suitably secured on and within the finished area of a pad surface 190 on the platform 154 of the carriage 15. The blocks 457 and 458 are provided with aligned apertures for the reciprocally sliding motions of a rod 462 which also passes through a cross-bore transversely formed in the axle 460. The rods 462 at their forward ends are each pivotally supported by a connector block 463 on an axle 464 in a bracket 465 attached to the rear surface of the beam 200 (FIG. 24).

Behind the end block 457, a coil spring 466 is mounted in encircling relation to the rod 462 which is provided with means for adjusting the compression charateristics of the spring. More particularly, as in FIG. 22, one end of the spring 466 is supported by the end block 457 and in axial relation with an integral hub 467 thereof. The opposite end of the spring fits over a tubular sleeve 468 and abuts the flange 469 at the end thereof, the rod 462 passing through said sleeve. By means of an externally threaded portion 470 formed on the rod, a lock nut 471 is adapted to be turned against the adjoining surface of the flange 469 thereby modifying the expanded length of the spring and consequently increasing or decreasing its compression factor. When the desired adjustment has been made through the lock nut 471, a washer 472 having an integral key fitted into the groove 473 is fixedly secured against the lock nut 471 by a so-called "jamb" nut 474. To protect the spring and related adjusting members on the rod 462 from particles of dirt, broken glass and the like, a shield 475 is provided and secured on the upper surface of the frame 456.

It is believed apparent, upon reference to FIG. 22, that the angular relation of a line 462a in the longitudinal axis of rod 462, i.e. through the axes of the axles 460 and 464, to a radial line 200a passing through the axes of the shaft 185 and axle 464 constitutes the elements of a toggle joint in which the axle 464 is radially movable about the axis of shaft 185 and the rod 462 is caused to pivot about the axis of axle 460 while moving reciprocally thereto. Likewise, until and after a "dead-center" condition is reached by temporary alignment of the axis lines 200a and 462a, the rod will move outwardly and then inwardly to effect expansion and then compression of the related coil spring. Thus, upon the introduction of hydraulic pressure through the rear ends of cylinders 224, the beam 200 and vacuum cup assemblies mounted thereon will be swung forwardly upward, as above described. Consequently, as the beam is swung radially (counterclockwise in FIG. 22) the end of rod 462 on axle 464 will travel a like radial path. Obviously this activity of the rod 462 of each assembly is incurred by movement of bracket 465 with the beam 200 with resultant pivoting of the rods and support structures 456 about the axis of the related axles 460. As well, the outward sliding action of the rods with reference to their respective support structures produces a permitted expansion of the springs 466 whereby the force of their compressed energy cooperates with the cylinders 224 to raise the vacuum cup frame 20 bodily upward from the horizontally disposed rest position. As the swinging movement of the frame proceeds forwardly to a position, illustrated by way of example by the broken line designation 200b of the frame, the continued motion of the brackets 465 causes the rods 462 to be drawn inwardly of their associated support structures thereby, through the flanges 469, again compressing the related springs. The gradual compressing action is thus employed to overcome the forward swinging thrust of the vacuum cup frame thereby serving to assist the modifying action of the flow valve 331 to regulate the pressure to cylinders 224 as the plurality of vacuum cups are severally brought into engagement with the surface of the glass sheet to be transferred. This occurs substantially simultaneously with the action of the cam 336 to diminish the rate of hydraulic pressure through valve 331. In this respect, the illustrated position 200c of the beam 200 is to be considered only as an example of the angular position the beam 200 and the frame 20 assumes at the limit of forward movement, the actual angularity being determined by the actual inclined plane in which the stack of sheets are supported on the transfer buck as in FIG. 3.

During rearwardly downward movement of the frame and with the added weight of the sheet or plate of glass carried thereby, the bracket 465 on beam 200 carries the associated end of rod 462 radially downward and initially causes outward movement of the rod relative to the related support structure 456 with consequent expansion of the springs. This operates to assist the cylinders 224 when the frame is swung toward and through a vertical plane and as the expanding force of the springs increases. Thus, since the momentum or impetus of the downwardly moving frame could overcome the controlled pressure of the hydraulic fluid operating in the cylinders 224, the rods 462 by being carried by the brackets 465 cause compression of the springs which progressively increases to counterbalance the weight of the frame and thereby assist the pressure within the cylinders in maintaining downward movement at a suitably controlled rate of speed which is, of course, regulated by the flow valve 395. In other words, by adjustment in the compression characteristics of the springs 466, cushioning forces are imposed on the swinging movements of the vacuum cup frame both as it approaches the plane of a stacked glass sheet and as it resumes the horizontal rest position with a glass sheet carried thereon.

*The electrical system*

As earlier explained, the operation of unloading glass sheets by one embodiment of the apparatus of this invention is carried out in automatically recurring cycles unless temporarily interrupted through interlocked controls of an adjoining unloading apparatus and upon manual intervention by an operator. Otherwise, each cycle is initiated, with the apparatus positioned as in FIGS. 1 and 2, by upwardly forward pivotal movement of the vacuum cup frame 20 until it reaches an inclined plane substantially parallel to the plane in which the glass sheets S are arranged in stacked relation ST on the transfer buck B. Substantially simultaneously, the vacuum cup bars 241 are swung outwardly from the associated base frames 240 to locate the plurality of vacuum cups 209 in their forward, sheet engaging positions. The carriage 15 now advances, carrying the vacuum cup frame 20 forward as indicated in FIG. 5 until the vacuum cups are spaced a short distance from the surface of the outermost sheet of glass. Movement of the carriage is then decelerated as the cups engage the sheet surface and are forced rearwardly, with respect to the bars 241, until the carriage is halted. When a vacuous condition has been fully developed in each of the cups, the carriage retracts slightly and halts pending raising of the sheet bodily from the next adjacent sheet as the cup bars are swung inwardly. By reason of the mounting of the several rows of vacuum cups 209, the sheet is deflected into a curved plane preparatory to being raised and is then raised while the carriage remains stationary.

In sequence, rearward motion of the carriage is resumed; the vacuum frame is pivoted rearwardly downward and the bars 241 are again swung outwardly from the associated base frames 240 to support the sheet the maximum distance from the frame 20. When the frame is located in a substantially horizontal position and the carriage is halted, the bars are slowly swung inwardly to lower the sheet onto the several belts 115 of the conveyor 114 mounted on the base framework 10. The sheet is then adapted to engage means responsive to such lowering action. As herein provided, such means includes switching devices that activate the power source 123 for belts 115 and at the same time temporarily prevent subsequent functioning of the unloading apparatus until the sheet has been fully removed onto conveyor C. As discussed in connection with FIG. 4, the sheet is thus received on a conveyor C after which the automatic controls for the cycling operations of the apparatus are restored.

As the sheets are removed from a stack and the thickness thereof is gradually reduced, the advancing distance of the carriage progressively increases until the one side of the transfer buck is empty. To prevent delay in the unloading operations, provision is herein made for means responsive at a predetermined thickness of the stack to sound a warning before the sheets are entirely removed and also a second responsive means to halt operation of the apparatus in the event that an operator does not do so when the buck is empty.

For these purposes, electric switch devices are suitably arranged on the framework 10, the carriage 15, the vacuum cup frame 20 and certain of the cup bars 241. Referring now to FIGS. 53 and 54, the centermost stub shaft 185 is equipped with a split collar 500 which carries cam members 501 and 502 adapted to alternately engage the lever 503 of a double-action switch unit 504 having control devices designated 505 and 506. The switch unit 504 is mounted on one side of the centrally disposed vertical wall 151 of the carriage 15. As viewed in FIG. 54, the lever 503 is held engaged by cam member 501 when the vacuum frame 20 is in the horizontal rest position relative to the carriage 15. When the frame 20 is rotated upwardly forward about the axes of journals for the stub shafts 185, the side 505 of unit 504 is deactivated while the side 506 is engaged by cam member 502 when the frame reaches the inclined position of FIGS. 3, 61–63. Through associated electric devices, the sides or control devices 505 and 506 influence the action of the valve 301.

As shown in FIGS. 24, 26 and 27, the shaft 257, for swinging the several cup bars 241 relative to the associated base frames 240, carries a split collar 510 which sequentially engages means responsive to the position of actuating means during rotation of the shaft. Thus, on the inwardly facing surface of the collar, a pair of cams 511 and 512 are arranged in angularly spaced relation. Each cam is positioned by means of a screw 513 in adjusted relation to the legends of a radially disposed scale 514 and/or 515. As viewed in FIG. 26, the surface of cam 511 is adapted to engage the lever 516 of a double-action switch unit 517 having alternately operative sides or control devices designated 518 and 519; said unit being mounted by bracket 520 on the beam 200. The adjusted spacing between the active surfaces of cams 511 and 512 is such that switch side 518 will be active when the cup bars 241 are in the lowered position (FIG. 15) and the switch side 519 likewise will be active when the bars 241 are in the raised or forward position as in FIGS. 61 and 62 at which position the vacuum cups are located to engage the glass surface. The degree of angle through which the shaft 257 and bell-crank levers 249 and 250 are swung is thus determined by the radial distance between cams 511 and 512 and adjustment of each cam relative to its own scale (514 or 515) can of course be employed to lengthen or shorten such radial distance. By way of a practical example, the cams 511 and 512 control the rotation of shaft 257, and likewise the bell-crank levers 249 and 250, through an angle of approximately 82°. Generally speaking, the switch unit 517 controls the circuitry of the valve 302.

Referring now to FIG. 27, a cam 523 is carried on the reverse side of collar 510 and secured in adjusted position relative to scale 524 by a screw 525. The cam 523 is adapted to engage the lever 526 of a single action switch 527 supported on beam 200 by a bracket 528. As viewed in FIG. 27, the rock shaft 257 is rotated in a clockwise direction as the cup bars are swung forwardly. In FIG. 26, this same direction of rotation of the shaft will be counterclockwise which is understandable upon reference to designation of FIGS. 26 and 27 in FIG. 24. Thus, as the shaft 257 causes the cup bars 241 to move outwardly and the cam 523 to engage and release switch lever 526, no circuit completion will be made in switch 527. However, when rotation of the shaft is reversed, the cam 523 will be carried from the broken line position 523' into engagement with the lever 526 when an angle of about 30° has been traversed. Switch 527 then becomes effective to temporarily neutralize the valve 302 thereby halting rearward or inward movement of the cup bars. As viewed in FIG. 63, the extent of this arcuate movement of the bars serves to initially lift a glass sheet bodily in an arcuate path from the stack. Switch 527 is also instrumental in producing resumption of carriage rearward travel; rearward and downward pivotal motion of the vacuum frame 20 and movement of the cup bars 241 to the outward position.

References now being made to FIGS. 1 and 9, switching devices 530 will be seen connected to the outer end of each vacuum supply pipe 291. These devices are responsive to a vacuous condition in the pipes to complete a control circuit when a complete vacuous condition has been produced in the plurality of vacuum cups 209 to adhere the surface of the glass sheet thereagainst. In one way or another, the reversing functions of the unloading apparatus are dependent upon activation of the switch devices 530.

Several pairs of additional limit switches are employed to control sequentially occurring phases of the cycle and particularly upon engagement of the cups with a glass sheet the action of the cups to deflect the sheet into a curved plane and to lift the vacuously engaged sheet from its stacked position. For these related purposes, these switches are mounted on the outer immediate rows 205–206 of arms. As viewed in FIGS. 1 and 61–63, pairs of switches 533, 534 and 535 are shown in their mounted positions. Switches 533 are located adjacent the outer ends of the respective cup bars 241 and the levers 536 thereof are adjusted to engage the sheet surface considerably in advance of engagement by the vacuum cups positioned on either side thereof (FIG. 61). The circuit control of switches 533 is employed to produce deceleration of forward motion of the carriage.

Switches 534 and 535 are located so that the levers 537 and 538 thereof are normally in engagement with the rear surface of the adjacent vacuum cup. As viewed in FIGS. 55 and 56, a typical mounting for these switches, such as the switch 534, includes an arm 539 pivotally mounted by pintle 540 on a bracket 541 affixed to the tubular members 275 of the cup bar 241. The arm 539 is formed with a lug 542 located between opposed adjusting screws 543 and 544 in a block 545 on bracket 541. Adjustment of switch operation can thus be made by radial shifting of the levers 537 or 538 or by pivotal movement of the arm 539 with the associated switch about the axis of pintle 540.

The circuit, or circuits, controlled by the pair of switches 534 is only effective during the interval that the associated vacuum cups are forced rearwardly against the action of the respective springs 285 and then urged forward by the springs. This is effected during the final increment of forward movement of the carriage and substantially the same distance of initial rearward movement. Essentially the switches 534 are adapted to terminate forward movement of the carriage 15 and to activate the valves 303 and 303' to reduce air pressure in the vacuum cups.

The pair of switches 535, mounted similarly to the switches 533 and 534 as in FIG. 55, are equipped with levers 538 that are engaged by the adjacently located vacuum cups as in FIGS. 1 and 61. These switches are responsive to control a circuit effective during closure thereof to move the carriage rearwardly as will be discussed in connection with FIG. 62.

As viewed in FIGS. 28, 31 and 32 means is also provided to respond to rearward movement of the carriage 15 to cause the halting thereof. For this purpose, a limit switch 548 is supported by bracket 549 on the inwardly facing surface of a beam 105 of the framework 10. The lever 550 of switch 548 is adapted to be engaged by a cam 551, when the carriage is at the rear limit of its travel, to control the operation of valve 300. The cam 551, as shown in FIGS. 31 and 32, is adjustably positioned on the arm 319 by means of screws 552 passed through slots 553. As mentioned previously, the cam 318 is also carried by the arm 319 and the relative position of the cam 318 to cam 551 is adjusted to establish the desired amount of carriage travel at a decelerated rate of speed before the switch 548 is engaged.

While still considering FIG. 28, it will be noted that a second arm 555 is mounted on the carriage wall 157 in parallel, spaced relation to the arm 319. At its outer end, arm 555 adjustably supports a pair of cams 556 and 557 by means of similar screws 558 passed through slots 559 provided in the arm. The cam 556 is arranged to cause a first limit switch 560 to actuate a suitable alarm device when the stack of sheets has been reduced to a predetermined thickness. The cam 557 is similarly adapted to engage a second switch 561 when a stack of sheets have been entirely removed from one side of transfer buck. The distance of carriage travel between the switches 560 and 561 is thus substantially equal to the thickness of a selected number of sheets. These switches are mounted in common on a bracket 562 affixed to the beam 105. Obviously the levers 563 and 564, respectively, of said switches are not engaged during the normally occurring automatic cycles of operation until such warnings are to be made or the apparatus terminated.

Operation of the conveyor 115 to remove a glass sheet onto an adjoining conveyor C (FIG. 4) is controlled by limit switches 567 that are suitably positioned by brackets 568 on certain of the support bars 127 mounted on the base framework 10 by pedestals 128. The levers 569 of these switches thus are made responsive when engaged by the glass sheet as it is lowered during the final rearward motion of the plurality of cup bars 241. When disengaged, the switches cause cessation of conveyor belt (115) operation and the initiation of a subsequent automatic unloading cycle. As aforementioned, the circuitry of switches 567 can be interlocked with the electric systems of adjacently located unloading apparatus whereby action of the conveyor 114 to remove a glass sheet onto the conveyor C will be delayed until the surface of the conveyor is clear of sheets removed from such adjacent apparatus. While such provision is not entirely necessary for continuous operation of one unloading apparatus, it serves to prevent the breakage of glass as by colliding of one sheet with another sheet carried by the conveyor.

In further considering the advantages of the above-described automatically actuated limit switches, reference is now made to FIG. 60 wherein an exemplary form of electric system for operating the unloading apparatus is diagrammatically illustrated. In such a system, it is conventional practice to provide a manual control switch adapted to "re-set" related devices within the system and, to simplify explanation of the diagram, is not otherwise specifically hereinafter referred to. Likewise, to exercise manual control over the various functioning electrical devices of such a system, a switch is provided to set up an independent circuitry for manual actuation of any of the electrical devices, such as solenoid actuated relay switches, solenoid controlled valves and/or timing relays, or to put the system on an automatic phase of cyclic operation. The automatic side of the circuitry can further be monitored to "start" or "stop" the same.

Thus, when a transfer buck B has been located adjacent the forward end of the unloading apparatus, the attending operator depresses switch 570 to reset the system, shifts switch 571 to reverse from "Manual" to "Automatic" and depresses switch 572 to initiate the automatically recurring cycles of the unloading operations. At this time, limit switch 505 is closed by cam 501; limit switch 506 is open; limit switch 518 is closed by cam 511; limit switch 519 is open; limit switch 527 is open; limit switches 530 are open; limit switches 533 are open; limit switches 534 are open; limit switches 535 are open; limit switch 548 is closed by cam 551; and with no glass on the conveyor 114, limit switches 567 are open.

Temporary closure of switch 572 completes a circuit from source line 573 by line 574 from switch 571 and through solenoid 575 of relay switch 576 to source line 577. Switch 576 has pairs of contacts 578, 579 and 580; said pairs of contacts being engaged when solenoid 575 is thus energized.

Contacts 578 complete a circuit from source line 573 through the normally closed contacts 581 of relay switch 582, having a solenoid 583, and by line 584 through a solenoid restriction valve 585 to source line 577. This action removes the restriction of valve 585 in pipe 304 to permit delivery of fluid at high pressure from pump 305 to solenoid actuated valves 300, 301 and 302.

Contacts 579 complete a circuit from source line 573 through contacts 581 by line 586 through solenoid 587 of relay switch 588 and thence by line 589 to source line 577. Relay switch 588 has sequentially engageable pairs of contacts 590 and 591 and an opposed solenoid 592. Line 589, however, is completed through engaged pair of contacts 593 of relay switch 594, having a solenoid 595 which is controlled by presently open limit switch 506, and by line 589' through presently engaged contacts 596 of relay switch 597 to source 577. Relay switch 597 also being equipped with normally closed contacts 598, normally open contacts 599 and solenoid 600 which is controlled by presently open limit switch 519.

When solenoid 587 is thus energized, pair of contacts 590 are engaged to complete a circuit from source line 573 by line 601 through one side 602 of the valve 301 to source line 577. This operates to direct pressure from pipe 304 to pipes 321, valve 331, pipes 330, 344, 346, 348 and 351 to the rear ends of cylinders 224 to pivot vacuum frame 20 upwardly from the position of FIG. 2 with the speed of said frame being decelerated during the final increments of movement due to the action of cam 336 on valve 331. During the movement of the vacuum frame, cam 501 releases limit switch 505; such movement continuing until limit switch 506 is closed by engagement of cam 502. When closed, limit switch 506 completes a circuit from source line 573 by line 603 through solenoid 594 to source line 577 disengaging contacts 593 and thereby breaking circuit of line 589 to deenergize solenoid 587 and permit disengagement of contacts 590. This acts to open line 601 and neutralize side 602 of valve 301 with the frame 20 at its forwardly inclined position as in FIGS. 3 and 61.

Simultaneously, contacts 580 complete a circuit from source line 573 by line 604 through solenoid 605 of relay switch 606 and by line 607 to source 577. Relay switch 606 has sequentially engageable pairs of contacts 608 and 609 and an opposed solenoid 610. Line 607 is completed through engaged contacts 598 of relay switch 597. When solenoid 605 is thus energized, pair of contacts 608 are engaged to complete a circuit from source 573 by line 611 through presently engaged contacts 612 of relay switch 613; said relay having normally closed pair of contacts 614, normally open pair of contacts 615 and opposed solenoids 616 and 617. From contacts 612, line circuit 611 is continued by line 618 to one end 619 of valve 302 to source 577. Valve 302 now directs pressure from pipe 304 to pipes 354, 358, 358' and 269 to lower ends of cylinders 260 thereby rotating shaft 257 to radially swing vacuum cup bars 241 forward, cam 511 releasing switch 518 while by-passing switch 527. Release of limit switch 518 opens line 619' to de-energize the solenoid 620 of relay switch 621 having pairs of contacts 622 and 623 which are then engaged.

When switch 519 is engaged by cam 512, a circuit is completed from source 573 by line 624 through solenoid 600 of relay switch 597 to source 277. This acts to engage contacts 599 and disengage pairs of contacts 596 and 598 thereby breaking circuit of line 589 at contacts 596 to de-energize solenoid 587 of relay switch 588. The circuit of line 607 is also opened, to de-energize solenoid 605 of relay switch 606. Consequently, contacts 590 are disengaged to break the circuit of line 601 to side 602 of valve 301 while contacts 608 are similarly disengaged to open circuit of lines 611 and 618 to side 619 of valve 302. The vacuum cup bars 241 are now spaced forwardly from the associated base frames 240 as viewed in FIGS. 3 and 61 preparatory to actual engagement with the outer surface of the glass sheet to be removed.

When contacts 599 of relay switch 597 are engaged, a circuit is established from source line 573 by line 625 through presently engaged contacts 626 of relay switch 627 and line 628 to solenoid 629 of relay switch 630 to source line 577. Relay switch 627 is also equipped with normally disengaged pairs of contacts 631 and 632 and a solenoid 633. Relay switch 630 is equipped with pairs of sequentially engaged contacts 634 and 635 and an opposed solenoid 636. Engaged pair of contacts 634 now complete a circuit from source line 573 by line 637 through the presently engaged contacts 622 of relay switch 621, line 638, engaged contacts 639 of relay switch 640 and line 641 to one side 642 of valve 300 to source line 577. Relay switch 640 is also equipped with presently engaged contacts 644, presently disengaged contacts 645 and solenoid 646 controlled by presently open switches 534. Activation of valve 300 directs fluid under pressure from pipe 304 to pipes 310–312 to the rear end of cylinder 135 to move carriage 15 forward. In the present instance, by-pass valve 320 relieves valve 314, which presently is so controlled by cam 318 as to prevent adequate return of fluid pressure through pipes 313–315.

When the frame 20 and forwardly positioned cups 209 on cup bars 241 are spaced from the sheet surface at distance of substantially as shown by line 650 in FIG. 61, the levers 536 of switches 533 are engaged to close the same. This creates a circuit from source 573 by line 651 through presently engaged pair of contacts 652 of relay switch 653, having a solenoid 654 controlled by presently disengaged switches 530, to and through solenoid 657 of relay switch 658 to source 577.

Energization of solenoid 657 engages contacts 659 to complete a circuit from source 573 by line 660 through restriction valve 661 to source 577. Valve 661, when actuated, restricts the flow of fluid through pipe 310 which operates to decelerate forward movement of the carriage thereby producing a cushioning action as the cups 209 are carried into actual contact with the glass surface. Consequently, the advance of the carriage through a final short distance is relatively slow while the cups are being forced rearwardly against the action of the associated springs 285. Referring briefly to FIG. 17, it will now become apparent that the inner rows 201–202 of cups 209 at line $a$ will be first depressed, the inner intermediate rows 203–204 of cups 209 at line $b$ next, followed by the outer intermediate rows 205–206 of cups 209 at line $c$ and finally the outer rows 207–208 of cups 209 as at line $d$.

During the last increment of carriage movement and depression of particularly the intermediate outer rows of cups, the pairs of switches 534 and 535 are closed. Switches 534 when engaged, complete a circuit from source 573 by line 665 through solenoid 646 of relay switch 640 to source 577. This disengages pairs of contacts 639 and 644 and engages pair of contacts 645 thereby particularly at contacts 639 opening circuit of lines 638–641 to idle side 642 of valve 300 to halt the carriage 15.

Contacts 645 complete a circuit from source line 573 by line 666 through presently engaged contacts 667 of relay switch 668, having a solenoid 669, to and through solenoid 616 of relay switch 613 to source line 577. This disengages contacts 612 to open the circuit of lines 611–618 to the side 619 of valve 302 and also disengages contacts 614. Engaged contacts 615 complete a circuit from source line 573 by line 670 through solenoid 671 of relay switch 672 to source line 577. Switch 672 is equipped with spaced pairs of contacts 673 and 674 and opposed solenoid 675. Engagement of contacts 673 completes circuit from source 573 by lines 676 and 677 through sides 678 of respective valves 303 and 303' to source 577.

To manually control connection of the plurality of vacuum cups on each side of the longitudinal axis of the vacuum frame 20, switches 680 are placed in the circuit lines 676 and 677 to valves 303 and 303'. Opening of either switch will thus selectively render the vacuum cups 209 on either side of the vacuum frame inoperable for the vacuous supporting of a glass sheet as will further be described.

Valves 303 and 303' connect vacuum of pipe 308 to pipes 366–376 and 370–377, valves 294 and feed pipes 291–293 to create a vacuous condition in each of the cups 209 thereby effectively securing the glass sheet to the vacuum frame. When this vacuum becomes active, switches 530 complete a circuit from source line 573 by line 681 through solenoid 633 of relay switch 627 to source line 577 which operates to disengage contacts 626 while engaging pairs of contacts 631 and 632. Contacts 626, in the present instance, break the circuit from source line 573 through lines 625–628 to solenoid 629 of relay switch 630. This operates to disengage contacts 634 of said relay switch 630.

Through line 682 branching from line 681, a circuit is also made through solenoid 654 of relay switch 653 to source line 577. This disengages contacts 652 to break the circuit of line 651 through presently closed limit switches 533 and solenoid 657 of relay switch 658 to source line 577 with consequent disengagement of contacts 659. Since the circuit of line 660 is now discontinued, the restriction valve 661 is rendered inactive in pipe 310. This is essentially important by reason of the fact that, while a sheet is held by vacuum on the cups, the switches 533 will be maintained engaged by the glass sheet and undesirably control further or rearward movement of the carriage 15 at a decelerated speed.

Closure of switches 535 completes a circuit from source line 573 by line 684 through solenoid 685 of relay switch 686 to source line 577 thus engaging normally open contacts 687. A circuit established from source 573 by line 688 at contacts 632 of relay switch 627 and through solenoid 636 of relay switch 630 to source 577 causes contacts 635 of relay switch 630 to be engaged to complete a circuit from source line 573 by line 690 through the presently engaged contacts 687 of relay switch 686 to line 691 and through the opposite side 692 of valve 300 to source line 577. This will direct pressure from supply pipe 304 through the valve to pipe 313 through restriction valve 314 to pipe 315 and thence to the forward end of cylinder 135. This will cause the carriage 15 to carry the vacuum frame 20 bodily rearward, permitting the springs 285 to move the vacuum cups forwardly until spaced their normal distances from the associated bars 241. This is schematically indicated in FIG. 62 by the line 693; the difference between the lengths of lines 693 and 694 substantially representing, by way of example, the distance of rearward movement. This is also shown by the single dot broken line 695 and the double dot broken line 696 representing the two positions of a vacuum cup bar 241.

Since the switches 535 are opened as the contacting cups move forwardly relative to each bar 241, the rearward motion of the carriage will halt at this time. This is due to de-energization of solenoid 685 with resultant disengagement of contacts 687 and breaking of the line circuit 690–691.

As the springs 285 move the several rows of cups forward, it will be remembered that due to the predetermined distances, such as discussed in connection with FIG. 17, of the two rows of cups, the outer rows 207–208 will initially act to raise and separate the outer margins of the sheet from the surface of the next sheet thereby overcoming the so-called "cohesion" between the surfaces of the two sheets. In succession, the intermediate outer rows 205–206 of cups and the intermeditae inner rows 203–204 and inner rows 201–202 of cups raise the sheet until the carriage is halted. As explained in connection with FIG. 6, the sheet to be removed is thus bent from a flat plane into an arcuate plane which results in effective separation of the sheet from the surface of the next sheet of the stack. This is also indicated in FIG. 63 by the marginal edge of the sheet designated by the letter M.

Similarly to opening of the switches 535, switches 534 are simultaneously opened to de-energize solenoid 646 of relay switch 640 to permit disengagement of contacts 645 and re-engagement of contacts 639 and 644. Since contacts 634 of relay switch 630 are disengaged, the circuit of lines 637, 638 and 641 through contacts 639 remains open. However, when contacts 644 are engaged, a circuit will be made from source line 573 by line 700 through closed contacts 631 of relay switch 627 to contacts 644 and thence by line 701 through presently engaged contacts 702 of relay switch 703, equipped with solenoid 704, and line 705 through solenoid 610 of relay switch 606 to source line 577. The solenoid 704 is in circuit with normally open pair of contacts 706 of relay switch 707 also equipped with normally open contacts 708 and solenoids 709 and 710 as will shortly be described. When solenoid 610 becomes energized, contacts 609 of relay switch 606 establish a circuit from source line 573 by line 711 through opposite side 712 of valve 302 to source line 577; this acting to direct pressure from pipe 304 to pipes 420, 424, 424' and 270 to the upper ends of cylinders 260. This results in rotation of shaft 257 until switch 527 is tripped by cam 523 to complete a circuit from source 573 by line 713 through solenoid 709 to source 577.

As illustrated in FIG. 63, when the shaft 257 is rotated in the direction of the arrow designated by the numeral 716, the arms 254 will operate the rods 253 and 255 to swing the bell-crank levers 249 and 250 thus carrying the associated vacuum cup bars 241 rearwardly or toward the base frames 240. In this connection, it was previously mentioned that the cam 523 on collar 510 is adjustably located so as to engage the lever 526 of switch 527 when the shaft 257 has rotated through an angle of substantially 30°. The swinging motion of the bars 241, as seen in FIG. 63, results in lifting of the glass sheet S from the stack ST of sheets on the buck B of FIG. 3.

Contacts 706 now complete a circuit from source line 573 by line 717 through solenoid 704 of relay switch 703 to source line 577. This operates to break circuit of lines 701–705 thereby de-energizing solenoid 610 to disengage contacts 605 and neutralize side 712 of valve 302. Substantially simultaneously, contacts 708 establish a circuit from source line 573 by line 720 through solenoid 721 of relay switch 722 to source line 577; switch 722 being equipped with normally open contacts 723 and solenoid 724 controlled by presently open switch 548. Presently engaged contacts 723 complete a shunt circuit through lines 705 and 706 which connect into the circuit of lines 690 and 691 which as above explained is open at contacts 687 upon disengagement of switches 535. Re-establishment of the circuit through line 706–691 activates side 692 of valve 300 to restore pressure to pipe 313 thereby moving carriage 15 rearwardly.

Line 720 by branch line 730 also energizes timing relays 731 and 732; both being conventionally connected to source lines 573 and 577. Timing relay 731 monitors an interval during which the rearward motion of the carriage 15 is resumed and then creates a circuit from source line 573 by line 733 through solenoid 734 of relay switch 735 to source line 577; said switch having normally open contacts 736, normally closed contacts 737, and opposed solenoid 738 which is controlled by the presently open switch 505. Engagement of contacts 736 completes a circuit from source line 573 by line 739 through the opposed solenoid 592 of relay switch 588 to source line 577. This engages contacts 591 to establish a circuit from source line 573 by line 740 through the opposed side 741 of valve 301 to source line 577. Pressure is now directed from supply pipe 304 through pipes 385–390, restriction valve 395, pipes 400, 411, 413 and 415 to the forward ends of the cylinders 224 to swing the vacuum frame 20 rearwardly downward. As frame 20 initiates its downward movement, cam 502 releases limit switch 506 thereby permitting contacts 593 to re-engage; however, at this time, cam 512 is controlling limit switch 519 whereby line circuit 589 is held open. As cam 401 on vacuum frame 20 actuates the valve 395 on carriage 15, movement of the frame 20 is progressively decelerated to avoid sudden jarring as it approaches its horizontal position. At this time, closure of switch 505 results in restoration of a circuit from source line 573 by line 742 through solenoid 738 of relay switch 735 to source line 577. This results in disengagement of contacts 736 with return of contacts 737 to their normally closed condition.

The timing relay 732 is adjusted to monitor an elapse of time during which the frame 20 starts its downward motion and then completes a circuit from source 573 by line 743 to an associated timing relay 744. This relay 744 is adapted to control the length of an interval during which the vacuum cup bars 241 are moved forward thereby initiating and terminating this function. To this end, the timing relay 744 establishes a circuit from source line 573 by line 745 to line 618 and thus through the side 619 of valve 301 to source line 577. Consequently, the several bars 241 are swung forwardly and then halted when timing relay 744 becomes inactive and circuit line 745 is opened.

As the carriage 15 approaches the limit of its rearward movement, the restriction valve 314, interposed between pipes 313 and 315, is actuated by the cam 318 to decelerate the rate of motion. This of course operates to bring the carriage slowly to a halt as the switch 548 is engaged.

The apparatus will now be located as viewed in FIG. 2 with the glass sheet supported above the belts 115 by the vacuum cups 209 which are presently located by the bars 241 in the forward position. In this present location, the glass sheet is supported above the belts 115 of the conveyor 114. When the switch 548 is closed, a circuit is completed from source line 573 by line 750 through solenoid 724 of relay switch 722 to source line 577 thereby disengaging contacts 723 to break line circuit 705, 706 and 691 thereby neutralizing side 692, of valve 300. By branch line 751, a circuit is simultaneously established from source line 573 through presently engaged contacts 737 of relay switch 735 to line 752 to the engaged contacts 753 of relay switch 754. The circuit of line 752 continues via line 755 through presently engaged contacts 623 of relay switch 621 and by line 756 through solenoid 757 of relay switch 758 to source line 577. Completion of lines 751–752 at contacts 737 thus insures that vacuum frame 20 has been returned to its lowermost position while the continued circuit by lines 755–756 through contacts 623 of relay switch 621 similarly is dependent on location of the cup bars 241 in their forward position and since at this time limit switch 518 is open.

Line 751 by branch line 759 also completes a circuit from source line 573 through the solenoid 669 of relay switch 668 and similarly through solenoid 617 of relay switch 613 to source line 577; this serving to temporarily de-energize solenoid 669 whereby contacts 667 are disengaged to break the circuit of line 666 to solenoid 616.

Likewise solenoid 617 acts to re-engage pair of contacts 612 while disengaging contacts 615. Separation of contacts 615 reduces vacuum in pipes 366 and 370 and the vacuum cups 209, permitting limit switches 530 to re-open while contacts 614 then establish a circuit from source 573 by line 760 through solenoid 675 of relay switch 672 to source 577. Engagement of contacts 674 completes a circuit from source line 573 by line 761 through side 672 of valves 303 and 303' to source line 577 thereby connecting pipes 366–370 to pipe 309 and admitting air at low pressure to the vacuum cups. This operates to release the cups from the glass sheet with a slight blowing action.

The circuit of line 756, when completed through solenoid 757 of relay switch 758 to source line 577, engages contacts 765 to establish a circuit from source 573 by line 766 through low pressure valve 767 to source line 577. Valve 767 is connected to supply pipe 304 to direct pressure to pipe 420 and thus to the upper ends of cylinders 260 thereby slowly moving the cup bars 241 rearwardly, or by reason of the horizontal position of the vacuum frame 20, downwardly to place the glass sheet on the belts 115.

During downward motion of the glass sheet, the limit switches 567 are closed. This normally initiates operation of the conveyor 114 to remove the sheet onto the conveyor C. However in the event that a preceding sheet has not been further removed by the conveyor C from the vicinity of the conveyor 114, the belts 115 of said conveyor 114 will remain stationary. This is due to the provision of control switches mounted on the conveyor C which are engaged by a preceding glass sheet as it is removed from the conveyor 114. In other words, the concurrent operation of adjacently located unloading apparatus also delivering glass sheets to the conveyor C can control further motion of the glass sheets until each related area of the take-off conveyor is sequentially cleared. With this in mind, limit switches 770 are interposed in the source line 573 to switches 567 and normally complete a circuit thereto.

Thus, during lowering of a glass sheet onto the belts 115, the switches 567 will be engaged to complete a circuit from source line 573 by line 769 through solenoid 771 of relay switch 754 to source line 577. In addition to normally engaged pair of contacts 753, relay switch 754 is equipped with engaged pairs of contacts 772 and 773 and disengaged pair of contacts 774. Contacts 772 are adapted to subsequently initiate a further unloading operation upon completion of a circuit from source line 573 by line 775 to line 574 as will later be explained. On the other hand, engaged pair of contacts 773 complete a circuit from source line 573 by line 776 through magnetic brake 777 to source line 577; said brake controlling operation of drive shaft 122 for the belts 115 of conveyor 114. Therefore, when solenoid 771 of relay switch 754 is energized, pairs of contacts 753, 772 and 773 will be temporarily disengaged while presently engaged pair of contacts 774 will complete a circuit from source line 573 by line 778 through electromagnetic clutch 779 to source line 577. Clutch 779, being engaged, will couple the motor 123 to shaft 122 thereby operating conveyor belts 115 until switches 567 are released from engagement with the glass sheet. The relay switch 754 will then be reversed to disengage contacts 774 and re-engage contacts 753, 772 and 773 thereby particularly disengaging clutch 779 while re-engaging brake 777. Likewise, the circuit of line 775 to line 574 will re-energize the solenoid 575 of relay switch 576 to initiate the unloading operation of the apparatus.

In the event that the limit switches 770 are engaged by a preceding sheet on the conveyor C, the source circuit to limit switches 567 will be opened and the aforementioned operation of the conveyor 114 will be delayed. The limit switches 770 are then adapted to complete a circuit from source line 573 by line 782 through solenoid 583 of relay switch 582 to source line 577 to disengage contacts 581 whereby source line 573 to the pairs of contacts 578, 579 and 580 wiill be broken to insure inadvertent operation of the apparatus generally.

During the continuous removal of glass sheets by automatic recycling of the unloading apparatus and as the stack is reduced, as for example, to ten or less sheets, it becomes necessary to alert an operator to observe removal of the remaining sheets and halt such automatic cycling preparatory to replacement of the empty buck. To this end, the limit switch 560 is adapted to be closed by cam 556 to complete a circuit from source line 573 by line 785 through a warning device 786, such as a bell or lamp, to source line 577. The switch 560 will of course be released by the cam 556 as the carriage 15 moves rearwardly but will produce a similar warning during subsequent forward movements of the carriage.

Likewise, in the event that the apparatus is temporarily unattended, a timing relay 788, connected to the sources 573 and 577, is employed to halt the automatic cycling of the unloader apparatus. For this purpose, the limit switch 561 is adapted to complete a circuit from source 573 by line 789 to the timing relay. As a result, when the switch 560 has been "over-run" and the last glass sheet S removed from the transfer buck B, the limit switch 561 will complete a circuit from source line 573 by line 789 through the timing relay 788 to source line 577. This timer is adjusted to complete a circuit from source line 573 by line 790 to line 681 which as hereinabove described is instrumental in initiating return phases of the carriage 15 and the vacuum frame 20. However, as aforementioned, the circuit of line 681 is dependent upon creation of a vacuous condition in the cups and consequently cannot otherwise be completed in the absence of glass sheets. Line 790 by branch 791 also creates a circuit through the solenoid 793 of a relay switch 794 to source line 577 thereby engaging normally open contacts 795. The contacts are connected by line 796 to line 752 and line 797 to solenoid 583 of relay switch 582. Accordingly, the vacuum frame 20 will be pivoted downwardly in the usual manner as the carriage 15 moves to the limit of its rearward travel and the cam 551 engages the limit switch 548. In this instance, completion of the circuit lines 751–752 will complete the circuit to lines 796–797 with resulting disengagement of contacts 581 of relay switch 582 and cessation of operation of the unloading apparatus.

As noted earlier, when a transfer buck loaded with stacked glass sheets has been located adjacent the forward end of the above-described embodiment of the apparatus of this invention, an operator depresses manual switches 570, 571 and 572 to reinstitute the automatic cycles of operation of the apparatus.

As hereinabove discussed, the support arms 201–208 for the rows of vacuum cups 209 are arranged in the vacuum frame 20 in transversely spaced relation and the rows of cups on each side of the longitudinal axis of the frame are independently connectable to the source of vacuum. With this in mind, it is entirely possible to arrange two stacks of glass sheets or blanks side by side on supporting apparatus, or as herein described, a transfer buck B. In this event, the sheets of each stack would have a smaller horizontal dimension than a single sheet such as was discussed in connection with FIG. 2. The rows of vacuum cups on each side of the vacuum frame are thus adapted to simultaneously transfer two sheets from the plane of the supporting apparatus to the plane of a conveyor. Moreover, should only one stack of smaller sheets be loaded on a buck or breakage should be found in a second stack of sheets, the vacuum to the rows of cups on the affected side of the vacuum frame can be immediately shut off without interrupting the automatic transfer of the remaining stack of sheets. This is accomplished by opening one or the other of the switches 680 in the circuits to the valves 303 and 303'.

While utility of this invention has been described in connection with transfer apparatus adapted to automatically transfer sheet material, such as glass, from a stacked position, in which it is inclined in the plane of a supporting apparatus, to a position from which it can be removed in the plane of a conveyor, it has been found equally true that the transfer apparatus can be otherwise employed to equally good advantage. In a practical way, this novel manner of transfer is adapted to successively remove glass sheets or blanks for further processing from a transfer buck on which they were stacked upon completion of a preceding phase of their processing. Now, for use at the end of any such preceding phase of operation, the apparatus of this invention can be adapted, by certain modifications, to automatically transfer sheet materials from the plane of a conveyor, in which they are successively received, into the plane of a supporting apparatus upon which they are to be stacked. Thus the basic embodiments of the transfer apparatus, i.e. the base framework 10, the carriage 15 and vacuum frame 20, remain within the spirit of the invention and the mode of their related operable functions remains substantially the same. More particularly, in the modified embodiment of the transfer apparatus of this invention, as viewed in FIG. 64 and generally designated by the letters AA, certain devices are additionally employed to automatically control functioning of the apparatus.

Figure 83:
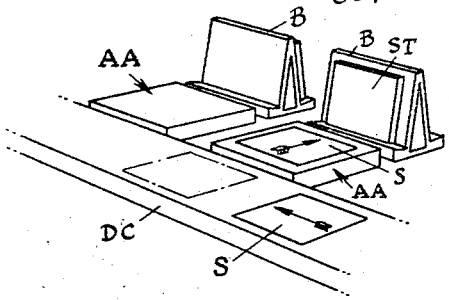
FIG. 83 is a perspective view of the modified form of transfer apparatus in one example of practical use.

As viewed in FIG. 83, a glass sheet advancing on the delivery conveyor DC reaches a position indicated in broken line wherein it is substantially aligned with the transfer apparatus AA. By means responsive to the sheet at this position, further movement is halted; the sheet is raised and then moved by an auxiliary roll conveyor, associated with the delivery conveyor, onto the conveyor 114 of the apparatus AA. As herein provided, movement of the sheets along conveyor DC can be conventionally controlled to remove the sheets for transfer to one or more apparatus AA so that means also included in the area of an auxiliary roll conveyor will permit a sheet to halt in the vicinity of one transfer apparatus or selectively be permitted to continue into the vicinity of a subsequent transfer apparatus.

In this connection, reference is now briefly made to FIG. 2 wherein the carriage 15 is located at one or the rear limit of its movement and the vacuum frame 20 is located in the plane of a conveyor; this being typical of the preferred or modified form of apparatus in the rest position. On the other hand, as in FIG. 3, the carriage 15 is at a forward limit of its movement and the vacuum frame 20 disposed in a plane substantially parallel to the plane of a stack of sheets on a transfer buck and as previously described, in the act of removing a glass sheet. As herein presently contemplated, the vacuum frame 20 will be considered as in the act of placing a sheet in stacked relation to other sheets on the buck. The carriage then returns to the opposite end of its movement while the empty vacuum frame is pivoted downwardly into the plane of the conveyor as in FIG. 2 and from which a subsequent sheet will be received.

Structurally, it will be recalled that the carriage 15 by means of caster wheels 169 is adapted to traverse the tracks 110 provided on walls 101 and 102 of the base framework 10 according to the direction of pressure to the respective ends of cylinder 135. The carriage chassis 150 at one or its forward end is equipped with spaced journal bearings 187 in which shafts 185 are supported; said shafts at their opposite ends being secured in trunnion blocks 220 connected to the beam 200 of the vacuum frame 20. By means of cylinders 224 mounted on the carriage 15, the frame 20 is adapted to be pivotally swung forwardly upward and rearwardly downward about the axes of shafts 185. The support arms 201–208, mounted on the beam 200, are formed with base frames 240 and vacuum cup bar members 241 that are movably supported on the base frames by bell-crank levers 249 and 250. By means of shaft 257 and levers 265, a pair of cylinders 260 are adapted to operate the bell-crank levers and thereby swing each bar member in the manner of a parallelogram relative to the associated base frames. It is therefore believed apparent the essential features of the main components of the transfer apparatus of FIG. 1 or FIG. 64 and their functional inter-relation is unchanged. For these reasons, similar reference numerals will be used whenever and wherever possible to avoid undue duplication.

Figure 64:
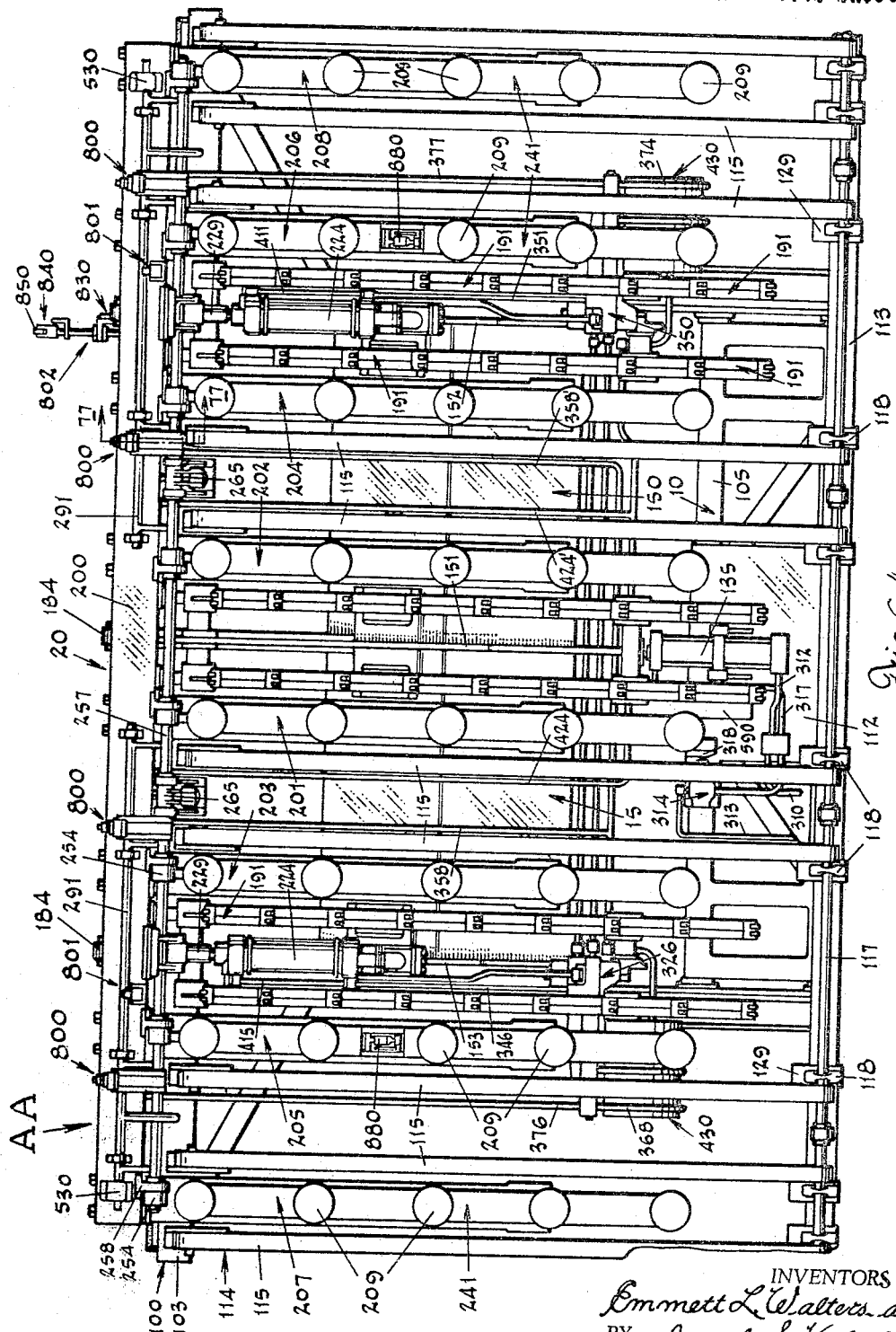
FIG. 64 is a plan view of a modified embodiment of the sheet transfer apparatus.

In the apparatus AA of FIG. 64, the vacuum frame 20 is provided with sheet locating means, as seen in FIGS. 64, 65, 75, 76 and 77 and designated by the numeral 800, and means 801 (FIG. 71) responsive to movement of the leading edge of the glass sheet or blank into engagement with the locating means. This responsive means is adapted to produce engagement of the undersurface of the blank by the plurality of vacuum cups 209 and to connect the cups to a source of vacuum, after which the vacuum frame is pivotally swung forwardly toward the plane of the supporting apparatus B. As previously described in connection with the first embodiment of the invention and as motion of the vacuum frame occurs, the carriage 15 is caused to move toward said supporting apparatus or transfer buck.

In the present instance, the forward end of the carriage is equipped with means responsive to the stacked position of the sheets on the buck to retard the speed of advancing motion of the carriage and to then halt such motion preparatory to the stacking of the glass sheet carried by the vacuum frame. In this way, forward movement of the carriage is also successively shortened as the thickness of the stack increases and with the vacuum frame positioned to then locate the sheet against a precedingly stacked sheet without damage to either. Thus, an indexing device, generally designated by the numeral 802, is mounted to project forwardly of the carriage as will be seen in FIGS. 65 and 66. Such a device as herein provided is adapted to be carried into surface engagement with an outermost stacked sheet; to move rearwardly as the carriage continues forward movement a short predetermined distance and to then be retracted rearwardly from the area through which the lower edge of the new sheet will move as the sheet is placed on the supporting apparatus.

Referring now particularly to FIG. 64, it will be seen that at least four sheet locating devices 800 are mounted on the beam 200 in substantially equally spaced relation to the lonigtudinal axis of the vacuum frame 20. As viewed in FIGS. 75, 76 and 77, each locating device comprises a base member 805 secured to the upper surface of the beam 200 and a rod 806 reciprocally supported by sleeve bearings 807 in the base 805. At its outer end, the rod 806 is threaded and adapted to mount an L-shaped member 808 having a vertically disposed leg portion 809, that is adjustably secured on the rod by nuts 810, and a horizontally disposed bar portion 811. The bar portion 811 is provided with a strip or block 812 of non-abrasive material, such as felt or like materials, which is attached to the end surface of the bar portion by screws 813.

The rod 806, at its opposite end, is formed with an integral block 815 having a notch 817 in the lower surface thereof to provide an engageable surface 818 (FIG. 77). A transverse pin, or pins, 819 is supported by the block 815 and at each of the opposite outer ends is grooved to receive one end of coil springs 820; the opposite ends of the springs being similarly retained by pins 821 fixed to the base 805 (FIG. 75). As viewed in FIG. 77, the action of the springs is to automatically move the rod 806 from the broken line position of the face of the strip 812, in which the leading edge of the glass sheet or blank S will be engaged and thus located, to the full line position in which the said face of the strip will be located outwardly of the path described by the sheet's edge as the sheet is bodily elevated during swinging movement of the bar members 241 relative to the associated base frames 240. This swinging movement is attributable to rotation of the shaft 257 in alternately opposite directions to move the bar members 241 outwardly away from the base frames and then inwardly toward said frames. In this inward position indicated in broken line in FIG. 77, the plurality of vacuum cups 209 are positioned beneath a glass sheet as it is moved onto the conveyor belts 115 of the transfer apparatus. Consequently, rotation of the shaft 257 to swing the levers 254 from the full line position to the broken line position, to produce the above-described action of the bar members, can be employed to move the rod 806, contra to the action of the springs 820, to relocate the strips in sheet locating position.

To this end, the shaft 257, adjacent each locator device 800, is equipped with a collar 824 formed with a lug 825 adapted to engage the notch surface 818 of the rod block 815. Thus, when the lug 825 is positioned as indicated in dotted line (FIG. 75), the rod 806 will have been moved inwardly to the position of FIG. 75 and when the lug is located as in the full line position of FIG. 77, the action of springs 820 will be rendered effective to move the rod outwardly (as in FIG. 77) until the block 815 engages the opposed face of the base 805. Of course when inwardly disposed to locate a glass sheet, the faces of the several strips 812 can be arranged in a common transverse plane by adjustment of the nuts 810. The block 805, rod block 815, springs 820 and collar 824 are contained within a protective housing 826.

Figures 65, 71:
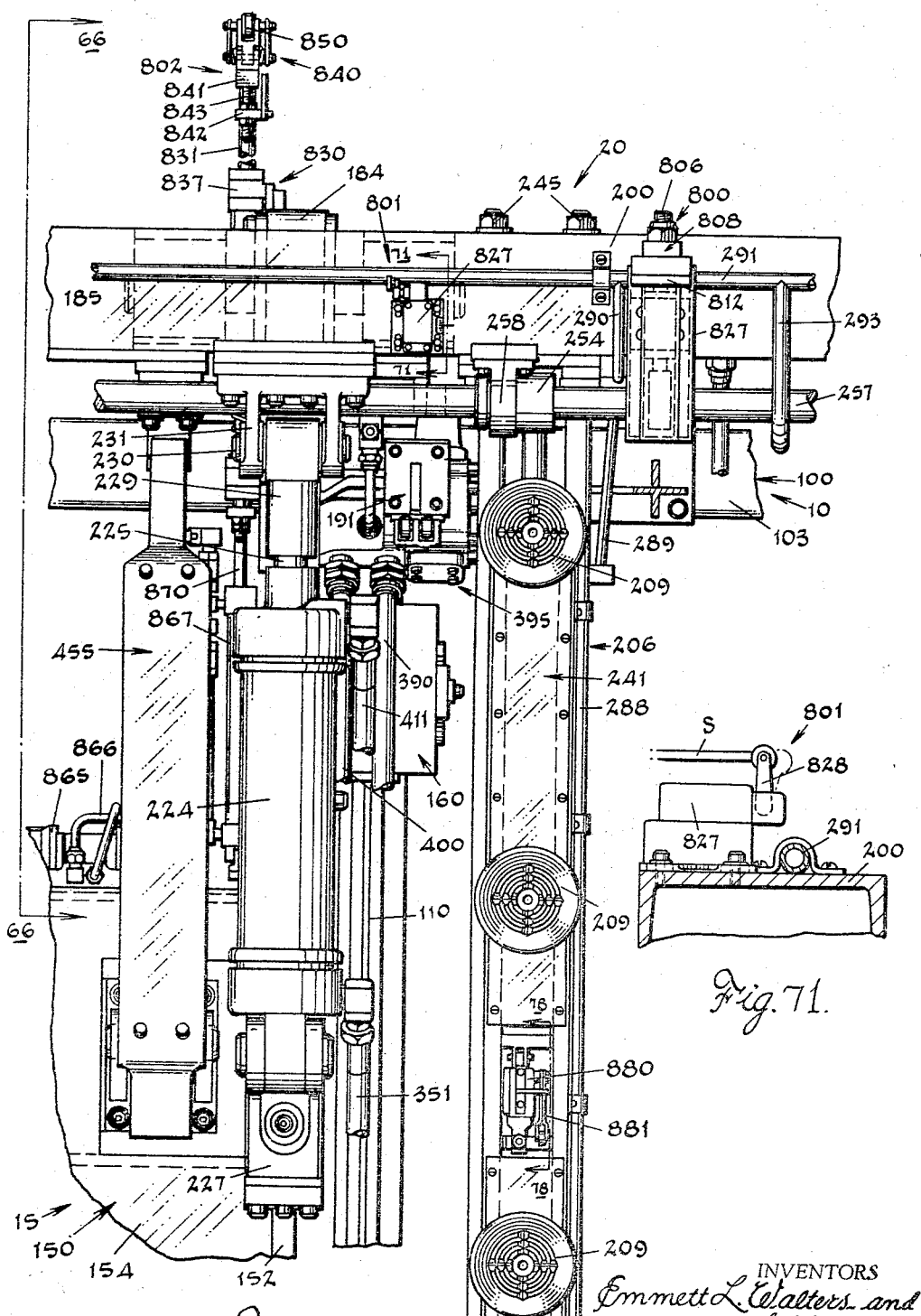
FIG. 65 is an enlarged fragmentary plan view of the apparatus of FIG. 64.
FIG. 71 is a longitudinal vertical section taken on line 71—71 of FIG. 65.

As seen in FIGS. 64 and 71, the responsive means 801 includes at least two electrical limit switches 827 spaced along the beam 200 and having arms 828 adapted to be engaged by the leading edge of a glass sheet and operated to activate the switch, about which more will be said later, as the said edge is moved into engagement with the faces of the locator devices.

Figures 72, 73:
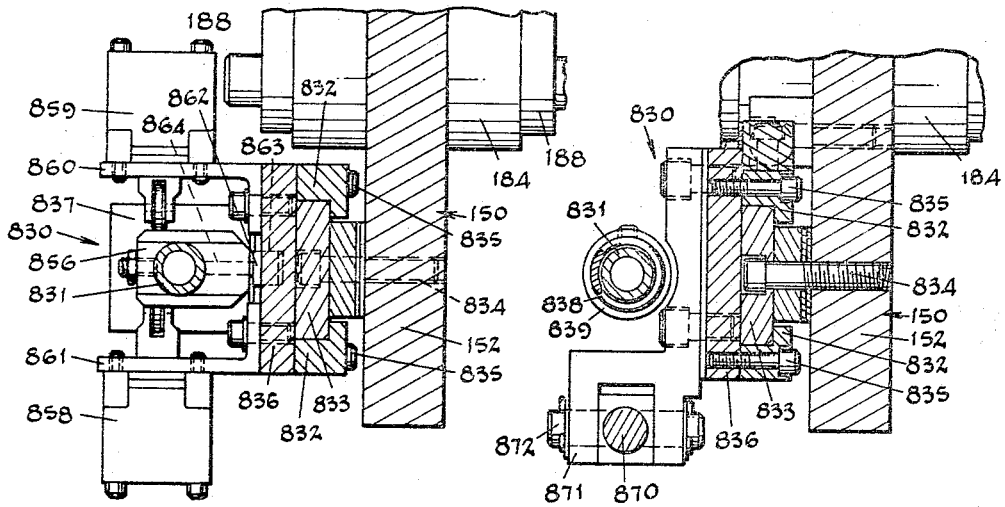
FIG. 72 is a transverse vertical section taken on line 72—72 of FIG. 66.
FIG. 73 is a transverse vertical section taken on line 73—73 of FIG. 66.

As viewed in FIGS. 65 and 66, the indexing or gaging device 802 comprises a reciprocally mounted carriage 830 and a rod 831 reciprocally mounted on the carriage. For this purpose, the carriage (FIGS. 72 and 73) is mounted by keeper bars 832 on a horizontally disposed bar or rail 833 secured to the carriage 15 by bolts 834 as on the inwardly disposed surface of the wall 152. The bars 832 are attached by screws 835 to the inner surface of the carriage plate 836 while the rod 831 is slidably mounted in journal blocks 837 attached to the outer surface of the plate 836. The rod 831 is normally positioned in a forwardly projected position by means of a coil spring 838 interposed between a collar 839 secured to the rod and an adjacent journal block.

At its outer end, the rod 831 carries a sensing head 840 which includes a block 841, slidable relative to the rod, and a block 842 secured to the rod and supporting a threaded rod 843 fixed in the block 841. In this connection, it will be noted in FIG. 70 that the block 842 is equipped with a finger 844 adapted to register with legends 845 on one side of the block 841 and by means of which a predetermined location of the gaging device generally can be established by use of nuts 846 on the threaded rod 843.

The actual sensing element is provided in the form of a roller 850 of non-abrasive material that is carried by an axle 851 in the bifurcated end of an arm 852 swingably mounted on the block 841 by an axle 852'. The arm is biased into the operative full line position of FIGS. 66 and 70 by suitably bent spring 853 which spring permits the roller and arm to be swung downwardly when necessary to avoid inadvertent collision with a glass sheet.

In operable use, the rod 831 is adapted to be moved relative to the carriage plate 836 against the compression of the spring 838; this action occurring during initial contact of the roller 850 against the surface of the outermost stacked sheet and continuing until the forward movement of the carriage is halted. At this interval when the carriage stops and the sheet is supported on the vacuum frame preparatory to its placement on the transfer buck, the carriage 830 is bodily moved rearward to remove the indexing device and particularly the roller 850 from the path of the sheet. Thus, as viewed in FIG. 66, 67 and 68 the usual forward position of the roller 850 is shown in full line in FIG. 66 and in broken line in FIG. 67. The spacing between the roller positions in the broken and full line positions of FIG. 67 may be employed by way of example to indicate distance the rod is retracted against compression of the spring 838. On the other hand, the broken line 855 is in FIG. 68 illustrates, by way of example, a suitable distance to be traversed by the roller 850 as the carriage 830 is moved rearwardly.

These step-wise movements of the rod have more particular reference to automatically actuated control devices that are responsive to several positions of the rod. Thus, following contact of the roller 850 with a glass surface and while the carriage is moving forward, an actuator member 856 on the rod is adapted to cause one control device, such as the electrical limit switch 857, to become responsive during continued movement of the carriage 15 to produce deceleration of the speed of its forward movement. At a predetermined limit of such decelerated movement, the actuator block 856 is moved into a position such that it engages a second control device, such as the limit switch 858, which is responsive to such engagement to produce halting of the carriage. In the event that the switch 858 fails to function properly and the carriage continues to move forward, a third means becomes responsive by the actuator block to completely open the circuit of the cylinder 135 as will be hereinafter more fully explained. This third means, or electrical limit switch 859, and the limit switch 857 are mounted by a bracket 860 on the upper margin of the carriage plate 836 while the limit switch is mounted thereunderneath by a bracket 861.

Figure 74:
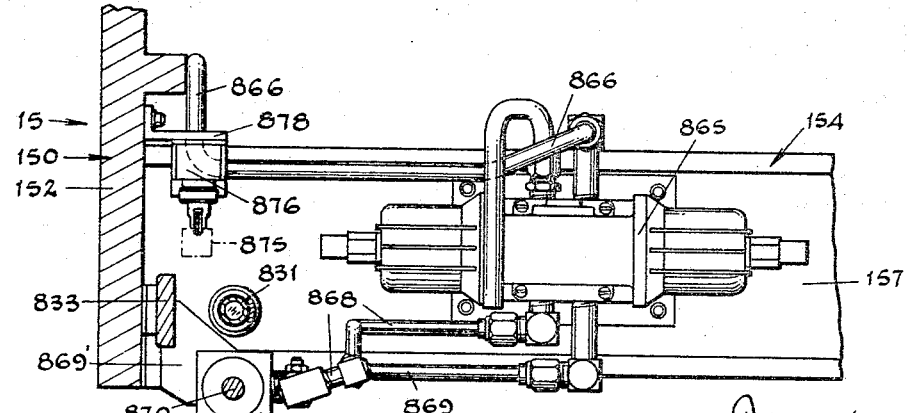
FIG. 74 is a transverse vertical section taken on line 74—74 of FIG. 66.

The limit switch 858 is also instrumental in causing retraction of the carriage 830 with roller 850 to the position of FIG. 68 and to this end, completes a circuit to one side of a valve 865 that is carried on the front transverse wall 157 of the carriage chassis 150. As viewed in FIGS. 67 and 74, the valve 865 is connected to a source of pressure, such as air under pressure through conduit 866, to the forward end of a cylinder 867 by conduit 868 and to the opposite end of the cylinder by conduit 869. The cylinder is supported on the carriage wall 152 by bracket 869' and is connected by its piston rod 870 to the carriage plate 836 at the block 871 by pin 872 as in FIG. 73.

Upon introduction of pressure into the forward end of the cylinder, the piston rod 870 will move the indexing device from the position of FIG. 66 to the position of FIG. 68. In so moving, the carriage plate, by means of a supported actuator bar 875, sequentially causes the engagement of limit switches 876 and 877 mounted by bracket 878 on wall 152. In the first instance, the switch 876 constitutes means responsive to the foremost position of the carriage plate 836 and roller 850 to indicate that the apparatus generally is positioned for a subsequent operative cycle. This would be similar to the position of the apparatus as viewed in FIG. 2 and with the roller 850 supported by the rod 831 in its forward position as in FIG. 66. The limit switch 877 is responsive to movement of the carriage 830 to the inner or rearward limit of its motion and thus is adapted to halt the direction of pressure through the valve 865.

Figure 78:
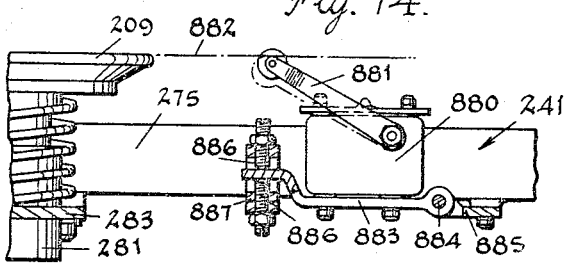
FIG. 78 is a fragmentary detail view of a control device for the apparatus of FIG. 64.

As viewed in FIGS. 64 and 78, each of the support arms 205 and 206 for the vacuum cups 209 supports a means, such as the limit switch 880, the arms 881 of which are responsive to the position of the adjacent vacuum cups as they are raised into active contact with the undersurface of a glass sheet, as indicated by the broken line 882, and as the sheet is stationarily supported on the conveyor belts 115 and with its leading edge against the several locating devices 800. These switches are only operable, in the automatic cycling of a loading operation, after a glass sheet has been positioned on a buck or supporting apparatus and released from engagement with the vacuum cups 209 as will later hereinafter be described. Each switch is adapted to be adjusted to vary the operative position of the related arm 881 by means of a plate 883; said plate being pivotally carried at one end on a pin 884, mounted in a bracket 885 attached to the associated bar member 241. The opposite end of plate 883 is interposed between opposed adjusting screws 886 supported in a fixed bracket 887.

With reference now to FIGS. 79 and 80, there is shown an arm 890 secured at one end to the rear wall 157 of the body or chassis 150 of carriage 15. The arm 890 adjacent to its opposite or outer end is formed with pairs of longitudinally aligned and parallel slots 891, 892, 893 and 894. The slot 891 is used to adjustably locate a cam member 895 by screws 896 with reference to the position of the carriage when a predetermined number of sheets or a predetermined thickness of the stacked sheets has been reached. The slot 892 is spaced from the slot 891 and employed for the same purpose when a smaller total number of sheets are to be stacked on the sides of a supporting apparatus. Likewise, a cam member 897 is similarly adjustably located by screws 898 passed through either of the slots 893 or 894. The cam members 895 and 897 are employed in connection with means responsive to the position of the carriage and/or indexing device 802 and as the roller 850 engages the surface of the outermost stacked sheet at the above-described predetermined thickness of the stack.

Thus, when the desired number or total thickness of sheets to be transferred and stacked on one side of the supporting apparatus is reached, the cam member 895 is adapted to engage an electrical limit switch 899 which is instrumental in causing an audible or visual alarm to alert an operator that a fully loaded condition on one side of the buck is being approached and lacks only the stacking of a few more sheets. On the other hand, the cam member 897, which is located in rearwardly spaced relation to the cam member 895, will subsequently engage an electrical limit switch 900 which is adapted to energize a second warning device, if desired, and simultaneously halt further automatic loading operation of the transfer apparatus. The switches 899 and 900, as shown in FIGS. 79 and 80, are mounted on a common bracket 901 attached to a beam 105 of the base framework 10.

Figure 81:
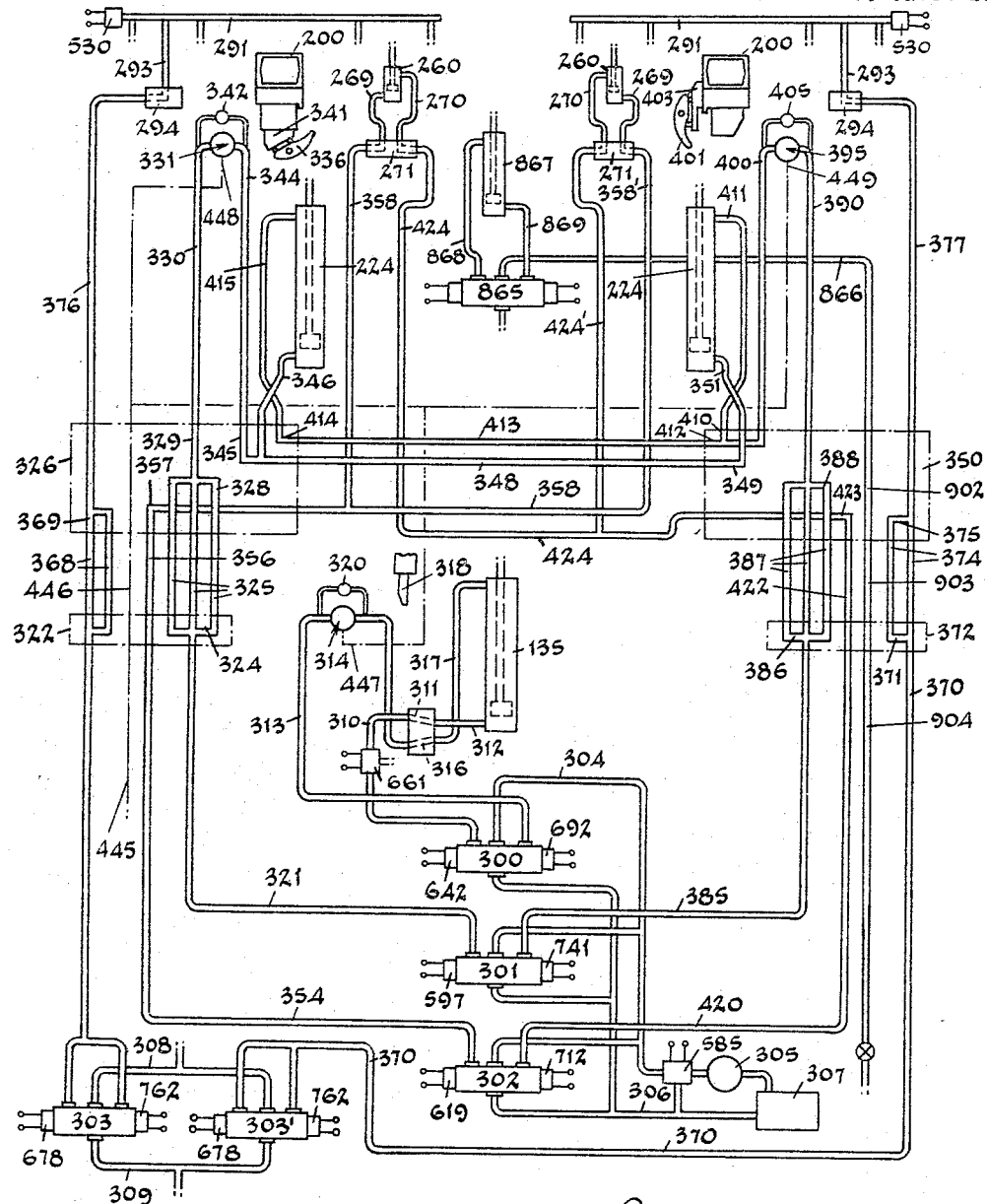
FIG. 81 is a fragmentary plan view of the hydraulic system for the apparatus of FIG. 64.
Figure 82:
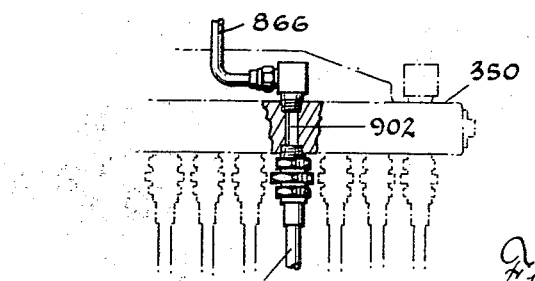
FIG. 82 is a diagrammatic view of the hydraulic system of the apparatus of FIG. 64.

Referring to the hydraulic system employed in connection with the transfer apparatus AA, the same is diagrammatically shown in FIG. 81 as embodying essentially all of the valves, cylinders and piping arrangements therebetween which were described in connection with FIG. 59. For the purpose of the modified embodiment of this invention, there is additionally provided the valve 865, cylinder 867 and supply pipe 866 for air under pressure. The pipe 866 is connected through the passageway 902 in distributor manifold block 350, as in FIG. 82, to a flexible tubing 903 and thence through the supply manifold block 372 to a source pipe 904.

Figure 84:
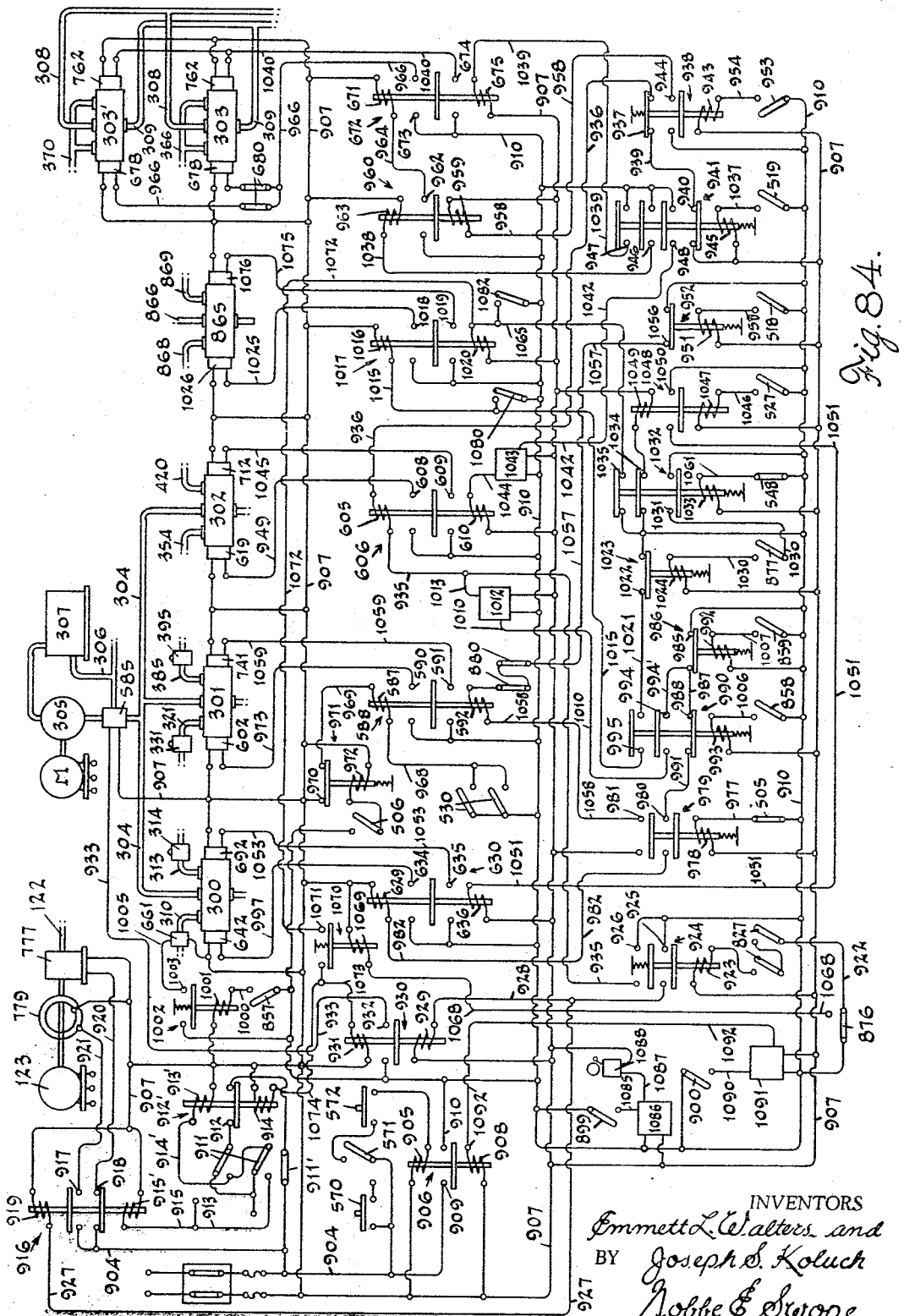
FIG. 84 is a diagrammatic view of the electric control system for the apparatus of FIG. 64.

In FIG. 84, there is shown one electrical system that can be employed to automatically produce the sequentially occurring phases of a transfer operation of the modified form of apparatus. According to this mode of operation, the carriage 15 is located at one or the rear limit of its movement and the vacuum frame 20 is located in a substantially horizontal plane coincident with the plane of the conveyor. As viewed in FIG. 83 and in response to entry of a sheet or blank of glass from the conveyor onto the conveyor belts 115 of the apparatus AA, the plurality of vacuum cups are raised sufficiently to engage the undersurface of the sheet by vacuum; the vacuum frame 20 is pivotally swung forwardly upward to substantially the plane of the supporting apparatus and the carriage is moved toward the forward limit of its motion adjacent said apparatus. The indexing device 802 determines the limit of this forward motion and then causes the carriage to halt preparatory to the actual stacking of the sheet on the buck or supporting apparatus. The vacuum frame in timed relation is swung rearwardly downward and the carriage moved rearwardly to complete each cycle of the operation.

As previously described in connection with the electrical diagram of FIG. 60, a series of manual switches 570, 571 and 572 are utilized to "re-set" the system, to reverse the control of such system from "Manual" to "Automatic," and to then initiate the automatically recurring cycles of operation. In the present instance, switches 570 and 571 are employed for the same purposes. The switch 572 when temporarily closed, in the diagram of FIG. 84, is effective to complete a circuit from source line 904 through the switch 571 and through the solenoid 905 of a relay switch 906 to source line 907; said relay having opposed solenoid 908 and contacts 909, whereupon a source supply line 910 will be completed to the electrical devices of the apparatus.

In further consideration of FIG. 84, it was earlier explained that a glass sheet, being moved along a delivery conveyor DC (FIG. 83) and reaching a position laterally aligned with a transfer apparatus, will be halted, raised and carried onto the transfer apparatus. Thus, means responsive to the position of the sheet on the delivery conveyor is adapted to produce these sequential functions and as herein provided includes a pair of electrical limit switches 911. When engaged by a glass sheet, the pair of switches 911 complete a circuit from source line 904 through a manually controlled switch 911' and the presently engaged contacts 912 of a relay switch 912' to line 913; said relay switch being equipped with opposed solenoids 913' and 914. The circuit of line 913 is to be understood as adapted to activate electrical devices which, although not herein shown, temporarily halt normal operation of the particular area of the delivery conveyor; cause the elevation and operation of an auxiliary conveyor and thereby movement of the glass sheet laterally from the delivery conveyor onto the conveyor belts 115 of the affected transfer apparatus. The manual, normally closed switch 911', when selectively opened, prevents occurrence of this series of operations whereby the glass sheet entering the said area will be further carried by the delivery conveyor to the similar area of an adjoining transfer and loading apparatus.

Also, when a circuit is completed for the above purposes through the switches 911 to the line 913, a branch circuit is completed by line 914' through the solenoid 913' of relay switch 912' to source line 907. This operates to disengage the contacts 912 to open the circuit from source line 904 to the switches 911. Consequently during the interval of time the transfer apparatus is carrying out its normal cycle of operation and is not in the rest position with the plurality of cups 209 on the vacuum frame 20 located beneath the conveyor belts 115, the arrival of a subsequent glass sheet into the area of the delivery conveyor adjacent a transfer apparatus then in the process of stacking a preceding sheet will not establish a circuit through the switches 911 in the normally expected manner. When the apparatus has fully returned to the rest position, the solenoid 914 is energized as will hereinafter be described, to produce engagement of the contacts 912 of the relay switch 912' with resultant restoration of the circuit between source line 904 and the pair of switches 911.

By branch line 915, line circuit 913 is completed through the solenoid 915' of relay switch 916 and to source line 907. Relay switch 916 is equipped with pairs of contacts 917 and 918 and an opposed solenoid 919. In response to previous action of the solenoid 919, as will shortly be explained, the pair of contacts 917 are disengaged while the contacts 918 are engaged to complete a circuit from source line 904 by line 920, through magnetic brake 777 to source line 907. However, when solenoid 915' is energized, contacts 918 are disengaged while contacts 917 are engaged to complete a circuit from line 904 by line 921 through electromagnetic clutch 779 to source line 907 thereby permitting motor 123 to operatively drive the shaft 122 and belts 115 of conveyor 114 associated with the transfer apparatus. Of course, when a glass sheet has been moved onto the conveyor 114, the limit switches 911 will be released to open the circuit to solenoid 915' though lines 913 and 915. Also, as the leading edge of the sheet moves into engagement with each of the several locating devices 800, the sheet will be properly located with respect to the vacuum frame and said edge will engage and operate to close the limit switches 827.

The limit switches 827 are adapted to establish a circuit from source line 910 by line 922 through normally closed limit switch 876, through solenoid 923 of spring-biased relay switch 924 and to source line 907; switch 924 being equipped with pairs 925 and 926 of normally open contacts. When engaged, contacts 925 establish a circuit from supply line 910 by line 927 through the solenoid 919 of relay switch 916 and thence to source line 907, which as abovementioned acts to disengage contacts 917 to deenergize clutch 779 and energize brake 777 through contacts 918. This halts movement of the glass sheet by the conveyor 114 preparatory to actual transfer of the sheet to the supporting apparatus or buck B. Through branch line 928, the circuit of line 927 also completes a circuit through the solenoid 929 of relay switch 930 to source line 907; said relay switch having opposed solenoid 931 and contacts 932. Solenoid 929 causes engagement of contacts 932 to establish a circuit from supply line 910 by line 933 through solenoid valve 585 and to source line 907. As previously described, solenoid valve 585 is located in pipe 304 on the pressure side of pump 305 and, when the transfer apparatus is at rest position, functions to restrict or reduce the pressure of a fluid carried by pipe 304 to the solenoid valves 300, 301 and 302. Consequently, when a circuit through line 933 is made, this pressure restriction at valve 585 is removed.

Upon engagement of contacts 926 of relay switch 924, a circuit is completed from supply line 910 by line 935 through the solenoid 605 of relay switch 606 and thence by line 936 through presently engaged contacts 937 of a spring-biased relay switch 938, line 939, presently engaged contacts 940 of a spring-biased relay switch 941 to source line 907. Relay switch 938 is equipped with solenoid 943 and a pair of normally open contacts 944 while relay switch 941 is similarly equipped with solenoid 945 and pairs of normally open contacts 946, 947 and 948.

Energization of solenoid 605 produces engagement of contacts 608 to establish a circuit from supply line 910 by line 949 through the side 619 of solenoid valve 302 to source line 907. This operates to connect pipe 304 to pipe 354 which will direct pressure to the lower ends of cylinders 260. These cylinders through levers 265 are adapted to rotate the rock shaft 257 and thus swing the several pivot levers 254. Upon rotation of the rock shaft 257, cam 511 (FIG. 26) is moved from engagement with limit switch 518 to complete the circuit of line 950 from source line 910 through solenoid 951 of spring-biased relay switch 952 to source line 907. Through links 253 and 255, the bell-crank levers 249 and 250 move the vacuum cups 209 on bar members 241 upwardly into engagement with the bottom surface of the glass sheet. The amount of rotation of shaft 257 to achieve this action is controlled by the position of a one-way limit switch 953 operatively located with limit switch 527 (FIG. 27) on bracket 528. Upon temporary closure of limit switch 953, a circuit is made from supply line 910 by line 954 through solenoid 943 of relay switch 938 to source line 907. This action disengages contacts 937 to open the circuit to solenoid 605 through lines 935, 936 and 939 thereby disengaging contacts 608 and neutralizing the valve 302. Also during movement of the vacuum cups into contact with the glass sheet, the limit switches 880 on vacuum support arms 205 and 206 will be caused to open (FIG. 78).

Also upon engagement of contacts 944 of relay switch 938, a circuit will be completed from source line 910 by line 958 to the solenoid 959 of relay switch 960 to source line 907; switch 960 having a pair of normally open contacts 962 and opposed solenoid 963. When contacts 962 are engaged, a circuit is established from supply line 910 by line 964 through solenoid 671 of relay switch 672 to source line 907. This acts to engage contacts 673 whereby a circuit from supply line 910 is completed by line 966 through sides 678 of solenoid valves 303 and 303' to opposite source line 907. As previously noted, the circuits to the valve sides 678 can be individually controlled upon use of the normally closed manual switches 680, to selectively disconnect the vacuum cups 209 on either side of the vacuum frame 20 from the source of vacuum.

Simultaneously with movement of the several bar members 241 relative to the associated base frames 240, rotation of the collar 824 on shaft 257 also removes cam 825 from engagement with the surface 818 on the block end 815 of the rod 806 and the springs 820 thus become operable to move the strips 812 out of registry with the leading edge of the sheet. During the eventual further movement of the vacuum cup bar members 241 to a position, as shown in full line in FIG. 77, the locating devices 800 are suitably spaced from the edge of the sheet.

When a satisfactory vacuous condition has been produced by the vacuum cups at the glass surface, the previously described switches 530, connected to the supply pipes 291, are adapted to complete a circuit from supply line 910 by line 968 through the solenoid 587 of relay switch 588 and by line 969 through the presently closed contacts 970 of a spring-biased relay switch 971 to source line 907; switch 971 having solenoid 972. Contacts 590 then complete a circuit from supply line 910 by line 973 through side 602 of solenoid valve 301 to source line 907. Connection of the pressure in pipe 304 to pipe 321 is directed to cylinders 224 which results in forwardly upward pivotal movement of the vacuum frame 20 toward the plane of the supporting apparatus. As motion of the frame is initiated, the cam 501 (FIG. 54) releases the limit switch 505 and, as the frame 20 approaches an angular position substantially coincident with the plane of the supporting apparatus or buck B, the flow valve 331 acts to reduce the rate of its movement until the opposed cam 502 on shaft 185 engages and activates the limit switch 506.

As herein provided, release of the limit switch 505 opens the circuit of a line 977 connecting through the solenoid 978 of a spring-biased relay switch 979 to source line 907. Relay switch 979 is equipped with pairs of contacts 980 and 981; contacts 980 thereby being adapted when engaged to complete a circuit from supply line 910 by line 982 through solenoid 629 of relay switch 630 to source line 907.

With regard to circuit line 982 and contacts 980, it will be noted that the circuit from supply line 910 is by way of normally engaged contacts 985 of relay switch 986, line 987, presently engaged contacts 988 of relay switch 990 and line 991. Relay switch 986 includes solenoid 992 while relay switch 990 includes solenoid 993 and also presently disengaged pairs of contacts 994 and 995.

Energized solenoid 629 produces engagement of contacts 634 whereby a circuit is completed from supply line 910 by line 997 to side 642 of solenoid valve 300 to source line 907. This serves to connect pressure pipe 304 to the rear end of cylinder 135 by pipe 310 with resulting motion of the carriage 15 toward the transfer buck B.

Since the movement of the carriage 15, in the modified embodiment of the invention, is monitored by the indexing device 802, means is herein provided to respond to the action of the indexing device as it is carried into contact with the surface of the outermost sheet.

To this end, when the roller 850 makes contact with the glass sheet and the carriage continues to move forward, the support rod 831 therefor is moved rearwardly against the spring 838 and, by the member 856, produces actuation of the limit switches 857 and 858 in sequence. In the case of switch 857, a circuit is completed from source line 910 by line 100 through the solenoid 1001 of relay switch 1002, having contacts 1003, to source line 907, Contacts 1003 when engaged establish a circuit by line 1005 from supply line 910 through the restriction valve 661 to source line 907. The valve 661 is located in pipe 310 to cylinder 135 and operates to decelerate the speed of movement of the carriage to reduce inadvertent or abrupt jarring as it is halted.

At the predetermined limit of retarded movement of the carriage, the actuator member 856 engages limit switch 858 to halt the carriage preparatory to transfer of the glass sheet to the supporting apparatus. Switch 858 thus completes a circuit by line 1006 from supply line 910 through solenoid 993 of relay switch 990 to source line 907. This results in disengagement of contacts 988 and engagement of contacts 994 and 995. In the first instance, breaking of the line circuit 982–991–987 at contacts 988 to the solenoid 629 causes disengagement of contacts 634 and disconnection of pipe 304 from pipe 310 at valve 300 to halt the carriage 15.

To insure that further forward movement will be prevented in the event that limit switch 858 does not function, continued rearward movement of the rod 831 moves the actuator member 856 into engagement with the emergency limit switch 859 which then becomes effective to complete a circuit from supply line 910 by line 1007 through the solenoid 992 of relay switch 986 to source line 907. This produces disengagement of contacts 985 to break the circuit of lines 910 and 987 otherwise connecting to line 982 through line 991. In other words, the emergency action of limit switch 859 insures that the carriage will halt and further that the vacuum bar members 241 will not be actuated to place the supported glass blank on stack of sheets, as hereinafter noted.

However, during normally expected continuation of operation of the apparatus, when the relay switch 990 is activated and the contacts 988 are disengaged, the presently engaged contacts 994 initiate further movement of the bar members 241 while the contacts 995 produce retraction of the indexing device 802. Thus, contacts 994 complete a circuit by line 1010 from the supply line 910 through line 994′ and normally engaged contacts 985 to a timing relay 1012; the same being connected to source lines 910 and 907. As mentioned above, in the event that the solenoid 992 is energized by limit switch 859, the disengagement of contacts 985 opens the circuit from source line 910 to lines 987 and 994′.

The timer 1012 is adjusted to monitor a short interval of time, during which the carriage is halted and to then initiate further forward movement of the bar members 241. To this end, the timing relay is connected by line 1013 to line 935 and thus originates a second line circuit through solenoid 605. Upon engagement of the contacts 708, the line 949 is re-established to side 619 of solenoid valve 302 with resulting connection of pressure from pipe 304 to pipe 354 and cylinders 260.

Contacts 995 of relay switch 990 complete a circuit by line 1015 through the solenoid 1016 of relay switch 1017 to source line 907; said relay switch being equipped with pairs of contacts 1018 and 1019 and opposed solenoid 1020. The circuit of line 1015 is maintained from supply line 910 by line 1021 through normally closed contacts 1022 of relay switch 1023 having solenoid 1024. While solenoid 1016 is energized, a circuit from supply line 910 is completed through contacts 1018 and by line 1025 through side 1026 of solenoid valve 865 to source line 907. Valve 865 connects air supply pipe 866 to the forward end of cylinder 867 through conduit 868 which acts by piston rod 870 to move the indexing device 802 bodily rearward until the bar 875 engages limit switch 877. As shown in FIG. 68, during rearward movement of the bar 875 with the carriage plate 836, the limit switch 876 is first engaged to break the circuit of line 922 from supply line 910 to the switches 827 but then becomes effective to complete a circuit from supply line 910 for reasons to be later described. Consequently, until the bar 875 is moved from engagement with the switch 876 when the indexing device 802 is bodily located in the forward active position, subsequent entry of a glass sheet onto apparatus conveyor 114 and engagement with the switches 827 will not initiate the usual cycle of operation. Provision of such a control means ensures inter alia that the carriage 15 cannot be moved forward unless the indexing device 802 is properly positioned.

When the bar 875 is carried into engagement with the limit switch 877, as in FIG. 68, a circuit will be established from supply line 910 by line 1030 through presently engaged contacts 1031 of a spring-biased relay switch 1032, switch 877 and solenoid 1024 of relay switch 1023 to source line 907. Relay switch 1032 is also provided with presently disengaged pairs of contacts 1034 and 1035 and a solenoid 1033 adapted to be energized by presently open limit switch 548. Energization of solenoid 1024 acts to disengage contacts 1022 of relay switch 1023 to open the circuit of lines 1015–1021 to the solenoid 1016 of relay switch 1017 thereby neutralizing valve 865 upon opening of line circuit 1025.

Since contact pressure is removed by retraction of the roller 850 from contact with the outermost stacked sheet, the spring 838 operates to move the rod 831 outwardly relative to the retracted carriage plate 836 thereby withdrawing the actuator member 856 from engagement with limit switches 857 and 858. This, in the first instance, permits disengagement of contacts 1003 of the relay switch 1002 to remove the restricting influence of valve 661 in pipe 310. In the second instance, release of switch 858 de-energizes the solenoid 993 of relay switch 990.

However, in the continuing sequence of operation the sheet is placed against the outermost stacked sheet on the transfer buck. In this connection, it will be remembered that, due to the mounted arrangement of the vacuum cups 209 on the bar members 241 of the support arms 201–208, the sheet will be deflected in an arcuate plane as it is placed on edge against the adjacent stacked sheet. Consequently, a complete face to face relation will neither be possible until the vacuum cups are removed from the sheet nor will the surfaces of the sheets be marred as by scratching during the stacking operation. The bar members 241 are thus moved to their outwardly spaced relation from the associated base members 240 as the rock shaft 257 is further rotated and causes engagement of limit switch 519 by cam 512. This switch (FIG. 26) is adapted to then complete a circuit from supply line 910 by line 1037 through solenoid 945 of relay switch 941 to source line 907. The contacts 940 are then disengaged to open line 939 while pairs of contacts 946, 947 and 948 are engaged. Contacts 946 complete a circuit from supply line 910 by line 1038 through solenoid 963 of relay switch 960 to source line 907; this operating to disengage contacts 962 with resultant opening of line 964 and de-energization of solenoid 671 of relay switch 672 with closure of the vacuum supply at valves 303 and 303′. Simultaneously, contacts 947 complete a circuit by line 1039 from supply line 910 through solenoid 675 of relay switch 672 to source line 907 thereby engaging contacts 674. These contacts complete a circuit from supply line 910 by line 1040 through sides 762 of solenoid valves 303 and 303′ to source line 907. Consequently, with closure of the vacuum pipe 308 to pipes 366 and 370 and connection of the same to air pressure pipe 309, the vacuous connection of the vacuum cups 209 to the sheet is relieved and the ensuing air pressure serves to positively free the cups from the surface of the presently stacked sheet.

Contacts 948 complete a circuit from supply line 910 by line 1042 through timing relay 1043, connected to source lines 910 and 907, which monitors a short interval of time while the vacuum cups are released from the sheet by air pressure and then causes the bar members 241 to move toward their associated base frames 240. In other words, the timing relay 1043 completes a circuit by line 1044 through the solenoid 610 of relay switch 606 to source line 907. This produces engagement of contacts 609 to establish a circuit from supply line 910 by line 1045 through side 712 of solenoid valve 302 to source line 907. Valve 302 thereupon connects pressure pipe 304 to pipe 420 which supplies pressure to the upper ends of cylinders 260. Through levers 265, rock shaft 257 is reversely swung and carries the cam 523 into temporary engagement with limit switch 527 which establishes a circuit from supply line 910 by line 1046 through the solenoid 1047 of relay switch 1048 to source line 907. Said relay switch has opposed solenoid 1049 and normally disengaged contacts 1050. A circuit through contacts 1050 connects by line 1051 from source line 910 through solenoid 636 of relay switch 630 to source line 907. Energization of solenoid 636 engages contacts 635 to complete a circuit from supply line 910 by line 1053 through side 692 of solenoid valve 300 to source line 907. Valve 300 now connects pipe 304 to the forward end of cylinder 135 through pipe 313 to move the carriage 15 rearwardly and away from the supporting apparatus.

As the shaft 257 reaches the limit of its rotation to position the several bar members 241 adjacent their respective base frames 240, the cam 511 simultaneously engages limit switch 518 to open the same. This de-energizes solenoid 951 and permits spring-biased relay switch 952 to close the contacts 1056 thereof to create a circuit from supply line 910 by line 1057 through the presently closed limit switches 880 and the solenoid 592 of relay switch 588 and line 1058 through presently engaged contacts 981 of relay switch 979 to source line 907. As above mentioned, the limit switches are responsive to the position of a glass sheet on the vacuum cups 209 and consequently are open until the sheet is stacked and released from the cups. The contacts 591 of relay switch 588 when engaged complete a circuit from supply line 910 by line 1059 through side 741 of solenoid valve 301 to source line 907. Connection of pipe 304 to pipe 385 directs pressure to the forward ends of cylinders 224 thereby pivoting the vacuum frame 20 rearwardly downward with the flow valve 395 governing the amount of pressure to said cylinders as the rest position is approached. During this movement of the vacuum frame, the cam 502 disengages limit switch 506 thereby de-energizing solenoid 972 and permitting contacts 970 of relay switch 971 to re-engage. This would re-establish the circuit through the solenoid 587 of relay switch 588 except for the fact that, with no reduction of pressure, i.e. no vacuum, presently in the pipes 291, the line 968 at switches 530 is open.

At the opposite limit of movement of the frame, the cam 501 re-engages the switch 505 to again energize solenoid 978 of relay switch 979 through line 977 from supply line 910 to opposite source 907. This causes disengagement of the pairs of contacts 980 and 981; particularly opening the circuit through solenoid 592 at line 1058 to disengage contacts 591 of relay switch 588 to neutralize the valve 301 and the circuit through solenoid 629 of relay switch 630 by line 982.

As the carriage 15 approaches its rest position adjacent a delivery conveyor, the cam 318 actuates the flow valve 314 to reduce the force of pressure conducted through pipe 313 to cylinder 135. At the limit of its rearward movement, cam 551 carried on the arm 319 on the carriage engages limit switch 548 to reclose the same. This switch is adapted by line 1061 from supply line 910 to establish a circuit through the solenoid 1033 of spring-biased of relay switch 1032 to source line 907. This operates to disengage contacts 1031 thereby opening the circuit of line 1030 through solenoid 1024. However, since the circuit via lines 1015–1021 to solenoid 1016 is already open at contacts 995, opening of line 1030 to presently closed limit switch 877 will be of no effect.

Presently engaged contacts 1034 complete a circuit from supply line 910 through solenoid 1049 of relay switch 1048 to source line 907 thereby disengaging contacts 1050 to break the circuit of line 1051 to solenoid 636 of relay switch 630. The thus disengaged contacts 635 open the circuit of line 1053 to neutralize solenoid valve 300 and stop rearward movement of the carriage. Contacts 1035 of relay switch 1032 simultaneously establish a circuit from supply line 910 by line 1065 through solenoid 1020 of relay switch 1017 to source line 907.

As hereinabove noted in connection with engagement of limit switch 876 while engaged by the bar 875, a circuit will have been established from supply line 910 by line 1068 through the solenoid 1069 of spring-biased relay switch 1070 to source line 907. This operates to hold the contacts 1071 engaged while the line 1068 is thus maintained. Line 1065 can thus be extended by line 1072 through presently engaged contacts 1071 and line 1073 through solenoid 931 of relay switch 930 to source line 907. Disengagement of contacts 932 results in opening of the circuit of line 933 to the valve 585 whereupon active pressure from the pump 305 to pipe 304 is reduced. The circuit of line 1073 is also adapted by branch line 1074 to be completed through solenoid 914 of relay switch 912′ to source line 907. Upon restoration of the line circuit from source line 904 through contacts 912 to the limit switches 911, the same will be adapted upon engagement by a subsequent glass sheet to initiate another cycle of operation of the loading apparatus AA.

At the same time, the circuit of line 1065 through solenoid 1020 of relay switch 1017 produces a circuit at contacts 1019 from supply line 910, through line 1075 to side 1076 of valve 865 to source line 907. Air supply pipe 866 now being connected through conduit 869 actuates the piston rod 870 of cylinder 867 to move the carriage plate 836 and indexing device 802 bodily to its forward position. During such forward motion, the retraction of bar 875 from limit switch 877 permits the contacts 1022 of relay switch 1023 to re-engage and restore the circuit of line 1021 to one side of presently open contacts 995. Also at the forward limit of movement of the indexing device, the bar 875 will disengage the limit switch 876 to open the circuit of line 1068 while re-establishing the circuit of line 922 to limit switches 827.

When it becomes necessary to remove a loaded support apparatus or transfer buck from the vicinity of the apparatus AA, it is desirable that the indexing device 802 be withdrawn from its forward operative position and then returned to the operable position after replacement of a transfer buck in properly spaced relation from the adjacent end of the apparatus. To this end, a normally open, manually controlled switch 1080 is adapted to complete a circuit from supply line 910 through line 1015 to the solenoid 1016 of relay switch 1017. As previously described, this will complete the circuit of line 1025 to valve 865 to connect pipe 866 through valve 865 to conduit 868 with resultant rearward movement of the indexing device. In like manner, a normally open, manually controlled switch 1082 is adapted to connect source line 910 to line 1065 and complete a circuit through opposed solenoid 1020 to source line 907. This will complete the circuit of line 1075 through the side 1076 of valve 865 to source line 907. Accordingly when a support apparatus or transfer buck is positioned for continuation of sheet transferring operations during the automatic cycling of the apparatus AA, the indexing device 802 will have been restored to its operative position.

As discussed earlier in connection with limit switches 899 and 900, it was noted that transfer of glass sheets or blanks from the plane of a conveyor to the plane of a supporting apparatus for stacking purposes could be achieved by the modified embodiment of the invention. In this respect, it will be appreciated that production operators should be warned when the stacking operation nears completion or automatic operation of the transfer apparatus terminated. To this end, the limit switch 899 is engaged during the successive transfer of glass sheets and is associated with a counting or thickness recording device. As shown in FIG. 84, the switch 899 is connected by line 1085 to complete a circuit from supply line 910 to a device 1086; said device being connected to source lines 910 and 907. When the thickness of the stacked sheets reaches a first predetermined limit, the device creates a circuit by line 1087 through an alarm device 1088, such as a bell, to source line 907.

On the other hand, to terminate operation of the transfer apparatus AA when a second predetermined limit or a total thickness of stacked sheets has been reached, the limit switch 900, acting by line 1090 through a second recording device 1091, connected to source lines 910 and 907, eventually causes the said device to create a circuit by line 1092 through the solenoid 908 to source line 907. This operates to disengage contacts 909 of relay switch 906 thereby breaking the circuit of lines 904 and 910 to render the automatic circuitry of the transfer apparatus inoperable.

Briefly reviewing the transfer apparatus of this invention, the structures of both the preferred and modified embodiments are known to be identical and the manner of automatic operation to differ only in the phase of the operation when a sheet of material is supported on the vacuum frame. Thus, in considering the embodiments of the invention, the transfer apparatus includes a base framework 10 on which the carriage 15 is adapted to be moved forwardly and rearwardly between predetermined limits. Co-operating with and mounted on the carriage is a vacuum frame 20 that is adapted during pivotal movements to transfer a sheet, as of glass, between the plane of one support and the plane of a second support. A plurality of vacuum cups 209 are mounted on the vacuum frame 20 by support arms 201–208 to engage and carry a glass sheet with the component members of the arms 240–241 being adapted to move the vacuum cups during the ensuing handling of a glass sheet to place the sheet on edge in face to face stacked relation with like sheets or, vice versa, to remove a sheet from such stacked relation.

With respect to the first embodiment, as viewed in FIGS. 2, 3 and 4, the transfer apparatus A is positioned at one end in spaced relation to a conventional production conveyor C and with a transfer buck B suitably located adjacent its opposite end. During automatically sequential cycles of operation, the carriage 15 and frame 20 move from their positions of FIG. 2 until they are located as in FIG. 3. The vacuum cups 209 are then brought into contact with a sheet S of the stack ST and, after vacuous engagement is made, lift the sheet from the stack before the frame is pivoted rearwardly downward to transfer the sheet from the plane of the supporting apparatus to the plane of the conveyor and as the carriage returns toward the conveyor C. When the carriage and frame have resumed the positions of FIG. 2, the glass sheet is released from the cups and removed onto the conveyor C by the belts 115 of conveyor 114. As hereinabove described, operation of the conveyor C or the position of similar sheets on such conveyor determines the interval of removal of each sheet and consequently one transfer apparatus is adapted to operate in concert with similar apparatus in the same vicinity. When removal of the sheets from the supporting apparatus has been completed, further operation of the transfer apparatus is terminated by actuation of limit switch 561.

In considering the slightly differing aspects of operation specifically relating to the modified embodiment of the invention, reference is made to FIG. 83. As herein disclosed, sheet materials carried in succession along the conveyor DC can be removed at the area of one transfer apparatus AA or selectively be alternatively removed at the area of said apparatus or adjoining similar apparatus. In this event, a sheet moving laterally from the conveyor is received on the conveyor 114 and after being located and halted thereon is contacted by the vacuum cups 209 and then vacuously engaged. In moving forwardly upward, the vacuum frame 20 supports a glass sheet as the carriage 15 moves toward the supporting apparatus. After the frame has transferred the sheet from the plane of the conveyor to the plane of the supporting apparatus or transfer buck, the carriage is halted in spaced relation to the supporting apparatus which distance is determined by an indexing device 802. The sheet is then placed on edge in face to face stacked relation to the preceding sheet and the vacuum frame and carriage return to their rest positions. With this manner of transferring glass sheets, the indexing device operates to successively shorten forward travel of the carriage to agree with the progressively increased thickness of the stacked sheets. When a predetermined thickness is obtained, further operation of the transfer appartaus is first audibly or visually indicated to an operator and then is automatically terminated.

It is to be understood that the forms of the invention herewith shown and described are to be taken as illustrative embodiments only of the same, and that various changes in the shape, size and arrangement of parts may be resorted to without departing from the spirit of the invention.

We claim:
1. In apparatus for automatically transferring individual sheets between a first support apparatus located in one plane and a second support apparatus located in a different plane, a transfer assembly, comprising
(a) a floor-supported framework stationarily mounted adjacent to and in the plane of the first support apparatus,
(b) horizontal support tracks mounted on the framework in spaced parallel relation and transversely of said first support apparatus,
(c) a carriage mounted on said tracks,
(d) means for moving the carriage along said tracks toward and away from said second support apparatus,
(e) means for stopping movement of the carriage when it reaches the limits of its forward and rearward movements,
(f) a vacuum frame pivotally carried by said carriage for transferring successive sheets from one support apparatus to the other support apparatus,
(g) vacuum cup support arms pivotally carried by the vacuum frame to swing about a horizontal axis,
(h) vacuum cups on said support arms for supporting a sheet while being transferred,
(i) means for swinging the vacuum frame relative to the carriage into and out of the plane of the first support apparatus and the plane of the second support apparatus,
(j) means for stopping swinging movement of said vacuum frame when it reaches the limits of its swinging movements,
(k) a cylinder mounted on the vacuum frame,
(l) bell-crank levers pivotally carried by the vacuum frame and connected at one of their ends to the vacuum cup support arms,
(m) a shaft rotatably mounted on the vacuum frame,
(n) linkage means operated by said shaft and connected to the opposite ends of the bell-crank levers,
(o) a lever fixed at one end to said shaft and operatively connected at its opposite end to said cylinder for rotating said shaft and actuating said bell-crank levers,

(p) electrically operable means on said vacuum frame for stopping forward movement of the vacuum cup support arms, (q) second electrically operable means on said vacuum frame for stopping rearward movement of said vacuum cup support arms, (r) means for creating a vacuum at said vacuum cups to support a sheet, (s) means for relieving the vacuum at said vacuum cups to release the sheet, and (t) electrical control means for successively initiating the swinging movement of the vacuum frame, the movement of the vacuum cup support arms relative to the vacuum frame, and the movement of the carriage along said tracks.

2. Apparatus as claimed in claim 1, including electrically operable means on at least one of the vacuum cup support arms responsive to the movement of the vacuum cups toward a sheet supported by the second support apparatus to reduce the rate of forward motion of the vacuum frame.

3. Apparatus as claimed in claim 1, including
(a) conveyor means mounted on said framework in the plane of the first support apparatus and extending in the same direction as said support tracks for moving a sheet along said plane relative to said vacuum frame,
(b) electrical control means on said framework responsive to the position of a sheet on the vacuum frame for initiating operation of the conveyor means,
(c) electrical control means responsive to the position of a sheet on said first support apparatus to prevent operation of the conveyor means,
(d) electrical control means responsive to removal of a sheet from said conveyor means to halt the same, and
(e) electrical control means including electrically operable means responsive to removal of said sheet from said conveyor means for automatically initiating the swinging movement of the vacuum frame, the forward movement of the vacuum cup support arms relative to the vacuum frame, and the movement of the carriage along said support tracks.

4. In apparatus for automatically transferring individual sheets between a support apparatus located in a substantially vertical plane and a conveyor support apparatus located in a substantially horizontal plane, a transfer assembly, comprising
(a) a floor-supported framework stationarily mounted adjacent to and in the plane of the conveyor support apparatus,
(b) horizontal support tracks mounted on the framework in spaced parallel relation and transversely of said conveyor support apparatus,
(c) a carriage mounted on said support tracks,
(d) means for moving the carriage forwardly and rearwardly along said support tracks,
(e) means for stopping movement of the carriage when it reaches the limit of its rearward movement,
(f) a vacuum frame pivotally carried by said carriage for transferring successive sheets from the support apparatus to the conveyor support apparatus,
(g) vacuum cup support arms pivotally carried by the vacuum frame to swing about a horizontal axis,
(h) vacuum cups on said support arms for supporting a sheet while it is being transferred,
(i) means for swinging the vacuum frame relative to the carriage into and out of the plane of the support apparatus and the plane of the conveyor support apparatus,
(j) means for stopping swinging movement of said vacuum frame when it reaches the limits of its swinging movements,
(k) means for moving the vacuum cup support arms forwardly and rearwardly relative to the vacuum frame,
(l) means for stopping movement of the vacuum cup support arms at the limits of their forward and rearward movements relative to the vacuum frame,
(m) electrically operable means on at least one of the vacuum cup support arms responsive to the forward movement of the vacuum cups to reduce the rate of forward movement of the carriage and vacuum frame prior to engagement of the vacuum cups with a sheet on said support apparatus,
(n) a second electrically operable means also on at least one of said vacuum cup support arms actuated by engagement of the vacuum cups with said sheet to stop the forward movement of the carriage and vacuum frame and to create a vacuum at the vacuum cups,
(o) means for relieving the vacuum at the vacuum cups when the sheet is to be transferred from the vacuum frame to the conveyor support apparatus, and
(p) electrical control means for successively initiating the swinging movement of the vacuum frame, the movement of the vacuum cup support arms relative to the vacuum frame, and the movement of the carriage along said support tracks.

5. Apparatus as claimed in claim 4, including
(a) conveyor means mounted on said framework in the plane of the conveyor support apparatus and extending in the same direction as said support tracks for moving a sheet along said plane relative to said vacuum frame,
(b) electrical control means on said framework responsive to the position of the vacuum frame for initiating operation of the conveyor means,
(c) electrical control means responsive to the position of a sheet on said conveyor support apparatus to prevent operation of said conveyor means,
(d) electrical control means responsive to removal of a sheet from said conveyor means to halt the same, and
(e) electrical control means including electrically operable means responsive to removal of said sheet from said conveyor means for automatically initiating the swinging movement of the vacuum frame, the forward movement of the vacuum cup support arms relative to said vacuum frame, and the movement of the carriage along said support tracks.

6. Apparatus as claimed in claim 4, including electrically operable means on said framework responsive to forward movement of the carriage to stop the swinging movement of the vacuum frame when a stack of sheets has been entirely removed from the support apparatus.

7. Apparatus as claimed in claim 4, including electrically operable means on the vacuum frame responsive to creation of the vacuum at the vacuum cups to cause movement of the vacuum frame away from the support apparatus a predetermined distance, to cause the vacuum cup support arms to move upwardly and rearwardly relative to the vacuum frame, to initiate downward swinging movement of the vacuum frame, and rearward movement of the carriage.

8. Apparatus as claimed in claim 4, in which
(a) the vacuum cup support arms are located on the vacuum frame in spaced substantially parallel relation to one another,
(b) means for spring mounting the vacuum cups for resilient movement relative to the respective vacuum cup support arms, and
(c) the compression of the springs being such that the spacing of the vacuum cups from the respective support arms progressively increases from the outermost pair of arms to the centermost pair of arms.

9. Apparatus as claimed in claim 8, including
(a) electrically operable means on at least one of the vacuum cup support arms actuated upon engagement of the vacuum cups on the outermost pair of support arms with a sheet on the support apparatus to stop the forward movement of the vacuum frame and to create a vacuum at the plurality of vacuum cups, (b) electrically operable means on the vacuum frame responsive to creation of the vacuum to move the vacuum frame rearwardly a predetermined distance from the support apparatus to cause a bowing of the sheet from its oppositely disposed margins inwardly to the center of said sheet, and (c) electrically operable means responsive to rearward movement of the vacuum frame to cause the vacuum cup support arms to move upwardly and rearwardly relative to the vacuum frame to remove the sheet from the support apparatus, to initiate downward swinging movement of the vacuum frame, and rearward movement of the carriage.

10. In apparatus for automatically transferring individual sheets between a conveyor support apparatus located in a substantially horizontal plane and a support apparatus located in a substantially vertical plane, a transfer assembly, comprising (a) a floor-supported framework stationarily mounted adjacent to and in the plane of the conveyor support apparatus, (b) horizontal support tracks mounted on the framework in spaced parallel relation and transversely of said conveyor support apparatus, (c) a carriage mounted on said support tracks, (d) means for moving the carriage forwardly and rearwardly along said support tracks, (e) means for stopping movement of the carriage when it reaches the limit of its rearward movement, (f) a vacuum frame pivotally carried by said carriage for transferring successive sheets from the conveyor support apparatus to the said support apparatus, (g) vacuum cup support arms pivotally carried by the vacuum frame to swing about a horizontal axis, (h) vacuum cups on said support arms for supporting a sheet while it is being transferred, (i) means for swinging the vacuum frame relative to the carriage into and out of the plane of the conveyor support apparatus and the plane of the support apparatus, (j) means for stopping swinging movement of said vacuum frame when it reaches the limits of its swinging movement, (k) means for moving the vacuum cup support arms forwardly and rearwardly relative to said vacuum frame, (l) means for a stopping movement of the vacuum cup support arms at the limits of their forward and rearward movement relative to the vacuum frame, (m) means for creating a vacuum at the vacuum cups to secure a sheet thereto when the vacuum frame is in the plane of the conveyor support apparatus, (n) means for relieving the vacuum cups when the sheet has been transferred from the conveyor support apparatus to said support apparatus, (o) electrically operable means on said carriage engageable with a sheet on the support apparatus for reducing the rate of forward movement of the carriage prior to the placing of the sheet on the support apparatus and for then bringing the carriage to a stop, and (p) electrical control means for successively initiating movement of the vacuum cup support arms relative to the vacuum frame, swinging movement of the vacuum frame, and movement of the carriage along said support tracks.

11. Apparatus as claimed in claim 10, including (a) conveyor means mounted on said framework in the plane of the conveyor support apparatus and extending in the same direction as said support tracks for moving a sheet along said plane relative to said vacuum frame, (b) electrical control means on said conveyor support apparatus responsive to the position of a first sheet for initiating operation of the conveyor means, (c) electrical control means responsive to the position of the sheet on said conveyor means for preventing action of the said electrical control means to initiate operation of said conveyor means by a second sheet on said conveyor support apparatus, (d) electrical control means responsive to a preselected position of a sheet on said conveyor means to halt the same, and (e) electrical control means including electrically operable means responsive to the position of said sheet on said conveyor means, for automatically and successively initiating forward movement of the vacuum cup support arms relative to the vacuum frame, the upward swinging movement of the vacuum frame, and the forward movement of the carriage along said support tracks.

12. Apparatus as claimed in claim 10, including (a) conveyor means mounted on said framework in the plane of said conveyor support apparatus and extending in the same direction as said support tracks for moving a sheet along said plane relative to said vacuum frame, (b) locator means on the vacuum frame for engaging the leading edge of the sheet as it is moved by the conveyor means to stop such movement when it reaches a predetermined position relative to said vacuum frame, (c) electrically operable means on the vacuum frame actuated by the sheet when it is in such predetermined position for moving the vacuum cup support arms forwardly and upwardly relative to the vacuum frame to bring the vacuum cups into engagement with the sheet on the conveyor means, and (d) means responsive to the forward and upward movement of the vacuum cup support arms to simultaneously move the locator means out of engagement with the leading edge of the sheet.

13. Apparatus as claimed in claim 10, including (a) indexing means mounted for reciprocal inward and outward movement on the carriage and adapted to initially engage the outermost sheet on the support apparatus, (b) electrically operable means actuated by said indexing means upon inward movement thereof to successively reduce the rate of forward movement of the carriage, bring the carriage to a stop, move the vacuum cup support arms forwardly and downwardly to deposit the sheet on the support apparatus, (c) electrically operable means on the vacuum frame responsive to the placing of a sheet on the support apparatus to relieve the vacuum at the vacuum cups and initiate downward movement of the vacuum frame, and (d) counter means actuated by forward movement of the carriage with the placing of successive sheets on the support apparatus to halt swinging movement of the vacuum frame when the stack of sheets on said support apparatus has reached a predetermined thickness.

14. Apparatus as claimed in claim 10, including (a) electrically operable means on the vacuum frame actuated by a sheet when located in a predetermined position to be picked up by the vacuum frame for initiating operation of said vacuum cup support arms and creating a vacuum between the vacuum cups and the sheet, and (b) electrically operable means also on the vacuum frame responsive to the creation of the vacuum between said vacuum cups and sheet to initiate upward swinging movement of the vacuum frame toward the support apparatus, and forward movement of the carriage along said tracks.

15. Apparatus as claimed in claim 14, including
(a) electrically operable means on the vacuum frame responsive to the position of a sheet in stacked relation on the support apparatus to relieve the vacuum between the vacuum cups and the sheet and initiate rearward and upward movement of the vacuum cup support arms relative to the vacuum frame, and
(b) electrically operable means on at least one of said vacuum cup support arms responsive to the rearward and upward movement of said support arms to initiate downward swinging movement of the vacuum frame and rearward movement of the carriage.

References Cited

UNITED STATES PATENTS

| | | | |
|---|---|---|---|
| 2,049,850 | 8/1936 | Lytle et al. | 214—1 |
| 2,838,898 | 6/1958 | Owen | 214—1 X |
| 3,031,906 | 5/1962 | Holman | 214—6 X |
| 3,094,322 | 6/1963 | Kocher et al. | 271—12 |
| 3,126,108 | 3/1964 | Langhart | 214—1 |
| 3,178,041 | 4/1965 | Wheat | 214—6 X |

M. HENSON WOOD, JR., *Primary Examiner.*

C. H. SPADERNA, *Assistant Examiner.*